United States Patent
Ito et al.

(10) Patent No.: US 8,005,222 B2
(45) Date of Patent: Aug. 23, 2011

(54) RADIO COMMUNICATION SYSTEM, RADIO COMMUNICATION DEVICE, RADIO COMMUNICATION METHOD, AND COMPUTER PROGRAM

(75) Inventors: Osamu Ito, Tokyo (JP); Shigenori Uchida, Kanagawa (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 1161 days.

(21) Appl. No.: 10/564,187

(22) PCT Filed: Jul. 5, 2004

(86) PCT No.: PCT/JP2004/009536
§ 371 (c)(1),
(2), (4) Date: Nov. 21, 2006

(87) PCT Pub. No.: WO2005/006639
PCT Pub. Date: Jan. 20, 2005

(65) Prior Publication Data
US 2007/0121946 A1 May 31, 2007

(30) Foreign Application Priority Data

Jul. 15, 2003 (JP) ................................. 2003-274402
Mar. 5, 2004 (JP) ................................. 2004-063203

(51) Int. Cl.
*H04K 1/00* (2006.01)
*H04L 9/00* (2006.01)

(52) U.S. Cl. .............. 380/270; 380/44; 380/46; 702/69; 398/26; 332/117; 709/230; 709/231; 705/57

(58) Field of Classification Search .................... 380/44, 380/46, 270; 702/69; 398/26; 332/117; 709/230, 231; 705/57
See application file for complete search history.

(56) References Cited

U.S. PATENT DOCUMENTS

| | | | |
|---|---|---|---|
| 5,787,179 A | 7/1998 | Ogawa et al. | |
| 6,356,951 B1 * | 3/2002 | Gentry, Jr. | 709/250 |
| 6,460,137 B1 | 10/2002 | Akiyama et al. | |
| 6,980,737 B1 * | 12/2005 | Anslow et al. | 398/27 |

(Continued)

FOREIGN PATENT DOCUMENTS

JP 08-335040 12/1996

(Continued)

OTHER PUBLICATIONS

"High-Speed Physical Layer in the 5 GHZ Band", Part 11: Wireless LAN Medium Access Control (MAC) and Physical Layer (PHY) Specifications, IEEE Std 802.11a-1999, Dec. 31, 1999, 90 pages.

(Continued)

*Primary Examiner* — Nathan Flynn
*Assistant Examiner* — Sarah Su
(74) *Attorney, Agent, or Firm* — Oblon, Spivak, McClelland, Maier & Neustadt, L.L.P.

(57) ABSTRACT

A scrambling initial value is shared without deteriorating transmission efficiency.

On the transmission side, a scrambling initial value is created based on a part of a physical layer header not scrambled, a transmission signal sequence scrambled is created by calculating an exclusive-OR operation between a scrambled sequence generated from the scrambling initial value and a transmission data sequence, and is transmitted. On the reception side, the same descrambling initial value as the scrambling initial value is created based on a part of a physical header of a reception frame, and a reception data sequence is descrambled by calculating an exclusive-OR operation between a descrambled sequence generated from this descrambling initial value and a reception signal sequence scrambled.

26 Claims, 32 Drawing Sheets

U.S. PATENT DOCUMENTS

| | | | |
|---|---|---|---|
| 7,536,473 B2* | 5/2009 | Ajanovic et al. | 709/234 |
| 7,701,975 B1* | 4/2010 | Tsang et al. | 370/474 |
| 7,760,881 B2* | 7/2010 | Ito | 380/268 |
| 7,765,402 B2* | 7/2010 | Clark et al. | 713/168 |
| 2001/0055290 A1* | 12/2001 | Seidel et al. | 370/337 |
| 2003/0002665 A1 | 1/2003 | Sako et al. | |
| 2003/0118107 A1* | 6/2003 | Itakura et al. | 375/240.19 |
| 2003/0210788 A1* | 11/2003 | Billhartz et al. | 380/270 |
| 2004/0170121 A1* | 9/2004 | Kim et al. | 370/208 |
| 2004/0252725 A1* | 12/2004 | Sun et al. | 370/503 |
| 2005/0183120 A1* | 8/2005 | Jain et al. | 725/46 |
| 2006/0153375 A1* | 7/2006 | Yi | 380/44 |
| 2006/0165024 A1* | 7/2006 | Iwami et al. | 370/315 |
| 2008/0170691 A1* | 7/2008 | Chang et al. | 380/270 |
| 2008/0273700 A1* | 11/2008 | Wentink | 380/270 |
| 2009/0028275 A1* | 1/2009 | Thesling et al. | 375/343 |
| 2009/0068953 A1* | 3/2009 | Lee et al. | 455/63.1 |
| 2010/0017686 A1* | 1/2010 | Luby et al. | 714/776 |
| 2010/0027795 A1* | 2/2010 | Wajs et al. | 380/255 |
| 2010/0031036 A1* | 2/2010 | Chauncey et al. | 713/168 |
| 2010/0061489 A1* | 3/2010 | Liu et al. | 375/340 |
| 2010/0150054 A1* | 6/2010 | Becker et al. | 370/316 |
| 2010/0159861 A1* | 6/2010 | Becker et al. | 455/205 |

FOREIGN PATENT DOCUMENTS

| | | |
|---|---|---|
| JP | 8-335040 | 12/1996 |
| JP | 9-162859 | 6/1997 |
| JP | 09-162859 | 6/1997 |
| JP | 10-32567 | 2/1998 |
| JP | 10-032567 | 2/1998 |
| JP | 2002-91828 | 3/2002 |
| JP | 2002-202719 | 7/2002 |

OTHER PUBLICATIONS

"Broadband Radio Access Networks (BRAN); HIPERLAN Type 2; Physical (PHY) Layer", ETSI TS 101 475 V1.2.2, Feb. 28, 2001, 41 pages.

* cited by examiner

FIG. 17
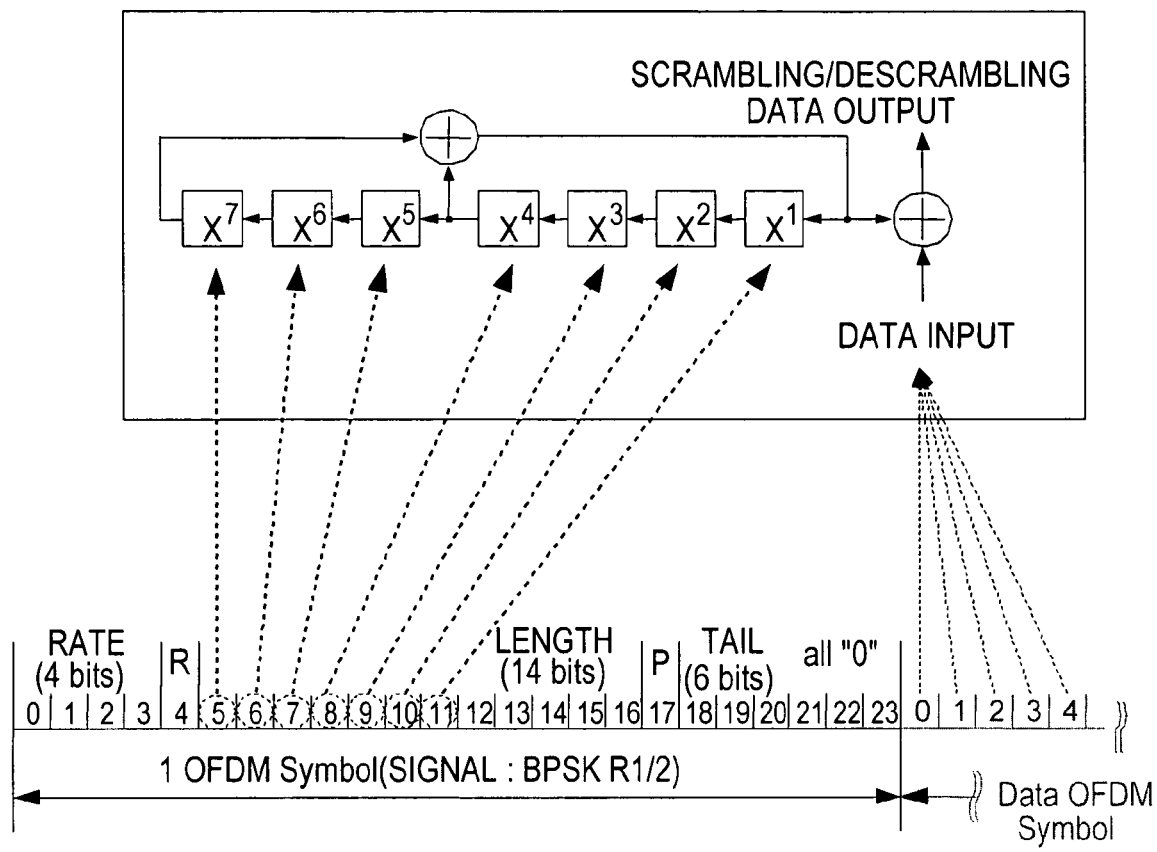
(a) CASE THAT EXTRACTED BITS ARE NOT ALL ZERO
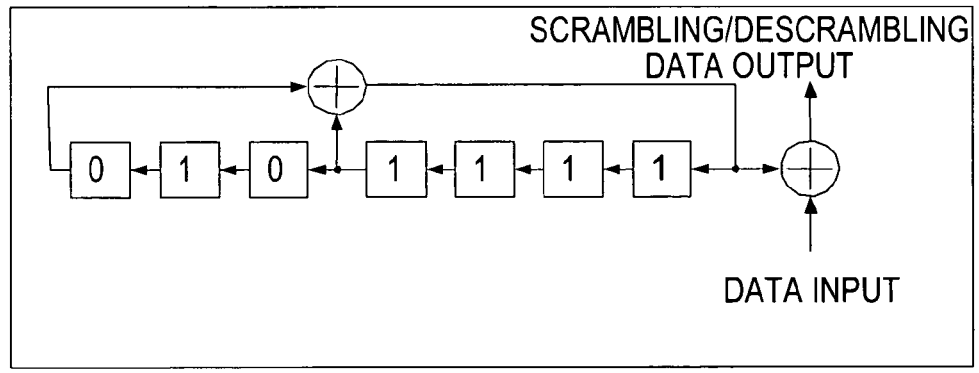
(b) CASE THAT EXTRACTED BITS ARE ALL ZERO FIG. 20
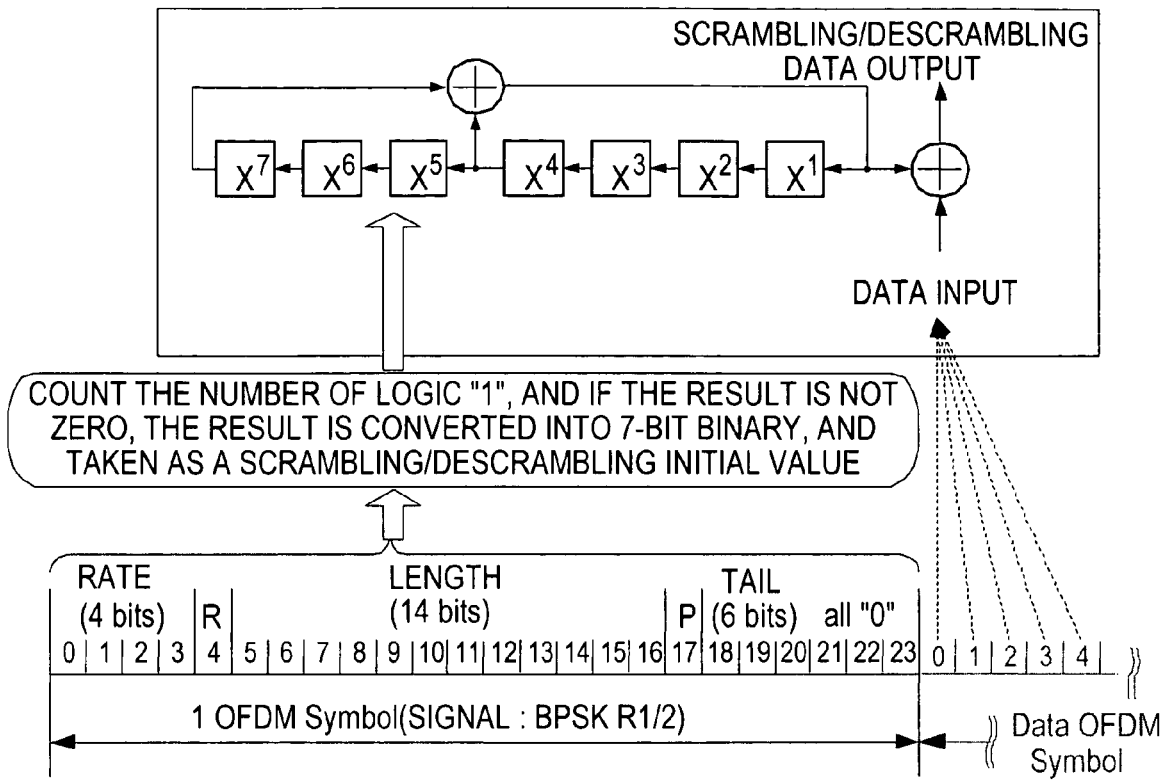
(a) CASE THAT THE NUMBER OF BITS HAVING LOGIC "1" IS NOT ZERO
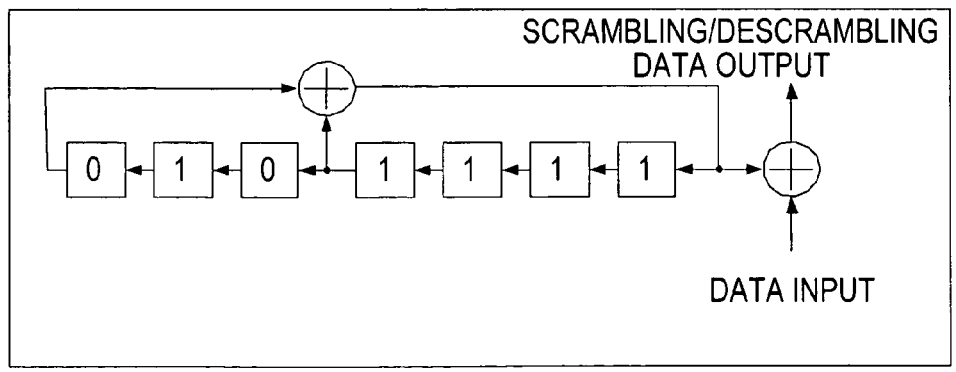
(b) CASE THAT THE NUMBER OF BITS HAVING LOGIC "1" IS ZERO FIG. 24
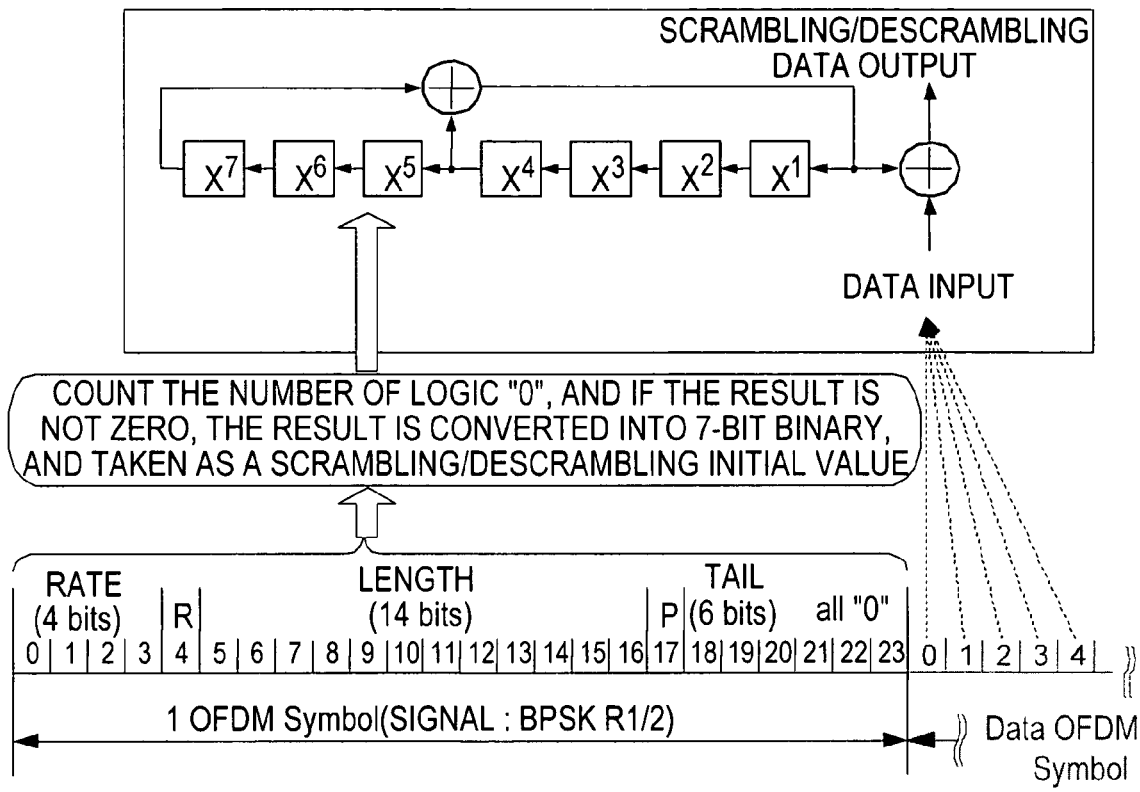
(a) CASE THAT THE NUMBER OF BITS HAVING LOGIC "0" IS NOT ZERO
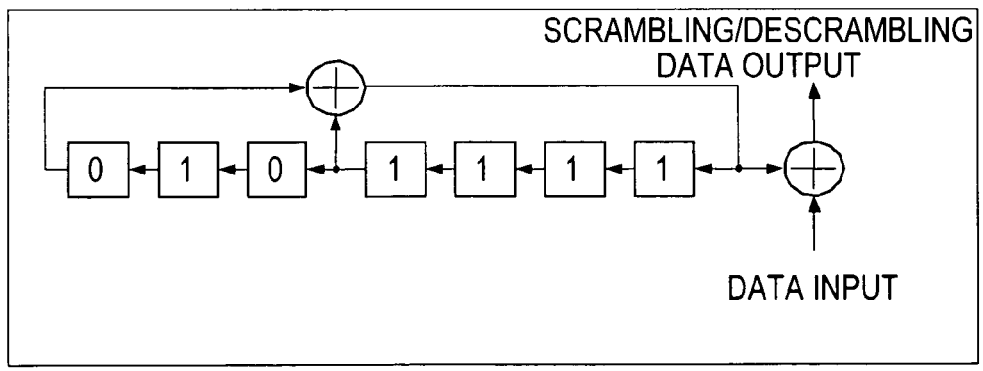
(b) CASE THAT THE NUMBER OF BITS HAVING LOGIC "0" IS ZERO

Background Art

US 8,005,222 B2

RADIO COMMUNICATION SYSTEM, RADIO COMMUNICATION DEVICE, RADIO COMMUNICATION METHOD, AND COMPUTER PROGRAM

TECHNICAL FIELD

The present invention relates to a wireless communication system, wireless communication apparatus and wireless communication method, and computer program for performing mutual communication between multiple wireless stations, such as a wireless LAN (Local Area Network), and particularly relates to a wireless communication system, wireless communication apparatus and wireless communication method, and computer program for mutually performing scrambling/descrambling between a data transmission station and a data reception station.

In further detail, the present invention relates to a wireless communication system, wireless communication apparatus and wireless communication method, and computer program for appropriately performing scrambling/descrambling using a correct scrambling initial value between transmission and reception, and particularly relates to a wireless communication system, wireless communication apparatus and wireless communication method, and computer program for sharing a scrambling initial value between transmission and reception without deteriorating the original transmission efficiency of user data which a user wants to transmit.

BACKGROUND ART

Wireless LANs have attracted a great deal of attention as a system for liberating users from LAN cables of the wired method. According to a wireless LAN, the most part of cables in the work space such as an office can be omitted, so communication terminals such as personal computers (PC) can be moved with relative ease. In recent years, the demand thereof has markedly increased, accompanying the increase speeds and reduced prices of wireless LAN systems. Particularly, in these days, implementation of personal area networks (PAN) has been studied for establishing a small-scale wireless network between multiple electronic apparatuses present around a personal environment to perform information communication. For example, different wireless communication systems and wireless communication apparatuses have been stipulated by using frequency bands not requiring the authorization of a competent authority, such as the 2.4-GHz band, 5-GHz band, or the like.

Examples of the standard specifications relating to a wireless network include IEEE (The Institute of Electrical and Electronics Engineers) 802.11 (e.g., see Non-patent Document 1), HiperLAN/2 (e.g., see Non-patent Document 2 and Non-patent Document 3), IEEE802.15.3, and Bluetooth communication. As for the IEEE802.11 standard, expansion standards such as IEEE802.11a (e.g., see Non-patent Document 4), IEEE802.11b, and IEEE802.11g are available according to the differences of wireless communication methods and frequency bands to be used.

With a wireless communication system, multi-bus environment is formed wherein a combination of multiple reflected waves and delayed waves is received at a data reception station in addition to the direct wave from a data transmission station side. Delay distortion (or frequency selective phasing) is caused due to the multi-bus, and error is caused over communication. This results in a problem wherein inter-symbol interference due to delay distortion is caused.

Major countermeasures of delay distortion include a multi-carrier transmission method represented with the OFDM modulation. With the OFDM (Orthogonal Frequency Division Multiplexing) method, the frequency of each carrier is set such that the respective carriers are mutually orthogonal within a symbol zone. When transmitting information, information transmitted in serial is subjected to serial-to-parallel conversion for each symbol cycle slower than the information transmission rate, the multiple converted output data is assigned to each carrier to perform amplitude and phase modulation for each carrier, the data is converted into time axial signals while keeping the orthogonality of each carrier by performing inverse FFT regarding the multiple carriers, and transmitted. Also, when receiving information, the operations opposite of this, i.e., time axial signals are converted into frequency axial signals by performing FFT to perform demodulation corresponding to each modulation method regarding each carrier, and then are subjected to parallel-to-serial conversion to reproduce the original information transmitted with serial signals. The OFDM modulation method has been employed as the standard specifications of a wireless LAN in IEEE802.11a/g, for example.

Also, as another problem in a wireless communication system, there is a problem wherein a linear frequency spectrum is formed by data of 0 through 1 extremely continuing. For example, in the event of employing the OFDM modulation method, a configuration is made up of multiple sub carriers, the difference between average power and peak power is great, resulting in shortage of an power range on the transmission side and on the reception side. To this end, scrambling is usually performed for pseudo-randomizing data over a transmission path.

In general, on the transmission side, scrambling is performed by calculating an exclusive-OR operation between delivery data and pseudo-random bits, the output thereof is taken as transmission data. On the other hand, on the reception side, descrambling is performed by calculating an exclusive-OR operation between received data and pseudo-random bits, whereby the transmission data can be extracted. At this time, the transmission side and the reception side must have the same pseudo-random bit generator, and also have the same initial value thereof.

Examples of a wireless communication system for performing scrambling include IEEE802.11a, which is the technical standard of a wireless LAN. In FIG. 32, a configuration example of a wireless communication apparatus, which is employed for IEEE802.11a. This wireless communication apparatus performs, for example, audio communication as to another wireless communication apparatus (not shown) corresponding to IEEE802.11a. Hereinafter, description will be made regarding the wireless communication operations thereof with reference to FIG. 32.

First, description will be made regarding operation of the transmission system following the flow of signals. In the event of data communication such as being connected to a computer, a data signal such as audio is input to a data input/output processing unit 102, and the signal is converted into an appropriate digital data sequence.

Subsequently, the data sequence is input to a transmission data processing unit 110. If necessary, the transmission data processing unit 110 receives communication control data to be transmitted to a wireless communication apparatus (not shown) serving as an other party of wireless communication from a control unit 104, subjects this to multiplexing as appropriate, and then forms and outputs frame and slot configurations for transmitting this in a wireless zone.

Subsequently, a CRC (Cyclic Redundancy Check) adder 112 adds redundancy for detecting an error on the reception side to the transmission data, and further, a cipher device 114 subjects the transmission data to encryption, and outputs this.

Subsequently, a scrambler 116 subjects the transmission data to scrambling so as to form pseudo-random in accordance with a predetermined algorithm (described later). Also, a header generator 117 generates a PHY (physical layer) header. Subsequently, an encoder 118 subjects the PHY header and the transmission data subjected to scrambling to convolution encoding, and further an interleaver 120 subjects this to interleaving. According to this interleaving processing, the coded bit sequence is rearranged in accordance with a particular rule, so on the reception side, burst errors can be converted into random errors by performing an inverse operation, i.e., de-interleaving (described later).

Subsequently, a modulator 122 subjects the transmission data to mapping to signal points at the time of transmission, and outputs inphase components (I components) and orthogonal components (Q components). A complex IFFT unit 124 subjects the output thereof to inverse FFT, thereby performing the OFDM modulation.

Subsequently, a time-waveform trimming unit 126 provides guard time by adding a cycle prefix, and subjects the output data to window wing processing so as to smooth the rise and decay of the OFDM modulation symbol.

Subsequently, a DA converter 128 converts the transmission data from a digital waveform to an analog waveform, and further, an RF transmitter 130 subjects the transmission data to filtering, vector modulation using the I components and Q components, a frequency conversion to an appropriate transmission frequency channel, control of transmission power, amplification, and so forth.

The transmission signal up-converted by the RF transmitter 130 is input to an antenna 134 via an antenna duplexer 132, and finally transmitted from the antenna 134 as an electromagnetic wave. This transmission signal is received by a other party of wireless communication (not shown).

Note that the antenna duplexer 134 is used for separating a transmission signal and a reception signal, an antenna switch is employed in the TDD method and the FDD/TDMA method, and a duplexer is generally employed in the other methods. Now, let us say that an antenna switch is employed, since the example here is IEEE802.11a of the TDD method.

Next, description will be made regarding the operation of the reception system in detail. Now, let us say that a wireless communication apparatus 100 receives a transmission signal generated by another wireless communication apparatus serving as an other party of wireless communication (not shown) performing the same processing as the transmission system in the above IEEE802.11a.

The transmission signal from the other party of wireless communication is received at the antenna 134 as an electromagnetic wave. The signal is separated from the own transmission signal at the antenna duplexer 132, following which is input to an RF receiver 140. The RF receiver 140 subjects the reception signal to amplification, attenuation of unnecessary frequency components, selection of a desired frequency channel, frequency conversion, reception signal amplitude level control, vector detection process for separating the I components and the Q components, band limit, and the like, and thus the I components and the Q components of the reception signal are extracted.

An AD converter 142 converts the reception signal down-converted by the RF receiver 140 from an analog waveform to a digital waveform. Subsequently, a synchronization circuit 144 subjects the reception data to frame synchronization, frequency error correction, and the like. Now, in the event of searching a communicable communication other party immediately after power is turned on or the like, detection of a synchronous signal or initial synchronization is performed using this synchronization circuit 144. Various arrangements have been proposed regarding initial synchronization, frame synchronization, frequency error correction, and the like, but these are not directly associated with the essence of the present invention, so further description will not be made in the present specification.

Subsequently, a time-waveform trimming unit 146 subjects the reception data to time waveform trimming so as to remove guard time provided by adding a cycle prefix, following which a complex FFT unit 148 subjects the reception data to FFT to perform the OFDM demodulation.

Subsequently, an equalizer 150 performs equalization using estimation of a transmission path and estimation results. In some cases, the equalizer 150 inputs the information of the synchronization circuit 144, and uses this for estimation of a transmission path, or the like. Note that various arrangements have been proposed as an equalizer, but these are not directly associated with the essence of the present invention, so further description will not be made in the present specification.

The output of the equalizer 150 is input to a demodulator 152, and is subjected to signal point determination to output a reception bit estimation value. Subsequently, the reception data is input to a de-interleaver 154, and is subjected to de-interleaving for rearranging the coded bit sequence in accordance with a particular rule. Subsequently, a decoder 156 performs decoding of error correction codes subjected on the transmission side.

Subsequently, a descrambler 158 subjects the decoded reception data to descrambling, which is inverse conversion of scrambling performed on the transmission side. Also, a header extractor 157 extracts a PHY header from the decoded reception data. Further, a decipher device 160 deciphers encryption subjected on the transmission side, following which a CRC checking unit 162 outputs the reception data of which a CRC is removed, and the result of a CRC check regarding the reception block.

Subsequently, in the event that determination is made that the result of the CRC check of the reception block has no error, a reception data processing unit 164 removes the frame configuration and slot configuration subjected for transmission in a wireless zone. Subsequently, in the event of data communication such as connected with a computer, the data input/output processing unit 102 converts the reception data into a data signal, and outputs this.

In the event that the reception data includes communication control data transmitted from an other party of wireless communication (not shown), that portion is extracted by the reception data processing unit 164, and is input to the control unit 104 via a reception system control line 106. Subsequently, the control unit 104 interprets the received control data, and performs operation control of each unit within the wireless communication apparatus 100 in accordance with the received instruction.

Each unit of the transmission system is connected to the control unit 104 via a transmission system control line 108. Accordingly, the control unit 104 can perform various operation control and monitoring of the transmission system such as on/off control of the transmission system, operation control and status monitoring of the RF transmitter 130, fine adjustment of transmission timing, modification of an encoding method or signal point mapping method, control of retransmission, and the like via the transmission system control line 108.

Also, each unit of the reception system is connected to the control unit 104 via the reception system control line 106. Accordingly, the control unit 104 can perform operation control and monitoring of various reception systems such as on/off control of the reception system, operation control and status monitoring of the RF receiver 140, fine adjustment of reception timing, modification of a decoding method or signal point demapping method, control of retransmission, and the like via the reception system control line 106.

FIG. 33 illustrates the configuration of the scrambler 116 disposed in the transmission system of the wireless communication apparatus 100. The scrambler 116 shown in the drawing is made up of a 7-stage shift register, and an arrangement is made wherein $X^1$ is the lowest bit, $X^7$ is the highest bit, and the value of each bit is shifted to the adjacent higher bit $X^2$ through $X^7$ in order. As for the highest bit $X^7$, an exclusive-OR operation between the output from the $X^4$ and the output from the $X^7$ is calculated, and the result is input to the lowest bit $X^1$. At the same time, an exclusive-OR operation between the result and input data is calculated, and this result is output as data following scrambling.

Data other than 0000000 (i.e., all zeroes) is employed for the $X^1$ through $X^7$ shown in FIG. 33. This is because all-zero data cannot serve as a scrambler. In other words, the total number of a bit sequence, which can be employed, is $2^7-1=127$, and any number of these may be employed. A scrambling pattern, which occurs through scrambling, can be changed by modifying the initial value of scrambling.

Also, FIG. 34 illustrates the configuration of the descrambler 158 disposed in the reception system of the wireless communication apparatus 100. The descrambler shown in the drawing has completely the same configuration as the scrambler shown in FIG. 24, stores the initial value provided from the transmission side to the $X^1$ through $X^7$, and calculates an exclusive-OR operation between the stored initial value and received input data, thereby performing descrambling.

FIG. 35 illustrates the format of the OFDM signal stipulated by IEEE802.11a. As shown in the drawing, the Preamble is transmitted first, and subsequently, the SIGNAL field is transmitted with one OFDM symbol, and further subsequently, the DATA field is transmitted.

The PHY header of IEEE802. 11a comprises the above-described SIGNAL field, and the Service field made up of 16 bits on the MSB side of the DATA field. FIG. 36 illustrates the configuration of the PHY header in detail. As shown in the drawing, the SIGNAL field comprises the modulation method, RATE information of 4 bits determined from the encoding rate of error correction codes, a reserved bit of one bit, LENGTH information of 14 bits indicating the length of a transmission packet, PARITY information of one bit for detecting a bit error of the SIGNAL field, and TAIL bits of 6 bits for terminating a convolution code. Here, the PARITY bit is set such that the number of "ones" included in the bit sequence made up of the RATE information, the reserved bit, the LENGTH information, and the PARITY bit becomes even.

Following the SIGNAL field, the Service field of 16 bits continues, and of these 16 bits, 7 bits from the MSB side are used for transmission of the initial value of scrambling, i.e., notification, and this is equivalent to the initial value provided for descrambling on the reception side. Incidentally, the residual 9 bits of the Service field are reserved.

The SIGNAL field is transmitted by BPSK R1/2 of which the required Eb/No is the lowest, of the modulation modes stipulated by IEEE802.11a. The 24 bits of the SIGNAL field are equivalent to 48 (sub carriers)×½ (encoding rate)=24 bits in the event of transmitting data carrier and 48 sub carriers by BPSK R1/2 using the OFDM transmission, and are transmitted with one OFDM symbol. This SIGNAL field is not subjected to scrambling.

The subsequent data field hereafter is transmitted in a state of being subjected to scrambling with the modulation mode indicated by the RATE field within the SIGNAL field.

Now, description will be made further in detail regarding handling of the scrambling initial value on the transmission side, and the descrambling initial value on the reception side. Scrambling and descrambling are realized by combining a shift register and an exclusive-OR circuit according to a generator polynomial representing pseudo-random number sequence (e.g., see Patent Document 1).

FIG. 37 illustrates the configuration of around the scrambler 116 on the transmission side in detail. Transmission data is scrambled by calculating an exclusive-OR between the transmission data and a scrambling pattern generated with a later-described method at an EXOR 116b within the scrambler 116 following the transmission data being encrypted at the cipher device 114. The output thereof is subjected to error correction encoding at the encoder 118.

When starting scrambling, a scrambling pattern generator 116a receives notification from the control unit 104 regarding a scrambling initial value at the time of generating a scrambling pattern. The scrambling initial value notified is set within the register of the scrambler body made up of a shift register such as shown in FIG. 33, and a scrambling pattern is generated while the value within the register is shifted for each clock.

In particular, as for the first 7 bits of the Service field disposed in the headmost of the DATA field for transmitting a scrambling pattern, "0" data of 7 bits is entered at the time of outputting from the cipher device 114, and the first 7 bits of the Service field are generated by calculating an exclusive-OR operation between this data and a scrambling pattern to be generated from the scrambling initial value, which is set, for each bit.

However, the input data was all "0", so the first 7 bits of the output of the EXOR 116b are the same as the scrambling initial value, which is set. On the reception side, which received this data, the 7 bits of this field can be used as a descrambling initial value.

FIG. 38 illustrates the configuration of around the descrambler 158 on the reception side in detail. Reception data is descrambled by calculating an exclusive-OR between the reception data and a descrambling pattern generated by descrambling pattern generator 158a with a later-described method at an EXOR 158b within the descrambler 158 following the reception data being subjected to error correction decoding at the decoder 156. The output thereof is deciphered at the decipher device 160.

When starting descrambling, the 7 bits from the MSB side of the Service field disposed in the headmost of the received DATA field are extracted as the initial value thereof, and are set within the register of the descrambler body made up of a shift register such as shown in FIG. 34, and a descrambling pattern is generated while the value within the register is shifted for each clock.

Thus, with IEEE802. 11a, the initial value 7 bits of scrambling are configured so as to be transmitted using the Service field within the PHY header section, which is not scrambled, and thus, the same scrambling initial value and the same descrambling initial value can be shared between transmission and reception, thereby performing scrambling and descrambling correctly. However, a method for transmitting the scrambling initial value thus using the data section is equivalent to a method for storing data different from the user data, which a user actually wants to send, in the data section and transmitting this, so transmission efficiency is deteriorated by the difference thereof, which is not preferable.

Also, with the transmission format of IEEE802. 11a, one OFDM symbol for transmitting the SIGNAL field employs the BPSK modulation of which required S/N is low, and encoding rate=½, but the DATA field including a scrambling initial value tends to be transmitted with a modulation method of which required S/N is higher than the above S/N, and encoding rate higher than the above rate, so bit error is readily caused.

Also, as for the SIGNAL field and the entire data, error correction is performed at a physical layer using convolution codes. As for a decoding method of convolution codes, the Viterbi decoding method has been known.

On the other hand, even if such error countermeasures are performed, it is difficult to completely correct an error, and accordingly, it is necessary to request the transmission device side of retransmission in the event of detecting an uncorrectable error on the reception device side. Increase of such repetitions of retransmission may affect communication speed. For example, when performing streaming transmission of moving image data or the like such as QoS (Quality of Service), it becomes difficult to reserve a communication band and assure a constant speed. Accordingly, in order to deal with the QoS function, as for MAC (Medium Access Control) sublayer data, i.e., the PSDU of data, it can be conceived to implement error correction processing as a MAC sublayer. Block codes such as Reed-Solomon product codes can be employed for such error correction.

However, even if error correction corresponding to the QoS is implemented to the MAC sublayer, synchronization between scrambling and descrambling is not normally performed in the event that countermeasures are not performed regarding the Service, the PSDU may not be descrambled normally on the reception device side. In the event that descrambling is not normally performed, consequently the transmission side is requested of retransmission of data, and even if an error correction corresponding to the QoS is implemented, the effect thereof cannot be obtained. As described above, it can be conceived that transmission in a modulation mode having high error tolerance is not assured regarding the Service, so the Service has high possibility to cause an error as compared to the SIGNAL.

As one method for preventing deterioration of transmission efficiency due to notification of a scrambling initial value, a technique for referring to an MAC address, and employing a part thereof as a scrambling initial value has been proposed (e.g., see Patent Document 2). In this case, it is not necessary to bother to transmit a scrambling initial value using the data section.

However, with this method, the MAC address itself cannot be scrambled, which causes a problem from the perspective of concealment. Also, that the MAC address itself cannot be scrambled means that if "0" and "1" within the data form a biased distribution during transmission of the MAC address, it cannot be converted into a random bit sequence, and consequently, the possibility that linear components occur in the spectrum of that zone remains.

Further, with IEEE802.11a, the MAC header including the PHY header, the MAC address, and the like is clearly separated, and in the event of applying the above scrambling notification method to such a wireless communication system, in addition to the MAC address being described in the DATA section, further a part of the MAC address is used for the PHY header section, which causes redundancy.

[Patent Document 1]
 Japanese Unexamined Patent Application Publication No. 2000-269944
[Patent Document 2]
 Japanese Unexamined Patent Application Publication No. 8-107414
[Non-patent Document 1]
 International Standard ISO/IEC 8802-11: 1999(E) ANSI/IEEE Std 802.11, 1999 Edition, Part11: Wireless LAN Medium Access Control (MAC) and Physical Layer (PHY) Specifications
[Non-patent Document 2]
 ETSI Standard ETSI TS 101 761-1 V1.3.1 Broadband Radio Access Networks (BRAN); HIPERLAN Type 2; Data Link Control (DLC) Layer; Part1: Basic Data Transport Functions
[Non-patent Document 3]
 ETSI TS 101 761-2 V1.3.1 Broadband Radio Access Networks (BRAN); HIPERLAN Type 2; Data Link Control (DLC) Layer; Part2: Radio Link Control (RLC) sublayer
[Non-patent Document 4]
 Supplement to IEEE Standard for Information technology-Telecommunications and information exchange between systems-Local and metropolitan area networks-Specific requirements-Part11: Wireless LAN Medium Access Control (MAC) and Physical Layer (PHY) specifications: High-speed Physical Layer in the 5 GHZ Band

DISCLOSURE OF INVENTION

Problems to be Solved by the Invention

The present invention provides an excellent wireless communication system, wireless communication apparatus and wireless communication method, and computer program, which allow a data transmission station and a data reception station to preferably perform scrambling/descrambling respectively.

The present invention further provides an excellent wireless communication system, wireless communication apparatus and wireless communication method, and computer program, which allow between transmission and reception to preferably perform scrambling/descrambling using a correct scrambling initial value.

The present invention further provides an excellent wireless communication system, wireless communication apparatus and wireless communication method, and computer program, which allow between transmission and reception to share a scrambling initial value without deteriorating transmission efficiency of user data which a user actually wants to transmit.

The present invention further realizes synchronization between a scrambler and a descrambler with high error tolerance in a general purpose communication system such as conforming to the IEEE802.11a, for example.

Means for Solving the Problems

The present invention has been made in light of the above problems, and according to a first aspect thereof, a wireless communication system for communicating transmission data comprises: a physical layer header section; and a data section; wherein on the transmission side, a scrambling initial value is generated using at least a part of a physical header section, and scrambling of a data section is performed using the scrambling initial value;

and wherein on the reception side, a descrambling initial value is generated using at least a part of a physical header section, and descrambling of a data section is performed using the descrambling initial value.

Note however, that the term "system" here means a logical group made up of multiple devices (or function modules for realizing a particular function), and whether or not each device or each function module is accommodated in a single casing is not of concern.

With a wireless communication system according to the present invention, on the transmission side, a scrambling initial value is created based on a part of a physical layer header not scrambled, a transmission signal sequence scrambled is created by calculating an exclusive-OR operation between a scrambled sequence generated from the scrambling initial value and a transmission data sequence, and transmitted. On the other hand, on the reception side, the same descrambling initial value as the scrambling initial value is created based on a part of a physical header of a reception frame, an exclusive-OR operation between a descrambled sequence generated from this descrambling initial value and a reception signal sequence scrambled is calculated, whereby a reception data sequence can be descrambled.

According to the present invention, a scrambling initial value can be shared between transmission and reception using the information of a physical header section not scrambled within a transmission frame. Accordingly, a dedicated field does not need to be included in a transmission data frame for notifying the scrambling initial value, and the scrambling initial value can be shared between transmission and reception without deteriorating the transmission efficiency of user data which a user actually wants to send.

With a wireless communication system according to the present invention, a wireless communication apparatus serving as a communication station generates an initial value when scrambling or descrambling using at least a part of a physical layer header section based on a rule common with an other party of communication, and can perform scrambling or descrambling of the data section using this initial value.

At the time of transmission, a transmission signal sequence scrambled is generated by calculating an exclusive-OR operation between a scrambled sequence generated from a scrambling initial value and a transmission data sequence. Also, at the time of reception, a reception data sequence is descrambled by calculating an exclusive-OR operation between a descrambled sequence generated from a descrambling initial value and a reception signal sequence scrambled.

For example, in the event that an initial value when scrambling/descrambling is n bits in length (wherein n is a natural number), an n-bit sequence obtained by extracting n bits from a physical layer header section or a part thereof based on a rule common with an other party of communication can be taken as the initial value when scrambling/descrambling. At this time, the initial value when scrambling/descrambling is preferably generated by extracting n bits including fields which are not all zero bits within the physical layer header section, in light of the field configuration of the physical layer header section.

Here, in the event that n bits extracted from the physical layer header section are all zero bits, a fixed n-bit sequence, which are not all zero bits, shared with an other party of communication may be taken as the initial value when scrambling/descrambling.

Also, in the event that the initial value when scrambling/descrambling is n bits in length (wherein n is a natural number), (n−k) bits from a physical layer header section or a part thereof based on a rule common with an other party of communication are extracted (wherein k is a natural number smaller than n), and a k-bit sequence such that at least 1 bit thereof includes the logic "1", shared with the other party of communication is inserted in the extracted bit sequence of the (n−k) bits in a pattern shared with the other party of communication, whereby the initial value when scrambling/descrambling can be generated.

Alternatively, in the event that the initial value when scrambling/descrambling is n bits in length (wherein n is a natural number), the number of logics "1" in the physical layer header section or a part thereof is counted, the number thereof is represented with n bits in binary, whereby this can be taken as the initial value when scrambling/descrambling. However, in the event that the number of logics "1" counted in the physical layer header section or a part thereof is zero, a fixed n-bit sequence, which are not all zero bits, shared with an other party of communication may be taken as the initial value when scrambling/descrambling.

Also, in the event that the initial value when scrambling/descrambling is n bits in length (wherein n is a natural number), an arrangement may be made wherein the number of logics "1" in the physical layer header section or a part thereof is counted, the number thereof is represented with (n−m) bits in binary (wherein m is a natural number smaller than n), an m-bit sequence such that at least 1 bit thereof includes logic "1", shared with an other party of communication is inserted in the extracted bit sequence of the (n−m) bits in a pattern shared with the other party of communication, thereby generating the initial value when scrambling/descrambling.

Also, in the event that the initial value when scrambling/descrambling is n bits in length (wherein n is a natural number), an arrangement may be made wherein the number of logics "1" in the physical layer header section or a part thereof is counted, x shared with an other party of communication (wherein x is a natural number smaller than $2^n$) is added to the number thereof, the result is represented with n bits in binary, and this bit sequence is taken as the initial value when scrambling/descrambling.

Also, in the event that the initial value when scrambling/descrambling is n bits in length (wherein n is a natural number), an arrangement may be made wherein the number of logics "0" in the physical layer header section or a part thereof is counted, the number thereof is represented with n bits in binary, and this is taken as the initial value when scrambling/descrambling. However, in the event that the number of logics "0" counted in the physical layer header section or a part thereof is zero, a fixed n-bit sequence, which are not all zero bits, shared with an other party of communication may be taken as the initial value when scrambling/descrambling.

Also, in the event that the initial value when scrambling/descrambling is n bits in length (wherein n is a natural number), an arrangement may be made wherein the number of logics "0" in the physical layer header section or a part thereof is counted, the number thereof is represented with (n−m) bits in binary (wherein h is a natural number smaller than n), an h-bit sequence such that at least one bit thereof is logic "1", shared with an other party of communication is inserted in the extracted bit sequence of the (n−h) bits in a pattern shared with the other party of communication, thereby generating the initial value when scrambling/descrambling.

Also, in the event that the initial value when scrambling/descrambling is n bits in length (wherein n is a natural number), an arrangement may be made wherein the number of logics "0" in the physical layer header section or a part thereof is counted, y shared with an other party of communication (wherein y is a natural number smaller than $2^n$) is added to the number thereof, the result is represented with n bits in binary, and this bit sequence is taken as the initial value when scrambling/descrambling.

Also, in the event that the initial value when scrambling/descrambling is n bits in length (wherein n is a natural number), an arrangement may be made wherein the number of logics "1" and the number of logics "0" in the physical layer header section or a part thereof are counted respectively, and the absolute value of the difference thereof is represented with n bits in binary, and this is taken as the initial value when scrambling/descrambling. However, in the event that the difference between the number of logics "1" and the number of logics "0" in the physical layer header section or a part thereof is zero, a fixed n-bit sequence, which are not all zero bits, shared with an other party of communication may be taken as the initial value when scrambling/descrambling.

Also, in the event that the initial value when scrambling/descrambling is n bits in length (wherein n is a natural number), an arrangement may be made wherein the number of logics "1" and the number of logics "0" in the physical layer header section or a part thereof are counted respectively, the absolute value of the difference thereof is represented with (n–i) bits in binary, an i-bit sequence such that at least one bit thereof is logic "1", shared with an other party of communication is inserted in the extracted bit sequence of the (n–i) bits in a pattern shared with the other party of communication, thereby generating the initial value when scrambling/descrambling.

Also, in the event that the initial value when scrambling/descrambling is n bits in length (wherein n is a natural number), an arrangement may be made wherein the number of logics "1" and the number of logics "0" in the physical layer header section or a part thereof are counted respectively, the absolute value of the difference thereof is obtained, z shared with an other party of communication (wherein z is a natural number smaller than $2^n$) is added to the absolute value, the result is represented with z bits in binary, and this bit sequence is taken as the initial value when scrambling/descrambling.

Now, with a wireless communication system according to the present invention, wireless transmission is basically performed in a transmission frame format made up of a physical layer header section and a data section, but the configuration of the transmission frame is unrestrained.

For example, a transmission frame is made up of one or more pairs of a physical layer header section and a data section. In such a case, an initial value when scrambling or descrambling is acquired from each physical layer header section, and by using an initial value extracted from a physical layer header section, scrambling or descrambling of the data section to be coupled with the physical layer header section can be performed.

In the event of including a non-scrambled signal between a physical layer header section and a data section, the start position of scrambling or descrambling of a data section should be delayed by a predetermined period corresponding to transmission and reception of a non-scrambled signal section following transmission or reception of a physical layer header section. For example, this is transmitted as a training signal for equalizing a transmission path, or a signal of which data to be subjected to broadcast to peripheral stations, or the like does not need scrambling.

Alternatively, a transmission frame sometimes includes two or more physical layer header sections. In such a case, an initial value when scrambling or descrambling is acquired from each physical layer header section, and scrambling or descrambling of the subsequent signals should be performed using the initial value extracted from each physical layer header section. That is to say, following the next physical layer header section appearing until an initial value when scrambling or descrambling is newly acquired, scrambling or descrambling of the subsequent signals continuously should be performed using the initial value when scrambling or descrambling, which has been acquired last.

Also, with a wireless communication system for performing space-division multiplexing communication, a transmission frame is provided with each physical layer header section subjected to time division multiplexing corresponding to the data section over each channel subjected to space-division multiplexing. In such a case, scrambling or descrambling of the data section to be transmitted over the corresponding channel should be performed using the initial value extracted from each physical layer header section.

Also, according to a second aspect of the present invention, a computer program which is described in a computer-readable format so as to execute control of communication operation of transmission data made up of a physical layer header section and a data section on a computer system, the program comprising:

a scrambling/descrambling initial-value generating step for generating an initial value when scrambling or descrambling using at least a part of a physical layer header section based on a rule common with an other party of communication; and a scrambling/descrambling step for performing scrambling or descrambling of a data section using the initial value.

The computer program according to the second aspect of the present invention is defined as a computer program which is described in a computer-readable format so as to realize predetermined processing on a computer system. In other words, by installing the computer program according to the second aspect of the present invention on a computer system, collaborative operation is exhibited on the computer system, which operates as a wireless communication apparatus. A wireless network is established by activating a plurality of such wireless communication apparatuses, whereby the same advantages as the wireless communication system according to the first aspect of the present invention can be obtained.

Advantage

According to the present invention, synchronization between a scrambler and a descrambler can be realized with high error tolerance in a communication system.

Also, according to the present invention, an excellent wireless communication system, wireless communication apparatus and wireless communication method, and computer program can be provided wherein a scrambling initial value can be shared between transmission and reception without deteriorating transmission efficiency of user data which a user actually wants to send.

Also, according to the present invention, there is no need to provide a dedicated field for notifying the initial value of scrambling within a transmission data frame, thereby contributing to improvement of data transmission efficiency.

Also, according to the present invention, a value equivalent to a scrambling initial value can be transmitted with a field which can employ a modulation method and encoding rate having less required S/N, i.e., a physical header, so while the transmission error of a scrambling initial value is reduced, the number of transmission bits of a field employing a modulation method and encoding rate having higher required S/N can be reduced by the amount of the above reduction, and accordingly, transmission errors can be reduced on the whole, thereby contributing to improvement of transmission efficiency from this perspective as well.

Specifically, for example, let us consider when under AWGN, and SNR=12 [dB]. In order to facilitate description, let us consider that bit errors occur independently at random, and let us set up an error rate at this time as the following. Note that this value is a realistic value approximated using a computer simulation. Now, let us say that the size of DATA is 100 bytes.

SNR=12 [dB] BPSK R=½ BER: 0 (absolutely no error)
SNR=12 [dB] 16QAM R=½ BER: $1.0e^{-4}$ With a conventional method, if the SIGNAL section (24 bits) is transmitted by BPSK R=½, and the Service+DATA section (816 bits) is transmitted by 16QAM R=½, error-free probability on the whole is $(1-0)^{24} \times (1-10e^{-4})^{816} = 0.9216$. On the other hand, according to the present invention, if the SIGNAL section (24 bits) is transmitted by BPSK R=½, and the Service+DATA section (800 bits) is transmitted by 16QAM R=½, error-free probability on the whole is $(1-0)^{24} \times (1-10e^{-4})^{800} = 0.9231$. Accordingly, it can be understood that according to the present invention, error-free probability improves, which contributes to improvement of throughput on the whole system.

Also, the present invention employs a scrambling notification method, which is closed only for a PHY layer without depending on upper layer formats, so can handle the format of a wide-range communication system.

The other objects, characteristics, and advantages regarding the present invention will be apparent with more detailed description based on later-described embodiment of the present invention and the appended drawings.

BEST MODE FOR CARRYING OUT THE INVENTION

Hereinafter, description will be made in detail regarding an embodiment of the present invention with reference to the drawings.

FIG. 1 schematically illustrates the entire configuration of a communication system according to an embodiment of the present invention. With the example in the drawing, a communication apparatus 21 to be connected to a network 30, and a communication apparatus 11 to be connected to a information processing device 12 are connected by wireless. The communication apparatus 21 serves as an access point (AP), and controls connection to the network 30 from another communication apparatus. The communication apparatus 11 serves as a terminal, and attempts, for example, connection to the network 30 by communicating with the communication apparatus 21. This communication apparatus 11 can be connected with, for example, a personal computer or the like as a information processing device 12. The communication apparatus 21, communication apparatus 11, and network 30 forms a wireless LAN (Local Area Network) serving as another network.

Hereinafter, description will be made regarding the configuration of the communication apparatus 11. The communication apparatus 11 and communication apparatus 21 have basically the same internal configuration, though each serves differently.

A. Configuration and Operation of Wireless Communication Apparatuses

FIG. 2 schematically illustrates the functional configuration of a transmitter according to an embodiment of the present invention.

In the event of data communication such as connected to a computer, a data signal is input to an input/output processing unit 502, and is converted into an appropriate digital data sequence.

Subsequently, a transmission data processing unit 510 inputs the transmission data sequence, and receives communication control data to be transmitted to a wireless communication apparatus serving as a other party of wireless communication (not shown) from a control unit 504 if necessary, and forms and outputs frame and slot configurations to be transmitted in a wireless zone following the communication control data being multiplexed as appropriate.

Subsequently, a CRC adder 512 adds redundancy for detecting an error on the reception side to the transmission data, and further a cipher device 514 subjects the transmission data to encryption, and outputs this.

Subsequently, a scrambler 516 subjects the transmission data to scrambling so as to form pseudo-random in accordance with a predetermined algorithm. Also, a header generating unit 517 generates a PHY header. The scrambler 516 generates a scrambling initial value using a part of bits of the PHY header generated by the header generating unit 517, but the description thereof will be made later in detail.

Note that with the IEEE802.11a standard, the following generator polynomial is stipulated.

$$S(x) = x^7 + x^4 + 1$$

Subsequently, a encoder 518 subjects the transmission data to the PHY header and convolution encoding, and then an interleaver 520 subjects the transmission data to interleaving. According to this interleaving processing, the coded bit sequence is rearranged in accordance with a particular rule, so on the reception side, a burst error can be converted into a random error by performing the inverse operation thereof, i.e., de-interleaving.

Subsequently, a modulator 522 subjects the transmission data to mapping to signal points at the time of transmission, and outputs inphase components (I components) and orthogonal components (Q components). The OFDM modulation is performed by a complex IFFT unit 524 subjecting the output thereof to inverse FFT.

Subsequently, a time-waveform trimming unit 526 provides guard time by adding a cycle prefix, and subjects the transmission data to window wing processing so as to smooth the rise and decay of the OFDM modulation symbol.

Subsequently, a DA converter 528 converts the transmission data from a digital waveform to an analog waveform, and further an RF transmitter 530 subjects the transmission data to filtering, vector modulation using the I components and Q components, a frequency conversion to an appropriate transmission frequency channel, control of transmission power, amplification, and so forth.

The transmission signal up-converted by the RF transmitter 530 is input to an antenna 534 via an antenna duplexer 532, and finally transmitted from the antenna 134 as an electromagnetic wave. This transmission signal is received by a other party of wireless communication (not shown).

Note that the antenna duplexer 534 is used for separating a transmission signal and a reception signal, an antenna switch is employed in the TDD method and the FDD/TDMA method, and a duplexer is generally employed in the other methods. Now, let us say that an antenna switch is employed because IEEE802.11a of the TDD method is employed as an example.

Each unit of the transmission system is connected to the control unit 504 via a transmission system control line 508. Accordingly, the control unit 504 can perform various operation control and monitoring of the transmission system such as on/off control of the transmission system, operation control and status monitoring of the RF transmitter 530, fine adjustment of transmission timing, modification of an encoding method or signal point mapping method, control of retransmission, and the like via the transmission system control line 508.

Also, FIG. 3 schematically illustrates the functional configuration of a receiver according to an embodiment of the present invention.

The transmission signal from the other party of wireless communication is received at an antenna 634 as an electromagnetic wave. The signal is separated from the own transmission signal at an antenna duplexer 632, following which is input to an RF receiver 640. The RF receiver 640 subjects the reception signal to amplification, attenuation of unnecessary frequency components, selection of a desired frequency channel, frequency conversion, reception signal amplitude level control, vector detection process for separating the I components and the Q components, band limit, and the like, and thus the I components and the Q components of the reception signal are extracted.

An AD converter 642 converts the reception signal down-converted by the RF receiver 640 from an analog waveform to a digital waveform. Subsequently, a synchronization circuit 644 subjects the reception data to frame synchronization, frequency error correction, and the like. Now, in the event of searching a communicable communication other party immediately after the power turns on or the like, detection of a synchronous signal or initial synchronization is performed using this synchronization circuit 644. Various arrangements have been proposed regarding initial synchronization, frame synchronization, frequency error correction, and the like, but these are not directly associated with the essence of the present invention, so further description will not be made in the present specification.

Subsequently, a time-waveform trimming unit 646 subjects the reception data to time waveform trimming so as to remove guard time provided by adding a cycle prefix, following which a complex FFT unit 648 subjects the reception data to FFT to perform the OFDM demodulation.

Subsequently, an equalizer 650 performs equalization using estimation of a transmission path and estimation results. In some cases, the equalizer 650 inputs the information of the synchronization circuit 644, and uses this for estimation of a transmission path, or the like. Note that various arrangements have been proposed as an equalizer, but these are not directly associated with the essence of the present invention, so further description will not be made in the present specification.

The output of the equalizer 650 is input to a demodulator 652, and is subjected to signal point determination to output a reception bit estimation value. Subsequently, the reception data is input to a de-interleaver 654, and is subjected to de-interleaving for rearranging the coded bit sequence in accordance with a particular rule. Subsequently, a decoder 656 performs decoding of error correction codes subjected on the transmission side.

Subsequently, a descrambler 658 subjects the decoded reception data to descrambling, which is inverse conversion of scrambling performed on the transmission side. Also, a header extractor 657 extracts a PHY header from the decoded reception data. The descrambler 658 can yield the same scrambling initial value as the transmitter using a part of the PHY header, but the description thereof will be made later. Note that with the IEEE802.11a standard, the same type of a circuit as the scrambler is employed as the descrambler.

Further, a decipher device 660 deciphers encryption subjected on the transmission side, following which a CRC checking unit 662 outputs the reception data of which a CRC is removed, and the result of a CRC check regarding the reception block.

Subsequently, in the event that determination is made that the result of the CRC check of the reception block has no error, a reception data processing unit 664 removes the frame configuration and slot configuration subjected for transmission in a wireless zone. Subsequently, in the event of data communication such as connected with a computer, a data input/output processing unit 602 converts the reception data into a data signal, and outputs this.

In the event that the reception data includes communication control data transmitted from the other party of wireless communication (not shown), that portion is extracted by the reception data processing unit 664, and is input to the control unit 604 via a reception system control line 606. Subsequently, the control unit 604 interprets the received control data, and performs operation control of each unit within a wireless communication apparatus 600 in accordance with the received instruction.

Each unit of the reception system is connected to the control unit 104 via the reception system control line 106. Accordingly, the control unit 104 can perform various operation control and monitoring of the reception system such as on/off control of the reception system, operation control and status monitoring of the RF receiver 140, fine adjustment of reception timing, modification of an decoding method or signal point mapping method, control of retransmission, and the like via the reception system control line 106.

The present invention is characterized by a method for sharing a scrambling initial value between the transmission side and the reception side. Now, description will be made in detail regarding handling of scrambling and descrambling initial values on the transmission side with reference to FIG. 4 illustrating the configuration of around the scrambler 516 on the transmission side.

Data for generating a header made up of parameters for controlling a physical layer such as an encoding rate is input to the header generator 517 from the control unit 504. The encoder 518 subjects header information generated here to error correction encoding. Following this header information subjected to error correction encoding being created, the transmission data subjected to error correction encoding is linked thereto using a method such as described below.

That is to say, the transmission data is ciphered at the cipher device 514, following which is scrambled by calculating an exclusive-OR operation between the transmission data and a scrambling pattern to be generated with a later-described method at the EXOR 516b within the scrambler 516. The encoder 518 subjects the output thereof to error correction encoding to create the transmission data subjected to error correction encoding.

On the other hand, the header generator 517 creates header information based oh the data for generating a header input from the control unit 504, and outputs this to the encoder 518 and the scrambler 516. A scrambling initial-value generator 516c included in the scrambler 516 generates a scrambling initial value from this header information using any one of later-described various techniques. The scrambling initial value generated is input to a scrambling pattern generator 516a. In fact, the scrambling pattern generator 516a is also a scrambler made up of a shift register such as shown in FIG. 37, the scrambling initial value is set within this register, and a scrambling pattern is generated by the values within the register being shifted in order for each clock.

Here, an example has been shown such that the data for generating a header is once input to the header generator 517 from the control unit 504, where header information is generated, and this is input not only to the encoder 518 but also to the scrambling generator 516c, for the sake of facilitating description, but the essence of the present invention is not restricted to this. For example, an arrangement may be made wherein the scrambling initial-value generating unit 516c directly receives the data for generating a header from the control unit 504, creates header information with the same processing as the header generator 517 based on that, and then a scrambling initial value is created from the header information.

Also, FIG. 5 illustrates the configuration of around the descrambler 658 on the reception side. Following the decoder 656 subjecting the reception data to error correction decoding, the reception data is descrambled by calculating an exclusive-OR operation between the reception data and a descrambling pattern to be generated with a later-described method at an EXOR 658b within the descrambler 658. The output thereof is deciphered at the decipher device 660. In advance of starting descrambling, operation such as the following is performed to yield a descrambling initial value.

That is to say, following the decoder 656 subjecting the header information not scrambled of the reception data to error correction decoding, the parameters for controlling a physical layer is extracted from the header information at the header extractor 657, and at the same time, is input to the descrambling initial-value generator 658c within the descrambler 658. Here, the descrambling initial-value generator 658c generates a descrambling initial value from the input header information using any one of later-described various techniques. The generated descrambling initial value is input to the descrambling pattern generator 658a. In fact, the descrambling pattern generator 658a is also a descrambler made up of a shift register such as shown in FIG. 38, this descrambling initial value is set in this register, and a descrambling pattern is generated by the values within the register being shifted in order for each clock.

FIG. 6 illustrates the internal configuration of a scrambler according to an embodiment of the present invention. A scrambler 220 shown in the drawing comprises two shift registers 224 and 225, and two exclusive-OR circuits 226 and 227, as the basic configuration of a scrambler. The shift registers 224 and 225 make up a 7-bit shift register in conjunction, and hold an internal state as a scrambler. With these shift registers 224 and 225, the output at the 4th stage ($X^4$) and the output at the 7th stage ($X^7$) are input to the exclusive-OR circuit 226. Also, a signal to be scrambled is input to one of the input ports of the exclusive-OR circuit 227. In the event of a normal scrambler, scrambling is performed by the output of the exclusive-OR circuit 226 being supplied to the other input port of the exclusive-OR circuit 227 and the input of the shift register 224.

With this scrambler 220, an arrangement is made wherein a selector 223 is provided between the output of the exclusive-OR circuit 226, one of the input ports of the exclusive-OR circuit 227, and the input of the shift register 224, and any one of the output port of the exclusive-OR 226 and the output of the shift register 222 is connected to one of the input ports of the exclusive-OR circuit 227 and the input of the shift register 224. Here, the shift register 222 is for holding the initial values of the shift registers 224 and 225. For example, a predetermined 7 bits of a signal 620 can be employed as this initial value. This is because the signal 620 is transmitted with a modulation mode having high error tolerance such as BPSK of encoding rate ½, so error-free reception can be expected at the reception device. In particular, in the event of using the lower 7 bits of data length 623, different values are assumed to be set for each packet, which is more preferable.

The control unit 221 provides timing control to the selector 223. The control unit 221 switches the selector 223 such that the output of the shift register 222 is supplied to one of the input ports of the exclusive-OR circuit 227 and the input of the shift register 224 at the timing of a scrambler initialization 651 of a service 650 passing through the exclusive-OR circuit 227. Thus, the value held in the shift register 222 is set as the initial values of the shift registers 224 and 225. Also, the scrambler initialization 651 is 7 bits of "0", so the value held in the shift register 222 is output from the exclusive-OR circuit 227 without any change due to the properties of the exclusive-OR circuit. Subsequently, following the scrambler initialization 651 passing through the exclusive-OR circuit 227, the control unit 221 switches the selector 223 such that the output of the exclusive-OR circuit 226 is supplied to one of the input ports of the exclusive-OR circuit 227 and the input of the shift register 224.

Also, the control unit 221 refers to an initial-value setting flag 211, and in the event that the initial-value setting flag 211 indicates that initial value setting for the scrambler 220 is not performed, the control unit 221 does not perform timing control in sync with the above scrambler initialization 651, and controls the selector 223 such that the output of the exclusive-OR circuit 226 is always supplied to one of the input ports of the exclusive-OR circuit 227 and the input of the shift register 224. In this case, the values held in the exclusive-OR circuits 226 and 227 are employed as a scrambler initial value without any change, and the scrambler initial value is output from the exclusive-OR circuit 227 without any change at the timing of the scrambler initialization 651 passing through the exclusive-OR circuit 227.

Accordingly, even in the event that any state is selected at the selector 223, the scrambler initial value is output at the timing of the scrambler initialization 651 passing through the exclusive-OR circuit 227, so it can be understood that this does not perform operation against the original IEEE802.11a standard.

FIG. 7 illustrates the configuration of a descrambler according to an embodiment of the present invention. A descrambler 270 shown in the drawing comprises, as with the scrambler 220, two shift registers 274 and 275, and two exclusive-OR circuits 276 and 277, as the basic configuration of a descrambler. The shift registers 274 and 275 make up a 7-bit shift register in conjunction, and hold an internal state as a descrambler. With these shift registers 274 and 275, the output at the 4th stage ($X^4$) and the output at the 7th stage ($X^7$) are input to the exclusive-OR circuit 276. Also, a signal to be descrambled is input to one of the input ports of the exclusive-OR circuit 277. Further, the descrambler 270 comprises a selector 273. In the event of a normal descrambler, descrambling is performed by switching the selector 273 such that the signal to be descrambled is supplied to one of the input ports of the exclusive-OR circuit 277 and the input of the shift register 274 at the timing of a signal equivalent to the scrambler initialization 651 passing through the exclusive-OR circuit 277, and switching the selector 223 such that the output of the exclusive-OR circuit 276 is supplied to one of the input ports of the exclusive-OR circuit 277 and the input of the shift register 274.

With this descrambler 270, a shift register 272 is provided, and the output of this shift register 272 is connected to the input of the selector 273. Here, the shift register 272 is for holding the initial values of the shift registers 274 and 275. As for these initial values, for example, a predetermined 7 bits of the signal 620 is available, but it is necessary for between the transmission device and the reception device to determine regarding which bit position is used as a initial value beforehand.

The control unit 271 provides timing control to the selector 273. The control unit 271 switches the selector 273 such that the output of the shift register 272 is supplied to one of the input ports of the exclusive-OR circuit 277 and the input of the shift register 274 at the timing of a signal equivalent to the scrambler initialization 651 of the service 650 passing through the exclusive-OR circuit 277. Thus, the value held in the shift register 272 is set as the initial values of the shift registers 274 and 275. Subsequently, following the signal equivalent to the scrambler initialization 651 passing through the exclusive-OR circuit 277, the control unit 271 switches the selector 223 such that the output of the exclusive-OR circuit 276 is supplied to one of the input ports of the exclusive-OR circuit 277 and the input of the shift register 274.

Also, in the event that the control unit 221 obtains information that setting an initial value to the descrambler is not performed, the control unit 221 does not select the value held in the shift register 272, and switches the selector 273 such that the signal to be descrambled is supplied to one of the input ports of the exclusive-OR circuit 277 and the input of the shift register 274 at the timing of the signal equivalent to the scrambler initialization 651 passing through the exclusive-OR circuit 277. As for the information that setting an initial value is not performed, for example, a parity bit 624 of the signal 620 is available. That is to say, in the event that the initial value is set to the scrambler at the transmission device, an odd parity is applied to the parity bit 624 by inverting an even parity when the header generating unit 210 generates the parity bit 624. Thus, determination can be made regarding whether or not the initial value is set to the scrambler, i.e., regarding whether or not setting the initial value to the descrambler should be performed by checking this parity bit 624 at the reception device.

Thus, by employing predetermined data of the signal 620 having high error tolerance as the initial value of the descrambler, even if an error occurs in signals equivalent to the scrambler initialization 651, descrambling can be performed normally.

Note that FIG. 4 and FIG. 5 focus on the explanations of operation of the scrambler and operation of the descrambler, which are characteristic with the present invention, and for the sake of facilitating the drawings, control lines for connection timing between the control unit and each unit, and on/off control such as shown in FIG. 2 and FIG. 3 are omitted.

Thus, according to the present invention, a scrambling initial value and a descrambling initial value are obtained based on header information, so there is no need to provide a field for notifying the scrambling initial value within a transmission frame, thereby improving data transmission efficiency. Also, the entire data section following the header information can be scrambled, so concealment at the data section can be assured, and also a biased distribution of "0" and "1" within the data can be prevented.

Next, description will be made regarding communication operation according to an embodiment of the present invention with reference to the drawings.

FIG. 8 illustrates the scrambling procedures in the transmission device according to an embodiment of the present invention using a flowchart format.

First, upon an MAC frame being received from a communication control unit 300, with a base-band processing unit 200, the header generating unit 210 generates a PLCP header (Step S911).

In the event that the initial-value setting flag 211 indicates that an initial value is not set to the scrambler (Step S912), the even parity of the signal 620 is generated in accordance with the IEEE802.11a standard to set this to the parity bit 624 (Step S913). Subsequently, the values held in the shift registers 224 and 225 within the scrambler 220 are used as an internal state without any change (Step S914) to perform scrambling (Step S917).

On the other hand, in the event that the initial-value setting flag 211 indicates that an initial value should be set to the scrambler (Step S912), the odd parity of the signal 620 is generated, or the even parity is generated and inverted to set this to the parity bit 624 (Step S915). Subsequently, the value held in the shift register 222 is set as an initial value to the shift registers 224 and 225 which hold the internal state within the scrambler 220 (Step S916) to perform scrambling (Step S917).

FIG. 9 illustrates the descrambling procedures in the reception device according to an embodiment of the present invention using a flowchart format.

First, upon a convolution-code decoder 260 decoding a reception packet received from demodulation unit 250, a header analyzing unit 280 analyzes the PLCP header (Step S921). Subsequently, the header analyzing unit 280 checks regarding whether or not the parity bit 624 in the signal 620 is the even parity conforming to the IEEE802.11a standard (Step S922).

In Step S922, in the event that determination is made that the parity bit 624 is the even parity conforming to the IEEE802.11a standard, the control unit 271 switches the selector 273 such that the signal to be descrambled is supplied to one of the input ports of the exclusive-OR circuit 277 and the input of the shift register 274 as an initial value in accordance with the standard at the timing of the signal equivalent to the scrambler initialization 651 passing through the exclusive-OR circuit 277 (Step S924). Subsequently, following the signal equivalent to the scrambler initialization 651 passing through the exclusive-OR circuit 277, the control unit 271 switches the selector 223 such that the output of the exclusive-OR circuit 276 is supplied to one of the input ports of the exclusive-OR circuit 277 and the input of the shift register 274, and descrambling is performed (Step S927).

On the other hand, in Step S922, in the event that determination is made that the parity bit 624 is the odd parity, the control unit 271 switches the selector 273 such that the output of the shift register 272 is supplied to one of the input ports of the exclusive-OR circuit 277 and the input of the shift register 274 at the timing of the signal equivalent to the scrambler initialization 651 passing through the exclusive-OR circuit 277 to set an initial value (Step S926). Subsequently, following the signal equivalent to the scrambler initialization 651 passing through the exclusive-OR circuit 277, the control unit 271 switches the selector 223 such that the output of the exclusive-OR circuit 276 is supplied to one of the input ports of the exclusive-OR circuit 277 and the input of the shift register 274 and descrambling is performed (Step S927). Note that in this case, in the event of referring to the parity bit 624 at the subsequent processing, the odd parity is preferably changed to the even parity at this stage.

Thus, according to the present embodiment, synchronization between the scrambler 220 and the descrambler 270 can be realized with higher error tolerance by using a part of the signal 620 having high error tolerance as the initial value of the internal state of the scrambler 220. Also, the initial value of the descrambler 270 in the reception device can be appropriately selected by including that setting of an initial value is performed in a part of the signal 620, and transmitting this to the scrambler 220.

Note that the communication system according to the present embodiment does not perform operation violating the rules on the specifications. At the timing of transmission of the signal equivalent to the scrambler initialization 651, the initial value to be set as the internal state of the descrambler 270 is transmitted, thereby assuring operation in accordance with the specifications. Also, even in the event that a communication apparatus other than communication parties concerned receives this signal, the reception packet is only discarded due to a parity error, so any defect exceeding this is not caused.

Next, description will be made regarding a modification example of the embodiment of the present invention with reference to the drawings.

FIG. 10 illustrates a first modification example of the embodiment of the present invention. With the first modification example shown in the drawing, two types of the descramblers 270 and 290 are provided in parallel on the output side of the convolution-code decoder 260 in the reception device. The descrambler 270 is a descrambler such as shown in FIG. 6, and allows an initial value to be set using the shift register 272. On the other hand, the descrambler 290 is a conventional descrambler such as shown in FIG. 11.

The basic configuration as a descrambler shown in FIG. 11 is the same as the descrambler 270 shown in FIG. 5 in that two shift registers 294 and 295, and two exclusive-OR circuits 296 and 297. A control unit 291 switches a selector 293 such that a signal to be descrambled is supplied to one of the input ports of the exclusive-OR circuit 297 and the input of the shift register 294 at the timing of a signal equivalent to the scrambler initialization 651 of the service 650 passing through an exclusive-OR circuit 277. Subsequently, following the signal equivalent to the scrambler initialization 651 passing through the exclusive-OR circuit 297, the control unit 291 switches the selector 293 such that the output of the exclusive-OR circuit 296 is supplied to one of the input ports of the exclusive-OR circuit 297 and the input of the shift register 294.

In FIG. 10, an error determining unit 305 analyzes regarding whether or not each field of the output of the descramblers 270 and 290 satisfies the range stipulated on the specifications. For example, with the example shown in FIG. 35, following the SIGNAL field of the PHY header, the Service field of 16 bits continues, and of these 16 bits, 7 bits from the MSB side are used for transmission of the initial value of scrambling, and the residual 9 bits following these bits, serving as reserved bits, are stipulated to be set with all zeroes with the current specifications. Consequently, the descrambled result thereof must become all zeroes. Accordingly, the output of the descrambler indicating that these reserved bits are all zeroes is determined as reasonable output.

Also, as for the PSDU, the validity of the content thereof is supposed to be determined in light of correction ability of a block-code decoder 320, but determination may be made using an error determining unit 305 in a state prior to correction. For example, as shown in FIG. 12, the MAC header is appended to the MAC frame, which is the content of the PSDU, and each field of the MAC header includes predetermined data. For example, various types of control information are included in the frame control 710 of the headmost of the MAC header, and the protocol version 711 of the headmost two bits thereof indicates the version of the MAC protocol. This protocol version 711 makes a rule of setting two bits of the value "0", and the values other than this are reserved for the future use. Accordingly, in the event that this protocol version includes the value other than two bits of "0", it can be determined that this cannot satisfy the range stipulated on the specifications. Note that as for the determining method using the PSDU mentioned here, an arrangement may be made wherein determination is made using a signal following the processing by the block-code decoder 320.

Similarly, as for the type 712 as well, two bits of the value "1" are reserved for the future use, so in the event that this type 712 includes two bits of the value "1", it can be determined that this cannot satisfy the range stipulated on the specifications. Also, as for the subsequent subtype 713 as well, reserved bit patterns exist according to a combination with the type 712.

Accordingly, in the event that the initial value different from the scrambler 220 is set to any one of the descramblers 270 and 290, there is the possibility that each field of the descrambled output cannot satisfy the range stipulated on the specifications. The error determining unit 305 identifies such a field deviated from the range stipulated on the specifications, and controls a selector 303 such that of the descramblers 270 and 290, such output not deviated is supplied to the block-code decoder 320. Note that delay units 307 and 309 are for holding the output of the scramblers 270 and 290 during a period necessary for determination at the error determining unit 305, and can be realized with a delay line, shift register, and so forth.

For example, in the event that an initial value is not set to the scrambler 220 on the transmission device side, it can be conceived that the output of the descrambler 290 becomes correct, and the output of the descrambler 270 becomes incorrect. This is because data sequences subjected to descrambling with different initial values can be regarded as almost random, and it can be conceived that possibility to deviate the range stipulated on the specifications is high. Also, in the event that an initial value is set to the scrambler 220 on the transmission device side, the same initial value is set to the descramblers 270 and 290 if an error does not occur. However, a signal equivalent to the scrambler initialization 651 is relatively low in error tolerance, there is the possibility that an initial value to be set to the descrambler 290 includes an error. In such a case, the output of the descrambler 270 becomes correct, and the output of the descrambler 290 becomes incorrect, and accordingly, the error determining unit 305 performs control so as to select the output of the descrambler 270.

Thus, with the first modification example, an initial value can be selected by determination at the reception device side without notifying information regarding setting of an initial value using the parity bit 624 or the like by providing the descrambler 270 which takes a part of the signal 620 as an initial value, and the descrambler 290 which takes a signal equivalent to the scrambler initialization 651 as an initial value in parallel, and determining regarding whether or not each field of the output thereof satisfies the range stipulated on the specifications.

FIG. 13 illustrates a second modification example of the embodiment of the present invention. With the second modification example shown in the drawing, the two same-type descramblers 270 are provided in parallel on the output side of the convolution-code decoder 260 in the reception device. Let us say that these descramblers 270 take a part of the signal 620 as an initial value respectively, but are mutually different regarding which bit position is employed as an initial value. For example, if we say that two types of bit positions are stipulated on the transmission side beforehand, and then the value of any one of the bit positions is employed as an initial value depending on a radio wave status at the time of transmission, the two descramblers 270 are set so as to take the values of these two types of bit positions as initial values on the reception device side respectively, and then descrambling is performed.

The error determining unit 305 analyzes, as with the case of the above first modification example, regarding whether or not each field of the output of the two descramblers 270 satisfies the range stipulated on the specifications. Let us say that the two descramblers 270 perform descrambling with a different initial value respectively, so the output thereof is also different. Accordingly, any one of the output of the two descramblers 270 becomes correct, and the other output becomes incorrect, so the error determining unit 305 performs control so as to select the output of the descramblers 270 which is correct on the specifications.

Thus, with this second modification example, the two descramblers 270 which take the value of a different bit position of the signal 620 as an initial value respectively are provided in parallel, and determination is made regarding whether or not the output of each field thereof satisfies the range stipulated on the specifications, whereby the bit position can be selected based on the determination of the transmission device side, and an initial value can be selected based on the determination of the reception device side without notifying the information relating to the setting of an initial value using the parity bit 624 or the like.

B. Methods for Generating a Scrambling Initial Value and a Descrambling Initial Value Hereinafter, description will be made regarding methods for generating a scrambling initial value and a descrambling initial value, which are characteristic portions with the present invention. Let us say that with this description, physical layer header information such as shown in FIG. 14 is employed as header information. This is equivalent to the residual obtained by removing the Service field from the physical layer header of IEEE802.11a shown in FIG. 35. Also, let us say that an scrambling initial value and an descrambling initial value are each made up of 7 bits.

Any one of later-described methods for generating a scrambling initial value and a descrambling initial value generates a scrambling initial value and a descrambling initial value based on physical layer header information. Accordingly, the Service field for notifying a scrambling initial value, such as shown in FIG. 35, becomes unnecessary. Consequently, a user can use the 16 bits used for the Service field of the data section, thereby improving data transmission efficiency. Also, this allows the entire data section to be scrambled. However, the essence of the present invention is not restricted to the configuration shown in FIG. 5.

B-1. Method 1 for Generating a Scrambling Initial Value and a Descrambling Initial Value FIG. 15 illustrates a first method for generating a scrambling initial value and a descrambling initial value based on physical layer header information.

This method utilizes that the SIGNAL field is not scrambled, extracts 7 bits from a predetermined place within the SIGNAL field, set these to the scrambler as an initial value for scrambling, and then scrambles and transmits the Data section. With the example shown in FIG. 15, of the SIGNAL field, 7 bits are extracted from the MSB to the 7th bit in the LENGTH field, and these are employed as a scrambling initial value.

Also, following the SIGNAL field not scrambled being decoded, the reception side first extract 7 bits from a predetermined place of the relevant field in the same way, sets these to the descrambler as a descrambling initial value, and then starts descrambling of the DATA section. With the example shown in FIG. 15, of the SIGNAL field, 7 bits are extracted from the MSB to the 7th bit in the LENGTH field, and these are employed as a scrambling initial value.

B-2. Method 2 for Generating a Scrambling Initial Value and a Descrambling Initial Value In the event of generating a scrambling initial value using the above generating method 1, unless a method for extracting 7 bits from the physical header information is determined carefully, there is the possibility that the 7 bits of that portion happen to be all zeroes, depending on the data contents. Even if all zero bits are employed as a scrambling initial value, this is output as the original data sequence without scrambling, so this is inappropriate for a scrambling initial value, which must be avoided.

Accordingly, in the event that a field which is assured not to be all zeroes exists in physical layer header information, a method can be conceived wherein both a transmitter and a receiver comply with the agreement such that the relevant bit field is included in 7 bits making up a scrambling initial value.

For example, with IEEE802.11a, the RATE field serving as a place indicating a modulation mode is provided in the physical header information (see FIG. 14), and a method for describing the RATE field is stipulated such as shown in Table 1.

[Table 1]

According to Table 1, even if any specified transmission rate is selected between transmission and reception, it is assured that the RATE field does not become all zeroes. Accordingly, if the same bit assignment as the RATE field is employed, the value obtained by mixing all values of this RATE field (4 bits) with the other field or a fixed value is taken as scrambling and descrambling initial values, whereby it can be assured that these initial values do not become all zeroes.

FIG. 16 illustrates a second method for generating a scrambling initial value and a descrambling initial value based on physical layer header information. With the example shown in the drawing, of the SIGNAL field, 4 bits of the RATE field, and subsequently, 3 bits from the MSB of the LENGTH field are extracted respectively, and the value obtained by linking these bits is used as a scrambling initial value and descrambling initial value. According to such a initial value, at least 4 bits from the MSB of the 7 bits do not become all zeroes, so operation of the scrambler can be assured.

B-3. Method 3 for Generating a Scrambling Initial Value and a Descrambling Initial Value As described with the above section B-2, all zeroes are inappropriate for a scrambling initial value, which must be avoided. However, there is no guarantee that a field which does not become all zeroes always exists, depending on the configuration of the physical layer header section, a case can be conceived wherein a method for generating a scrambling initial value by linking bits extracted from a physical layer header section cannot be used. As for a method for handling such a case, an example such as the following can be conceived.

That is to say, the transmission side extracts 7 bits from a predetermined place of the SIGNAL section, and performs scrambling using the extracted bits as a scrambling initial value in the event that the extracted bits are not all zeroes. On the other hand, in the event that the 7 bits extracted from the SIGNAL section happen to be all zeroes, let us say that the transmission side performs scrambling using a certain scrambling initial value of 7 bits (e.g., "0101111") other than all zeroes.

Similarly, the reception side first decodes the SIGNAL section not scrambled, extracts 7 bits from a predetermined place, and starts descrambling using these as a descrambling initial value in the event that these are not all zeroes, but in the event that these happen to be all zeroes, the reception side determines that a certain scrambling initial value of 7 bits (e.g., "0101111") other than all zeroes is used for scrambling, and performs descrambling using this.

FIG. 17 illustrates a third method for generating a scrambling initial value and a descrambling initial value based on physical layer header information. With the example shown in the drawing, of the SIGNAL field, 7 bits from the MSB of the LENGTH field are extracted, and employs these as a scrambling initial value and a descrambling initial value in the event that these are other than all zeroes. On the other hand, in the event that the 7 bits extracted from the MSB of the LENGTH field happen to be all zeroes, "0101111" which is provided beforehand is employed as a scrambling initial value and a descrambling initial value, thereby preventing the initial values from becoming all zeroes.

B-4. Method 4 for Generating a Scrambling Initial Value and a Descrambling Initial Value As described with the above section B-2, all zeroes are inappropriate for a scrambling initial value, which must be avoided, but there is no guarantee that a field which does not become all zeroes always exists, depending on the configuration of the physical layer header section, a case can be conceived wherein a method for generating a scrambling initial value by linking bits extracted from a physical layer header section cannot be used. As for a method for handling such a case, though the method shown in the above section B-3 is available, with this section, description will be made regarding the other method.

That is to say, in the event that a scrambling initial value is n bits in length (wherein n is a natural number), the transmission side extracts (n−k) bits from the physical layer header section or a part thereof based on a rule common between the transmission side and the reception side (wherein k is a natural number smaller than n), generates a scrambling initial value by inserting a k-bit bit sequence known between the transmission side and the reception side in the extracted bit sequence of the (n−k) bits in a pattern known between the transmission side and the reception side, and then performs scrambling using this scrambling initial value. Here, a bit sequence of which at least one bit is logic "1" is employed for the known k bits to be inserted in the extracted bit sequence of the (n−k) bits, thereby preventing the initial value from becoming all zeroes.

Similarly, the reception side first decodes the SIGNAL section not scrambled, extracts (n−k) bits from the transmission data within the physical layer header or a part thereof based on a rule commonly known between the transmission side and the reception side, and inserts a k-bit sequence such as at least one bit thereof is logic "1" in the extracted bit sequence of the above (n−k) bits in a pattern known between the transmission side and the reception side, and thus, generates a descrambling initial value, and consequently, restores the reception data sequence by performing descrambling.

Here, as long as k is a natural number satisfying 0<k<n, any value can be assigned to k principally, but if a great value is assigned to k, the width of a value to be taken as a scrambling initial value narrows, which is not preferable. Accordingly, in order to assure of preventing a scrambling initial value from becoming all zeroes, the lowest limit k=1 is preferable.

FIG. 18 illustrates a fourth method for generating a scrambling initial value and a descrambling initial value based on physical layer header information. With the example shown in the drawing, k=1 is assigned. With the example shown in the drawing, only 6 bits from the MSB of the LENGTH field within the SIGNAL field are extracted, these are employed for 6 bits from the LSB side of a scrambling initial value, and the residual one bit is employed for the MSB of the scrambling initial value as the fixed value of 1, thereby preventing the scrambling initial value from becoming all zeroes.

In the event of inserting such a fixed bit, the place of the fixed value one bit of "1" does not need to be the MSB, so any bit position of the initial value of 7 bits may be available. That is to say, both the transmitter and the receiver should comply with the agreement for inserting the fixed value "1" in the same place at the stage of system design, so the bit insertion position is not restricted to that shown in the drawing.

B-5. Method 5 for Generating a Scrambling Initial Value and a Descrambling Initial Value So far description has been made regarding the methods for generating a scrambling initial value based on the bit pattern extracted from physical layer header information, but methods other than those methods can be conceived wherein a scrambling initial value is generated while preventing all zeroes based on physical layer header information.

As an example thereof, a method can be conceived wherein a scrambling initial value is generated based on the number of logics "1" included in physical layer header information. FIG. 19 illustrates a fifth method for generating a scrambling initial value and a descrambling initial value based on physical layer header information. The example shown in the drawing illustrates a case wherein the Reserve field is taken as zero, and 100 bytes are transferred by BPSK R1/2.

In this case, the RATE field becomes "1101", and the LENGTH field becomes "001001100000", and accordingly, so far the number of logics "1" in the bit fields is 6, and in the event of performing even parity, the PARITY field is set with "0". Accordingly, the number of logics "1" on the entire SIGNAL field is 6, and in the event of representing this with 7 bits in binary, this becomes "0000110". Let us say that this is employed as the scrambling initial value, the transmitter side sets this as the initial value of $X^1$ through $X^7$ as described within the scrambler and descrambler of the top of FIG. 19, and performs scrambling.

Also, the reception side first decodes the SIGNAL section not scrambled in the same way, counts the number of logics "1" in the SIGNAL field following decoding, and employs the value obtained by representing the number thereof with 7 bits in binary as the descrambling initial value. With the example shown in FIG. 19, the reception side sets "0000110" as the initial value of $X^1$ through $X^7$ as described within the scrambler and descrambler, and starts descrambling.

Such as the embodiment shown in the drawing, in the event of employing bit assignment of the RATE field and the LENGTH field such as defined in IEEE802.11a, the number of logics "1" must be one or more, which is very convenient for using as scrambling initialization.

Incidentally, with the above description, the physical layer header information similar to IEEE802.11a is assumed to be employed, the number of logics "1" is not more than 24 even including the TAIL section which must be all zeroes. The initial value of the scrambler used here as an example is 7-bit width, and accordingly, can handle the number of logics "1" up to 127, which is not miscarried. However, if the number of bits of the physical layer header information is 127 or more, and in the event that the scrambling initial value is 7-bit width, a problem is caused wherein upon the number of logics "1" being simply counted within the entire physical layer header information, bit width comes short.

This problem can be handled with methods wherein in order to handle this problem, in the event of counting logic "1" within the physical layer header, the number of logics "1" is counted only regarding a predetermined number of bit portions of 127 or less (defined commonly between the transmission side and the reception side) without employing the entire portion, a value obtained by representing the counted result in binary is employed as the scrambling initial value, or following the number of logics "1" of the entire portion being counted, the obtained number is divided by $2^7=128$ (here, 7th root is a value determined by the bit width of the scrambling/descrambling initial value), and then the remainder thereof is employed as the scrambling initial value, and these methods are also encompassed in the essence of the present invention.

B-6. Method 6 for Generating a Scrambling Initial Value and a Descrambling Initial Value In the event of generating a scrambling initial value using a method such as described in the above section B-5, a problem is not caused in the event of assuring that the number of logics "1" does not become all zeroes by the definition of the physical header information, but if this is not assured, there is the possibility that the scrambling initial value becomes all zeroes. To this end, description will be made regarding a method for preventing all zeroes by expanding the rule of generating a scrambling initial value in this section.

Let us determine that the number of logics "1" within physical layer header information is counted, and in the event that the number is not zero, for example, a value obtained by representing the number thereof with 7 bits in binary is taken as the scrambling initial value, and scrambling is performed, but in the event that the number of logics "1" happens to be zero, scrambling is performed using a certain scrambling initial value of 7 bits (e.g., "0101111") other than all zeroes.

Similarly, the reception side first decodes the physical layer header section not scrambled, counts the number of logics "1" within the physical layer header information, and in the event that the number is not zero, takes a value obtained by representing the number thereof with 7 bits in binary as the descrambling initial value, and starts descrambling, but in the event that the number of logics "1" happens to be zero, the reception side determines that scrambling is performed using a certain scrambling initial value of 7 bits (e.g., "0101111") other than all zeroes, and performs descrambling using this.

FIG. 20 illustrates a sixth method for generating a scrambling initial value and a descrambling initial value based on physical layer header information using an expanded rule for preventing all zeroes. With the example shown in the drawing, the number of logics "1" of the SIGNAL field is counted, and in the event that the number thereof is not zero, scrambling is performed taking a value obtained by representing the number thereof with 7 bits in binary as the scrambling initial value. On the other hand, in the event that the number of logics "1" happens to be all zeroes, the initial value is prevented from becoming all zeroes by employing previously provided "0101111" as the scrambling initial value and the descrambling initial value.

B-7. Method 7 for Generating a Scrambling Initial Value and a Descrambling Initial Value All zeroes are inappropriate for a scrambling initial value, which should be prevented, but depending on the configuration of the physical layer header section, a case can be conceived wherein no field which does not take all zeros exists, and accordingly the method for generating a scrambling initial value described at the above section B-5 cannot be used. A method such as the method described with the previous section B-6 is available as one of the methods for preventing this, but with this section, description will be made regarding the other method.

That is to say, in the event that a scrambling initial value is n bits in length (wherein n is a natural number), the transmission side generates a scrambling initial value by counting the number of logics "1" included in the transmission data within a physical layer header or a part thereof, and inserting an m-bit bit sequence known between the transmission side and the reception side in the bit sequence obtained by representing the counted value with (n−m) bits (wherein m is a natural number smaller than n) in binary in a pattern known between the transmission side and the reception side, and then performs scrambling using this scrambling initial value. Here, a bit sequence of which at least one bit is logic "1" is employed for the m bits to be inserted in the bit sequence of the (n−m) bits, thereby preventing the scrambling initial value from becoming all zeroes.

Also, the reception side similarly counts the number of logics "1" included in the transmission data within the received physical layer header or a part thereof, performs descrambling taking a value obtained by inserting an m-bit bit sequence of which at least one bit is logic "1" known between the transmission side and the reception side in the bit sequence obtained by representing the counted value with (n−m) bits in binary in a pattern known between the transmission side and the reception side as the descrambling initial value, and thus, restores the reception data.

Here, as long as m is a natural number satisfying $0<m<n$, any value can be assigned to m principally, but if a great value is assigned to m, the width of a value to be taken as a scrambling initial value narrows, which is not very preferable. Accordingly, in order to assure of preventing a scrambling initial value from becoming all zeroes, the lowest limit m=1 is preferable.

FIG. 21 illustrates a seventh method for generating a scrambling initial value and a descrambling initial value based on physical layer header information. With the example shown in the drawing, m=1 is assigned. With the example shown in the drawing, the number of logics "1" of the physical layer header information is 6, "000110" obtained by representing the number thereof with 6 bits in binary is employed as 6 bits from the LSB side of the scrambling initial value, and the residual one bit is employed for the MSB of the scrambling initial value as the fixed value of 1.

In the event of inserting such a fixed bit, the place of the fixed value "1" of one bit may be any bit position of the initial value of 7 bits. That is to say, both the transmitter and the receiver should comply with the agreement for inserting the fixed value "1" in the same place at the stage of system design, so the bit insertion position is not restricted to that shown in the drawing.

B-8. Method 8 for Generating a Scrambling Initial Value and a Descrambling Initial Value All zeroes are inappropriate for a scrambling initial value, which should be prevented, but depending on the configuration of the physical layer header section, a case can be conceived wherein no field which does not take all zeros exists, and accordingly the method for generating a scrambling initial value based on the bit sequence extracted from the physical header section cannot be used (the same as above). With this section, description will be made regarding the other method to prevent this problem.

That is to say, in the event that a scrambling initial value is n bits in length (wherein n is a natural number), the transmission side counts the number of logics "1" included in the transmission data within a physical layer header or a part thereof, adds x commonly known between the transmission side and the reception side (wherein x is a natural number smaller than $2^n$) to the counted number, and then performs scrambling taking a bit sequence obtained by representing the result with n bits in binary as the scrambling initial value.

Also, the reception side similarly counts the number of logics "1" included in the transmission data within the received physical layer header or a part thereof, adds x commonly known between the transmission side and the reception side (wherein x is a natural number smaller than $2^n$) to the counted number, and then performs descrambling taking a bit sequence obtained by representing the result with n bits in binary as the descrambling initial value, and thus, restores the reception data.

Here, if we say that the number of the total bits of the transmission data within the physical layer header is b0, and the bit width of the scrambling initial value and the descrambling initial value is s, satisfying $b0+x \leq 2^s$ is preferable. Otherwise, there is the possibility that the generated scrambling initial value and descrambling initial value become all zero due to carryover of a digit.

In this case, let us say that the number of logics "1" is not counted regarding the entire bits of the transmission data within the physical layer header, but the number of logics "1" is counted regarding a part thereof b1 (assuming that the place to be counted have been mutually understood between the transmission side and the reception side), and b1 should be determined so as to satisfy $b1+x \leq 2^s$. Alternatively, the above case can be handled using a method wherein following the number of logics "1" being counted regarding the entirety, x is added to this, the obtained number is divided by $2^s$, and then the reminder thereof is employed as the scrambling initial value. These mentioned methods are also encompassed in the scope of the essence the present invention.

Here, as long as x is a natural number satisfying $0<x<2^n$, any value can be assigned to x principally, but if a great value is assigned to x, the width of a value to be taken as a scrambling initial value narrows, which is not very preferable. Accordingly, in order to assure of preventing a scrambling initial value from becoming all zeroes, the lowest limit x=1 is preferable.

FIG. 22 illustrates an eighth method for generating a scrambling initial value and a descrambling initial value based on physical layer header information. With the example shown in the drawing, x=1 is assigned. With the example shown in the drawing, the number of logics "1" included in the physical layer header information is 6, this value is added to "1" to obtain 7, 7 is represented with 7 bits width in binary to obtain "0000111", and this "0000111" is taken as the scrambling initial value.

Also, the reception side can determine that the number of logics "1" included in the received physical layer header information is 6 in the same way, so this value is added to "1" to obtain 7, 7 is represented with 7 bits width in binary to obtain "0000111", performs descrambling taking this "0000111" as the descrambling initial value, and consequently, restores the reception data.

B-9. Method 9 for Generating a Scrambling Initial Value and a Descrambling Initial Value With the above section B-5, a scrambling initial value and a descrambling initial value are generated from the number of logics "1", but inversely, a method for generating a scrambling initial value and a descrambling initial value using the number of logics "0" exists.

FIG. 23 illustrates a ninth method for generating a scrambling initial value and a descrambling initial value based on the number of logics "0" within the physical layer header information. The example shown in the drawing illustrates a case wherein the Reserve field is zero, and 100 bytes are transferred by BPSK R1/2.

In this case, the RATE field becomes "1101", and the LENGTH field becomes "001001100000", so that so far the number of logics "1" in the bit fields is 6, and in the event of performing even parity, the PARITY field is set to "0". Accordingly, the number of logics "0" on the entire SIGNAL field is 18, and if this is represented with 7 bits in binary, this becomes "0010010". Let us say that this is employed as the scrambling initial value, the transmitter side sets this as the initial value of $X^1$ through $X^7$ as described within the scrambler and descrambler of the top of FIG. 23, and performs scrambling.

Also, the reception side first decodes the SIGNAL section not scrambled in the same way, counts the number of logics "0" in the SIGNAL field following decoding, and employs the value obtained by representing the number thereof 18 with 7 bits in binary as the descrambling initial value. With the example shown in FIG. 23, the reception side sets "0010010" as the initial value of $X^1$ through $X^7$ as described within the scrambler and descrambler, and starts descrambling.

Such as the embodiment shown in the drawing, in the event of employing bit assignment of the RATE field and the LENGTH field such as defined in IEEE802.11a, the number of logics "1" must be one or more, which is very convenient for using as scrambling initialization.

Incidentally, with the above description, the physical layer header information similar to IEEE802.11a is assumed to be employed, the number of logics "0" is not more than 24 even including the TAIL section which must be all zeroes. The initial value of the scrambler used here as an example is 7-bit width, and accordingly, can handle the number of logics "0" up to 127, which is not miscarried. However, if the number of bits of the physical layer header information is 127 or more, and in the event that the scrambling initial value is 7-bit width, a problem is caused wherein upon the number of logics "0" being simply counted within the entire physical layer header information, bit width comes short.

This problem can be handled with methods wherein in order to handle this problem, in the event of counting logic "0" within the physical layer header, the number of logics "0" is counted only regarding a predetermined number of bit portions of 127 or less (defined commonly between the transmission side and the reception side) without employing the entire portion, a value obtained by representing the counted result in binary is employed as the scrambling initial value, or following the number of logics "0" of the entire portion being counted, the obtained number is divided by $2^7=128$ (here, 7th root is a value determined by the bit width of the scrambling/descrambling initial value), and then the remainder thereof is employed as the scrambling initial value, and these methods are also encompassed in the essence of the present invention.

B-10. Method 10 for Generating a Scrambling Initial Value and a Descrambling Initial Value In the event of generating a scrambling initial value using a method such as described with the above B-9, a problem is not caused in the event of assuring that the number of logics "0" does not become all zeroes by the definition of the physical header information, but if this is not assured, there is the possibility that the scrambling initial value becomes all zeroes. To this end, description will be made regarding a method for preventing all zeroes by expanding the rule of generating a scrambling initial value with this section.

Let us determine that the number of logics "0" within physical layer header information is counted, and in the event that the number is not zero, for example, a value obtained by representing the number thereof with 7 bits in binary is taken as the scrambling initial value, and scrambling is performed, but in the event that the number of logics "0" happens to be zero, scrambling is performed using a certain scrambling initial value of 7 bits (e.g., "0101111") other than all zeroes.

Similarly, the reception side first decodes the physical layer header section not scrambled, counts the number of logics "0" within the physical layer header information, and in the event that the number is not zero, takes a value obtained by representing the number thereof with 7 bits in binary as the descrambling initial value, and starts descrambling, but in the event that the number of logics "0" happens to be zero, the reception side determines that scrambling is performed using a certain scrambling initial value of 7 bits (e.g., "0101111") other than all zeroes, and performs descrambling using this.

FIG. 24 illustrates a tenth method for generating a scrambling initial value and a descrambling initial value based on physical layer header information using an expanded rule for preventing all zeroes. With the example shown in the drawing, the number of logics "0" of the SIGNAL field is counted, and in the event that the number thereof is not zero, scrambling is performed taking a value obtained by representing the number thereof with 7 bits in binary as the scrambling initial value. On the other hand, in the event that the number of logics "0" happens to be all zeroes, the initial value is prevented from becoming all zeroes by employing previously provided "0101111" as the scrambling initial value and the descrambling initial value.

B-11. Method 11 for Generating a Scrambling Initial Value and a Descrambling Initial Value All zeroes are inappropriate for a scrambling initial value, which should be prevented. However, depending on the configuration of a physical layer header section, a case can be conceived wherein the number of logics "0" is not assured not to become zero, and accordingly the method for generating a scrambling initial value described at the above section B-9 cannot be used. A method such as the method described with the previous section B-10 is available as one of the methods for preventing this, but with this section, description will be made regarding another method.

That is to say, in the event that a scrambling initial value is n bits in length (wherein n is a natural number), the transmission side generates a scrambling initial value by counting the number of logics "0" included in the transmission data within a physical layer header or a part thereof, and inserting an h-bit sequence known between the transmission side and the reception side in the bit sequence obtained by representing the counted value with (n−h) bits (wherein h is a natural number smaller than n) in binary in a pattern known between the transmission side and the reception side, and then performs scrambling using this scrambling initial value. Here, a bit sequence of which at least one bit is logic "0" is employed for the h bits to be inserted in the bit sequence of the (n−h) bits, thereby preventing the initial value from becoming all zeroes.

Also, the reception side similarly counts the number of logics "1" included in the transmission data within the received physical layer header or a part thereof, performs descrambling taking a value obtained by inserting an m-bit sequence of which at least one bit is logic "1" known between the transmission side and the reception side in the bit sequence obtained by representing the counted value with (n−m) bits in binary in a pattern known between the transmission side and the reception side as the descrambling initial value, and thus, restores the reception data.

Here, as long as h is a natural number satisfying 0<h<n, any value can be assigned to h principally, but if a great value is assigned to h, the width of a value to be taken as a scrambling initial value narrows, which is not very preferable. Accordingly, in order to assure of preventing a scrambling initial value from becoming all zeroes, the lowest limit h=1 is preferable.

FIG. 25 illustrates an eleventh method for generating a scrambling initial value and a descrambling initial value based on physical layer header information. With the example shown in the drawing, h=1 is assigned. With the example shown in the drawing, the number of logics "0" of the physical layer header information is 18, "010010" obtained by representing the number thereof with 6 bits in binary is employed as 6 bits from the LSB side of the scrambling initial value, and the residual one bit is employed for the MSB of the scrambling initial value as the fixed value of 1.

In the event of inserting such a fixed bit, the place of the fixed value "1" of one bit may be any bit position of the initial value of 7 bits. That is to say, both the transmitter and the receiver should comply with the agreement for inserting the fixed value "1" in the same place at the stage of system design, so the bit insertion position is not restricted to that shown in the drawing.

B-12. Method 12 for Generating a Scrambling Initial Value and a Descrambling Initial Value All zeroes are inappropriate for a scrambling initial value, which should be prevented. However, depending on the configuration of a physical layer header section, a case can be conceived wherein the number of logics "0" is not assured not to become zero, and accordingly the method for generating a scrambling initial value described at the above section B-9 cannot be used (the same as above). With this section, description will be made regarding the other method to prevent this problem.

That is to say, in the event that a scrambling initial value is n bits in length (wherein n is a natural number), the transmission side counts the number of logics "0" included in the transmission data within a physical layer header or a part thereof, adds y commonly known between the transmission side and the reception side (wherein y is a natural number smaller than $2^n$) to the counted number, and then performs scrambling taking a bit sequence obtained by representing the result with n bits in binary as the scrambling initial value.

Also, the reception side similarly counts the number of logics "0" included in the transmission data within the received physical layer header or a part thereof, adds y commonly known between the transmission side and the reception side (wherein y is a natural number smaller than $2^n$) to the counted number, and then performs descrambling taking a bit sequence obtained by representing the result with n bits in binary as the descrambling initial value, and thus, restores the reception data.

Here, if we say that the number of the total bits of the transmission data within the physical layer header is b0, and the bit width of the scrambling initial value and the descrambling initial value is s, satisfying $b0+y \leq 2^s$ is preferable. Otherwise, there is the possibility that the generated scrambling initial value and descrambling initial value become all zero due to carryover of a digit.

In this case, let us say that the number of logics "0" is not counted regarding the entire bits of the transmission data within the physical layer header, but the number of logics "0" is counted regarding a part thereof b1 (assuming that the place to be counted have been mutually understood between the transmission side and the reception side), and b1 should be determined so as to satisfy $b1+y \leq 2^s$. Alternatively, the above case can be handled using a method wherein following the number of logics "0" being counted regarding the entirety, y is added to this, the obtained number is divided by $2^s$, and then the reminder thereof is employed as the scrambling initial value. These mentioned methods are also encompassed in the scope of the essence of the present invention.

Here, as long as y is a natural number satisfying $0<y<2^n$, any value can be assigned to y principally, but if a great value is assigned to y, the width of a value to be taken as a scrambling initial value narrows, which is not very preferable. Accordingly, in order to assure of preventing a scrambling initial value from becoming all zeroes, the lowest limit y=1 is preferable.

FIG. 26 illustrates a twelfth method for generating a scrambling initial value and a descrambling initial value based on physical layer header information. With the example shown in the drawing, y=1 is assigned. With the example shown in the drawing, the number of logics "0" included in the physical layer header information is 18, this value is added to "1" to obtain 19, 19 is represented with 7 bits width in binary to obtain "0010011", and this "0010011" is taken as the scrambling initial value.

Also, the reception side can determine that the number of logics "0" included in the received physical layer header information is 18 in the same way, so this value is added to "1" to obtain 19, 19 is represented with 7 bits width in binary to obtain "0010011", performs descrambling taking this "0010011" as the descrambling initial value, and consequently, restores the reception data.

B-13. Method 13 for Generating a Scrambling Initial Value and a Descrambling Initial Value With the above section B-5, description has been made regarding the method for generating a scrambling initial value based on the number of logics "1" included in physical layer header information. Conversely, with the above section B-9, description has been made regarding the method for generating a scrambling/descrambling initial value using the number of logics "0".

According to a modification example of these methods for generating a scrambling/descrambling initial value, the transmission side counts the number of logics "1" and the number of logics "0" included in physical layer header information respectively, further obtains the absolute value of the difference between these numbers, represents this with 7 bits in binary equivalent to the bit length of scrambling and descrambling initial values, and then generates a scrambling initial value.

Similarly, the reception side first decodes the physical layer header section not scrambled, counts the number of logics "1" and the number of logics "0" included in the physical layer header information respectively, further obtains the absolute value of the difference between these numbers, represents this with 7 bits in binary, generates a descrambling initial value, and then starts descrambling.

B-14. Method 14 for Generating a Scrambling Initial Value and a Descrambling Initial Value With the above section B-13, we have no problem in the event that the number of logics "1" and the number of logics "0" included in physical layer header information are not equal, but in the event that these values are equal, the scrambling initial value becomes all zeroes, so scrambling fails to work.

With the above sections B-6 and B-10, description has been made regarding the methods for preventing all zeroes by expanding the rule of generating a scrambling initial value. With this section as well, description will be made regarding a method for preventing all zeroes based on the same rule expansion.

The transmission side counts the number of logics "1" and the number of logics "0" included in physical layer header information respectively, and further obtains the absolute value of the difference between these numbers. In the event that the absolute value of the difference between these numbers is not zero, the transmission side can generate a scrambling initial value by representing this with 7 bits in binary equivalent to the bit length of a scrambling initial value. On the other hand, in the event that the absolute value of the difference between these numbers happens to be zero, let us determine that the transmission side performs scrambling using a predetermined scrambling initial value of 7 bits other than all zeroes (e.g., "0101111").

Similarly, the reception side first decodes the physical layer header section not scrambled, counts the number of logics "1" and the number of logics "0" included in the physical layer header information respectively, and further obtains the absolute value of the difference between these numbers. In the event that the absolute value of the difference between these numbers is not zero, the reception side generates a descrambling initial value by representing this with 7 bits in binary equivalent to the bit length of a descrambling initial value. On the other hand, in the event that the absolute value of the difference between these numbers happens to be zero, the reception side starts descrambling using a predetermined descrambling initial value of 7 bits other than all zeroes (e.g., "0101111").

B-15. Method 15 for Generating a Scrambling Initial Value and a Descrambling Initial Value With the above sections B-7 and B-11, the other methods for preventing a scrambling initial value from becoming all zeroes have been described. With this section as well, the same method for preventing all zeroes will be described.

That is to say, in the event that a scrambling initial value is n bits in length (wherein n is a natural number), the transmission side counts the number of logics "1" and the number of logics "0" included in the transmission data within a physical layer header or a part thereof respectively, and obtains the absolute value of the difference of these numbers. The transmission side generates a scrambling initial value by inserting an i-bit bit sequence known between the transmission side and the reception side in the bit sequence obtained by representing the absolute value with (n−i) bits (however, let us say that i is a natural number smaller than n) in binary in a pattern known between the transmission side and the reception side, and then performs scrambling using this scrambling initial value. Here, a bit sequence of which at least one bit is logic "1" is employed for the i bits to be inserted in the bit sequence of the (n−i) bits, thereby preventing the scrambling initial value from becoming all zeroes.

Also, similarly, the reception side counts the number of logics "1" and the number of logics "0" included in the transmission data within the received physical layer header or a part thereof respectively, and obtains the absolute value of the difference of these numbers. The reception side generates a descrambling initial value by inserting an i-bit but sequence known between the transmission side and the reception side such as at least one bit thereof is logic "1" in the bit sequence obtained by representing the absolute value with (n−i) bits in binary in a pattern known between the transmission side and the reception side, performs descrambling using this descrambling initial value, and then restores the reception data.

Here, as long as i is a natural number satisfying $0<i<n$, any value can be assigned to i principally, but if a great value is assigned to i, the width of a value to be taken as a scrambling initial value narrows, which is not preferable. Accordingly, in order to assure of preventing a scrambling initial value from becoming all zeroes, the lowest limit i=1 is preferable.

B-16. Method 16 for Generating a Scrambling Initial Value and a Descrambling Initial Value With the above sections B-8 and B-12, further the other methods for preventing a scrambling initial value from becoming all zeroes have been described. With this section as well, the same method for preventing all zeroes will be described.

That is to say, in the event that a scrambling initial value is n bits in length (wherein n is a natural number), the transmission side counts the number of logics "1" and the number of logics "0" included in the transmission data within a physical layer header or a part thereof respectively, and obtains the absolute value of the difference of these numbers. The transmission side adds z commonly known between the transmission side and the reception side (wherein z is a natural number smaller than $2^n$) to the absolute value, and then performs scrambling taking a bit sequence obtained by representing the result with n bits in binary as the scrambling initial value.

Also, similarly, the reception side counts the number of logics "1" and the number of logics "0" included in the transmission data within the received physical layer header or a part thereof respectively, and obtains the absolute value of the difference of these numbers. The reception side adds z commonly known between the transmission side and the reception side (wherein z is a natural number smaller than $2^n$) to the absolute value, performs descrambling taking a bit sequence obtained by representing the result with n bits in binary as the descrambling initial value, and restores the reception data.

Here, if we say that the number of the total bits of the transmission data within the physical layer header is b0, and the bit width of the scrambling initial value and the descrambling initial value is s, satisfying $b0+z \leq 2^s$ is preferable. Otherwise, there is the possibility that the generated scrambling initial value and descrambling initial value become all zero due to carryover of a digit.

In this case, let us say that the number of logics "1" is not counted regarding the entire bits of the transmission data within the physical layer header, but the number of logics "1" is counted regarding a part thereof b1 (assuming that the place to be counted have been mutually understood between the transmission side and the reception side), and b1 should be determined so as to satisfy $b1+z \leq 2^s$. Alternatively, the above case can be handled using a method wherein following the number of logics "1" being counted regarding the entirety, z is added to this, the obtained number is divided by $2^s$, and then the reminder thereof is employed as the scrambling initial value. These mentioned methods are also encompassed in the scope of the essence of the present invention.

Here, as long as z is a natural number satisfying $0 < x < 2^n$, any value can be assigned to z principally, but if a great value is assigned to z, the width of a value to be taken as a scrambling initial value narrows, which is not very preferable. Accordingly, in order to assure of preventing a scrambling initial value from becoming all zeroes, the lowest limit z=1 is preferable.

The above description has been made wherein scrambling is performed taking the bit sequence generated from the physical layer header information without any change as a scrambling initial value, and also descrambling is performed taking this as a descrambling initial value. However, the essence of the present invention is not restricted to this, a case wherein the transmission side generates a bit sequence, which becomes the base of a scrambling initial value, performs bit inversion of this bit sequence, and uses this as the scrambling initial value, also the reception side generates a bit sequence, which becomes the base of a descrambling initial value, performs bit inversion of this bit sequence, and uses this as the descrambling initial value, is encompassed in the scope of the essence of the present invention, and can yield the same advantages of the present invention.

For example, with the embodiment shown in FIG. 19, in the event of generating a scrambling initial value by counting the number of logics "1" within physical layer header information, even an arrangement is encompassed in the technical range of the present invention wherein if the number of logics "1" is 6, not "0000110" obtained by representing this number with 7 bits in binary but "1111001" obtained by bit-inverting "0000110" is employed as the scrambling initial value, which is apparent.

C. Scrambling/Descrambling Corresponding to a Transmission Frame Format

So far description has been made principally regarding the methods for transmitting a scrambling initial value using a region not scrambled such as a physical layer header. However, with actual wireless communication, a transmission frame format can be conceived wherein multiple fields not scrambled exist within one wireless frame. In this section, description will be made regarding a method for applying a scrambling/descrambling method according to the present invention to various transmission frame formats.

FIG. 27 illustrates a configuration example of a transmission frame wherein multiple fields not scrambled exist within one wireless frame. With the example shown in the drawing, a transmission frame comprises a preamble, which is the head of the transmission frame, and subsequently, multiple pairs made up of a physical layer header section and a data section. Each physical layer header section stores a scrambling initial value to be used for scrambling the subsequent data section, which makes up a pair therewith.

When transmitting such a transmission frame, the physical layer header section is not scrambled, and the subsequent data section is scrambled using the scrambling initial value extracted from the immediately preceding physical layer header section. Also, when receiving the transmission frame, the descrambling initial value is extracted from the physical layer header section not scrambled, and the scrambled data section to be received immediately after the physical layer header section is descrambled using this descrambling initial value.

With the example shown in FIG. 27, a transmission frame comprises a preamble (Preamble), and subsequently, a pair of a physical layer header section (PHY header) 1 and a data section (DATA) 1, and a pair of a physical layer header section (PHY header) 2 and a data section (DATA) 2. Note that the data section may be a known signal sequence.

At the time of transmission, information bits S1 stored in the physical layer header section (PHY header) 1 is taken as the scrambling initial value, and the data section (DATA) 1 immediately after the PHY header 1 is scrambled therewith, and similarly, information bits S2 stored in the physical layer header section (PHY header) 2 are taken as the scrambling initial value, and the data section (DATA) 2 immediately after the PHY header 2 is scrambled therewith. Also, at the time of reception, the physical layer header section (PHY header) 1 not scrambled is received, the information bits S1 are extracted, and the data section (DATA) 1 immediately after the PHY header 1 is descrambled taking the S1 as the descrambling initial value, and similarly, the physical layer header section (PHY header) 2 not scrambled is received, the information bits S2 are extracted, and the data section (DATA) 2 immediately after the PHY header 2 is descrambled taking the S2 as the descrambling initial value.

Also, FIG. 28 illustrates another configuration example of a transmission frame wherein multiple fields not scrambled exist within one wireless frame. With the example shown in the drawing, immediately after a physical layer header section (PHY header), a signal unnecessary for scrambling such as a training signal for equalizing a transmission path, data for performing broadcast to peripheral stations, or the like continues, and further subsequently, a data section (DATA) to be scrambled continues.

In the event of such a transmission frame format, at the time of transmission, the data section is scrambled from the head thereof using the scrambling initial value stored in the physical layer header section. Also, at the time of reception, first, the physical layer header section not scrambled is received, the descrambling initial value is extracted therefrom, the data section received immediately after the signal not scrambled is descrambled using this descrambling initial value.

In such a case, following the physical layer header section being transmitted or received, the start position of scrambling or descrambling should be delayed by a predetermined period corresponding to the transmission or reception of the signal portion not scrambled.

Also, FIG. 29 illustrates an configuration example of a transmission frame wherein two or more physical layer header sections are included within one transmission frame, following which a data section continues. With the example shown in the drawing, each physical layer header section stores a scrambling initial value employed for scrambling the subsequent transmission signals, and at the time of transmission or reception, scrambling and descrambling is performed at multi-stages each time each physical layer header is passed through.

That is to say, at the time of transmission, information bits S1 stored in a physical layer header section (PHY header) 1 are taken as the scrambling initial value, and the subsequent signal, i.e., a physical layer header section (PHY header) 2 is scrambled. Similarly, information bits S2 stored in the physical layer header section (PHY header) 2 are taken as the scrambling initial value, and the subsequent signal, i.e., a data section (DATA) is scrambled.

Also, at the time of reception, the physical layer header section (PHY header) 1 not scrambled is received, the information bits S1 are extracted therefrom, and the subsequent signal, i.e., the physical layer header section (PHY header) 2 is descrambled taking the S1 as the descrambling initial value. Next, the information bits S2 are extracted from the physical layer header (PHY header) 2 descrambled, and the data section (DATA) 2 immediately after the PHY header 2 is descrambled taking the S2 as the descrambling initial value this time.

Also, FIG. 30 illustrates a configuration example of a transmission frame wherein a preamble at the head of the frame, following which multiple pairs each made up of a physical layer header section and a data section continue, as with FIG. 27. Here, the data section may be a known signal sequence.

With the example shown in FIG. 27, using the scrambling/descrambling initial value extracted from each physical layer header section each data section immediately thereafter is scrambled/descrambled. That is to say, scrambling/descrambling is performed only at one stage.

Conversely, with the example shown in FIG. 30, two-stage scrambling/descrambling is performed. That is to say, as with the example shown in FIG. 29, using the initial value extracted from each physical layer header section signals immediately thereafter is scrambled/descrambled.

Specifically, at the time of transmission, taking information bits S1 stored in a physical layer header section (PHY header) 1 as the scrambling initial value, the signals following this are scrambled. With the example shown in the drawing, taking the S1 as the scrambling initial value, a data section (DATA) 1 and a physical layer header section (PHY header) 2 are similarly scrambled. Here, when the physical layer header section (PHY header) 2 appears, information bits S2 are extracted therefrom as a new scrambling initial value, and hereinafter, taking the S2 as the scrambling initial value, a signal following this, i.e., data section (DATA) 2 is scrambled.

Also, at the time of reception, the physical layer header section (PHY header) 1 not scrambled is received, the information bits S1 are extracted therefrom as the descrambling initial value, signals following this are descrambled. With the example shown in the drawing, taking the S1 as the descrambling initial value, the data (DATA) 1 and the physical layer header section (PHY header) 2 are descrambled. Here, when the physical layer header section (PHY header) 2 appears, the information bits S2 are extracted therefrom as a new descrambling initial value, and hereinafter, taking the S2 as the scrambling initial value, a signal following this, i.e., the data section (DATA) 2 is scrambled.

In this case, following the next physical layer header section appearing until a new initial value at the time of scrambling or descrambling is acquired, the subsequent signal is scrambled or descrambled using the initial value at the time of scrambling or descrambling acquired last continuously.

Incidentally, recently, the MIMO (Multi-Input Multi-Output) communication method has been under study wherein space-division multiplexing, i.e., multiple transmission paths, which are logically independent, are established by both the transmitter side and the receiver side equipping multiple antenna devices. The MIMO communication is a technique for realizing expansion of transmission capacity, and achieving improvement in communication speed, employs space-division multiplexing, and accordingly, excels in frequency use efficiency.

FIG. 31 illustrates a configuration example of a transmission frame format which can be employed with the MIMO communication method. With the example shown in the drawing, four MIMO channels exist for data transmission destinations, which supposes that four pieces of data are subjected to space-division multiplexing and transmitted.

As shown in the drawing, with a transmission frame, following a preamble (Preamble), a physical layer header section (PHY header) 1 regarding the entire relevant transmission frame continues, further physical layer header sections (PHY headers) 2 through 5 for each MIMO channel continue using time division multiplexing, further subsequently, four data sections (DATA) 2 through 5 subjected to space-division multiplexing continue. Each data section can be assigned with each different transmission rate. For example, the data sections (DATA) 2 through 5 are assigned with 6 mbps, 6 mbps, 12 mbps, and 24 mbps respectively, so data transmission at 48 mbps is realized on the entire system.

As already described above, according to the present invention, a scrambling/descrambling initial value can be extracted for each physical layer header section based on a rule common with an other party of communication.

When transmitting the transmission frame, using the scrambling initial value extracted from the physical layer header section (PHY header) 1 the subsequent physical layer header section (PHY header) 2 is scrambled.

As shown in FIG. 31, physical layer header sections (PHY headers) 2 through 5 are provided for each MIMO channel, and these are transmitted in order using time division multiplexing. At this time, the physical layer header section (PHY header) 3 is scrambled using the scrambling initial value extracted from the physical layer header section (PHY header) 2, and hereinafter in the same way, the physical layer header section (PHY header) 4 is scrambled using the scrambling initial value extracted from the physical layer header section (PHY header) 3, and the physical layer header section (PHY header) 5 is scrambled using the scrambling initial value extracted from the physical layer header section (PHY header) 4.

Subsequently, the data section over each channel subjected to space-division multiplexing is scrambled using the scrambling initial value to be extracted from the corresponding physical layer header section. That is to say, using the scrambling initial value extracted from the physical layer header section (PHY header) 2 the data section (DATA) 2 over the corresponding channel is scrambled, using the scrambling initial value extracted from the physical layer header section (PHY header) 3 the data section (DATA) 3 over the corresponding channel is scrambled, using the scrambling initial value extracted from the physical layer header section (PHY header) 4 the data section (DATA) 4 over the corresponding channel is scrambled, and using the scrambling initial value extracted from the physical layer header section (PHY header) 5 the data section (DATA) 5 over the corresponding channel is scrambled.

On the other hand, at the time of reception, the descrambling initial value is extracted from the physical layer header section (PHY header) 1 not scrambled.

Subsequently, the physical layer header sections (PHY headers) 2 through 5 for each MIMO channel are received in order using time division multiplexing, but at this time, the physical layer header section (PHY header) 2 is descrambled using the descrambling initial value extracted from the physical layer header section (PHY header) 1, and hereinafter in the same way, the physical layer header section (PHY header) 3 is descrambled using the descrambling initial value extracted from the physical layer header section (PHY header) 2, the physical layer header section (PHY header) 4 is descrambled using the descrambling initial value extracted from the physical layer header section (PHY header) 3, and the physical layer header section (PHY header) 5 is descrambled using the descrambling initial value extracted from the physical layer header section (PHY header) 4.

Subsequently, upon the data section subjected to space-division multiplexing being received over each channel, the received data section is subjected to scrambling using the descrambling initial value to be extracted from the corresponding physical layer header section. That is to say, using the descrambling initial value extracted from the physical layer header section (PHY header) 2 the data section (DATA) 2 over the corresponding channel is descrambled, using the descrambling initial value extracted from the physical layer header section (PHY header) 3 the data section (DATA) 3 over the corresponding channel is descrambled, using the descrambling initial value extracted from the physical layer header section (PHY header) 4 the data section (DATA) 4 over the corresponding channel is descrambled, and using the descrambling initial value extracted from the physical layer header section (PHY header) 5 the data section (DATA) 5 over the corresponding channel is descrambled.

Note that with the present embodiment of the present invention, description has been made regarding the example wherein a packet to be scrambled and the scrambling initial value thereof are generated within the same packet, but not restricted to the packet to be scrambled, and the value within another packet may be used as well. For example, in the event that data length is always the same, meaning that signal fields are fixed, such as AV transmission, it can be conceived that with the transmission device side, the last 7-bit data (e.g., the 4th byte of CRC) of the packet of which the reception acknowledgement signal (ACK) could be received immediately before transmission is employed as an initial value when scrambling the next packet to be transmitted. In this case, on the reception device side, the last 7-bit data of the packet of which the reception acknowledgement signal was returned immediately before reception is employed as an initial value when descrambling the next packet to be received.

However, in this case, there is the possibility that the transmission side failed to receive the reception acknowledgement signal, and transmits the last packet using the last initial value, so that it is effective to prepare and select two types of initial values using two descramblers such as shown in the above FIG. 20. Also, in this case, if multiple terminals exist as to one access point, multiple packets which answered back the reception acknowledgement signal exist as well, resulting in vexatious complication, and accordingly, this arrangement is particularly effective for being applied to a system wherein one terminal exists as to one access point.

Note that the embodiment of the present invention shows an example for realizing the present invention, and has a corresponding relation as to each of the invention identification items in the Claims such as shown in the following, but is not restricted to this, and can be applied to various modifications without departing from the essence of the present invention.

For example, with claims 4 and 5, the signal converting means correspond to the scrambler 220, and the internal state thereof corresponds to the values held by the shift registers 224 and 225, for example. Also, the initial-value setting means correspond to the shift register 222 and the selector 223, for example.

Also, with claim 7, the header generating means correspond to the header generating unit 210.

Also, with claims 8 and 14, the parity signal included in the physical layer header corresponds to the parity bit 624, for example.

Also, with claim 9, the signal converting means correspond to the scrambler 220 for example, and the internal state thereof corresponds to the values held by the shift registers 224 and 225 for example. Also, the initial-value setting instructing means correspond to the initial-value setting flag 211, for example. Also, the initial-value setting means correspond to the shift register 222 and the selector 223, for example. Also, the header generating means correspond to the header generating unit 210.

Also, with claim 10, the initial-value register corresponds to the shift register 222, for example. Also, the first shift register corresponds to the shift register 224, for example. Also, the second shift register corresponds to the shift register 225, for example. Also, the first calculator corresponds to the exclusive-OR circuit 226, for example. Also, the selector corresponds to the selector 223, for example. Also, the second calculator corresponds to the exclusive-OR circuit 227, for example. Also, the control means correspond to the control unit 221, for example.

Also, with claim 11, the signal converting means correspond to the descrambler 270 for example, and the internal state thereof corresponds to the values held by the shift registers 274 and 275 for example. Also, the initial-value setting means correspond to the shift register 272 and the selector 273, for example. Also, the signal indicating initializing timing corresponds to the scrambler initialization 651, for example.

Also, with claim 12, the signal converting means correspond to the descrambler 270 for example, and the internal state thereof corresponds to the values held by the shift registers 274 and 275 for example. Also, the header analyzing means correspond to the header analyzing unit 280, for example. Also, the initial-value setting means correspond to the shift register 272 and the selector 273, for example.

Also, with claim 15, the initial-value register corresponds to the shift register 272, for example. Also, the first shift register corresponds to the shift register 274, for example. Also, the second shift register corresponds to the shift register 275, for example. Also, the first calculator corresponds to the exclusive-OR circuit 276, for example. Also, the selector corresponds to the selector 273, for example. Also, the second calculator corresponds to the exclusive-OR circuit 277, for example. Also, the control means correspond to the control unit 271, for example.

Also, with claim 16, the descramblers correspond to the descrambler 270 or 290, for example. Also, the selector corresponds to the selector 303, for example. Also, the error determining means correspond to the error determining unit 305, for example.

Also, with claim 3, the first signal converting means correspond to the scrambler 220 for example, and the internal state thereof corresponds to the values held by the shift registers 224 and 225 for example. Also, the initial-value setting instructing means correspond to the initial-value setting flag 211, for example. Also, the first initial-value setting means correspond to the shift register 222 and the selector 223, for example. Also, the header generating means correspond to the header generating unit 210, for example. The second signal converting means correspond to the descrambler 270 for example, and the internal state thereof corresponds to the values held by the shift registers 274 and 275 for example. Also, the header analyzing means correspond to the header analyzing unit 280, for example. Also, the second initial-value setting means correspond to the shift register 272 and the selector 273, for example.

Also, with claims 43 and 46, the procedure for generating a physical layer header of a transmission packet corresponds to Step S911, for example. Also, in the event of the initial-value setting instructing means indicating that an initial value should be set in the internal state, the procedure for inverting a parity signal in the physical layer header, and setting predetermined data included in the physical layer header as the initial value of the internal state of the scrambler corresponds to Steps S912, S915, and S916, for example. Also, the procedure for subjecting a signal to be processed in a transmission packet to predetermined arithmetic operation depending on the internal state of the scrambler, and outputting this, corresponds to Step S917, for example.

Also, with claims 44 and 47, the procedure for analyzing the physical layer header of a reception packet corresponds to Step S921. Also, the procedure for setting the headmost data of a signal to be processed as the initial value of the internal state of the descrambler in the event of a normal value being set in the parity signal of the physical layer header, and setting predetermined data included in the physical layer header other than the signal to be processed as the initial value of the internal state of the descrambler in the event of an abnormal value being set in the parity signal of the physical layer header as the initial value setting information, corresponds to Steps S922, S924, and S926, for example. Also, the procedure for subjecting a signal to be processed to predetermined arithmetic operation depending on the internal state of the descrambler, and outputting this, corresponds to Step S927, for example.

Note that the procedures described in the embodiment of the present invention may be regarded as a method including these series of procedures, or may be regarded as a program for causing a computer to execute these series of procedures or a recording medium storing the program.

INDUSTRIAL APPLICABILITY

As described above, description has been made in detail regarding the present invention with reference to the particular embodiment. However, it is fully apparent that one skilled in the art can make various modifications and substitutions to the embodiment without departing from the essence of the present invention.

With the present specification, the embodiment of the present invention has been described based on IEEE802.11 serving as the standard specifications of a wireless LAN system, but the essence of the present invention is not restricted to this, and the present invention can be applied in the same way to other communication systems which require scrambling/descrambling between transmission and reception, and also notifying and sharing a scrambling initial value between transmission and reception.

In other words, the present invention has been disclosed in an exemplary form, and the contents of the description in the present specification should not be interpreted in a restrictive manner. In order to determine the essence of the present invention, the Claims should be referenced.

BRIEF DESCRIPTION OF THE DRAWINGS

FIG. 17 is a diagram for describing a third method for generating a scrambling initial value and a descrambling initial value based on physical layer header information.

FIG. 20 is a diagram for describing a sixth method for generating a scrambling initial value and a descrambling initial value based on physical layer header information.

FIG. 24 is a diagram for describing a tenth method for generating a scrambling initial value and a descrambling initial value based on physical layer header information.

FIG. 32 is a diagram illustrating a configuration example of a wireless communication apparatus employed for the IEEE802.11a.

FIG. 35 is a diagram illustrating an OFDM signal format stipulated by the IEEE802.11a.

Figure 1:
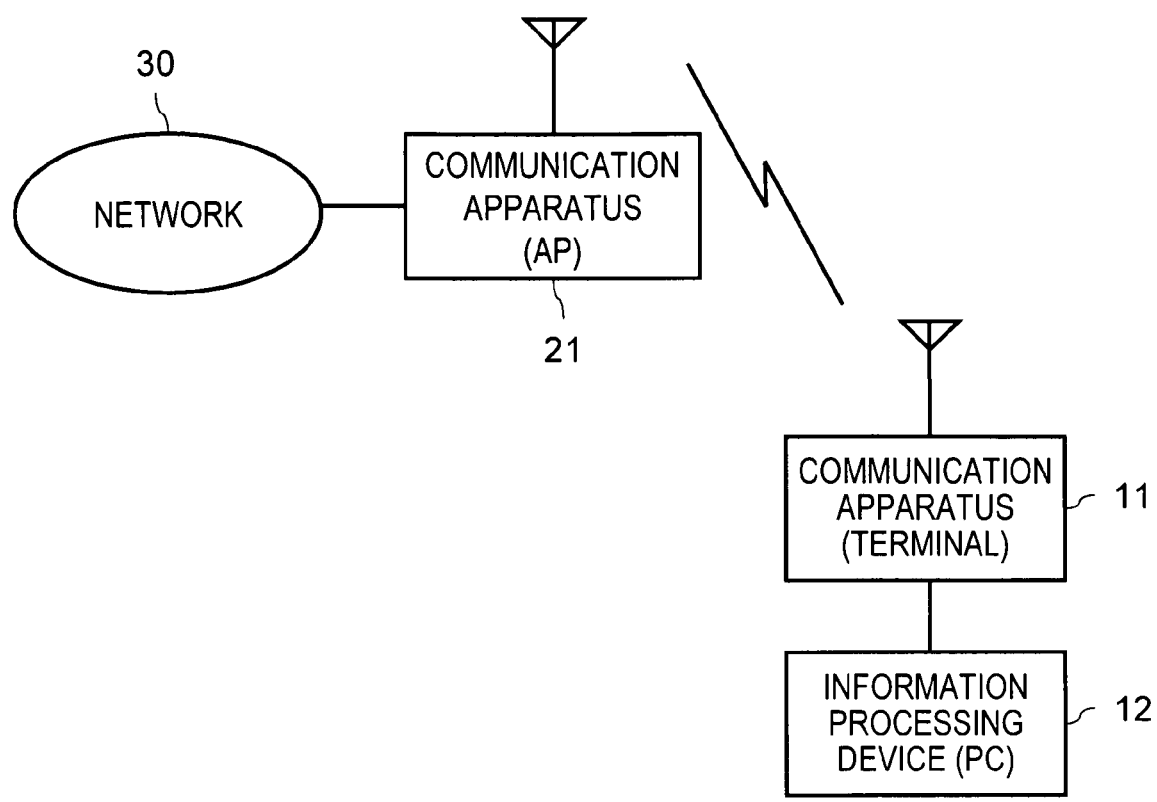
FIG. 1 is a diagram schematically illustrating the entire configuration of a communication system according to an embodiment of the present invention.
Figure 2:
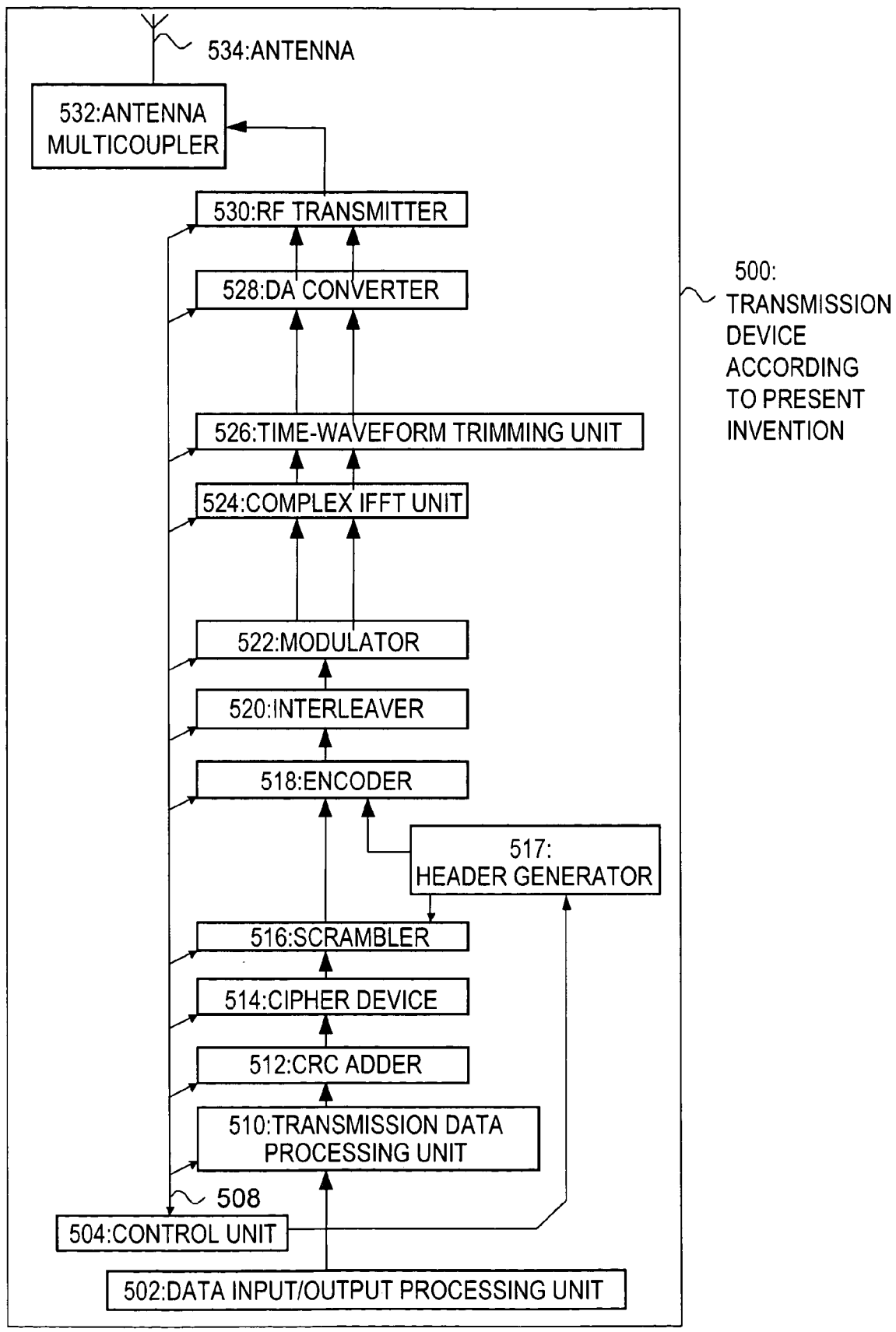
FIG. 2 is a diagram schematically illustrating the functional configuration of a transmitter according to an embodiment of the present invention.
Figure 3:
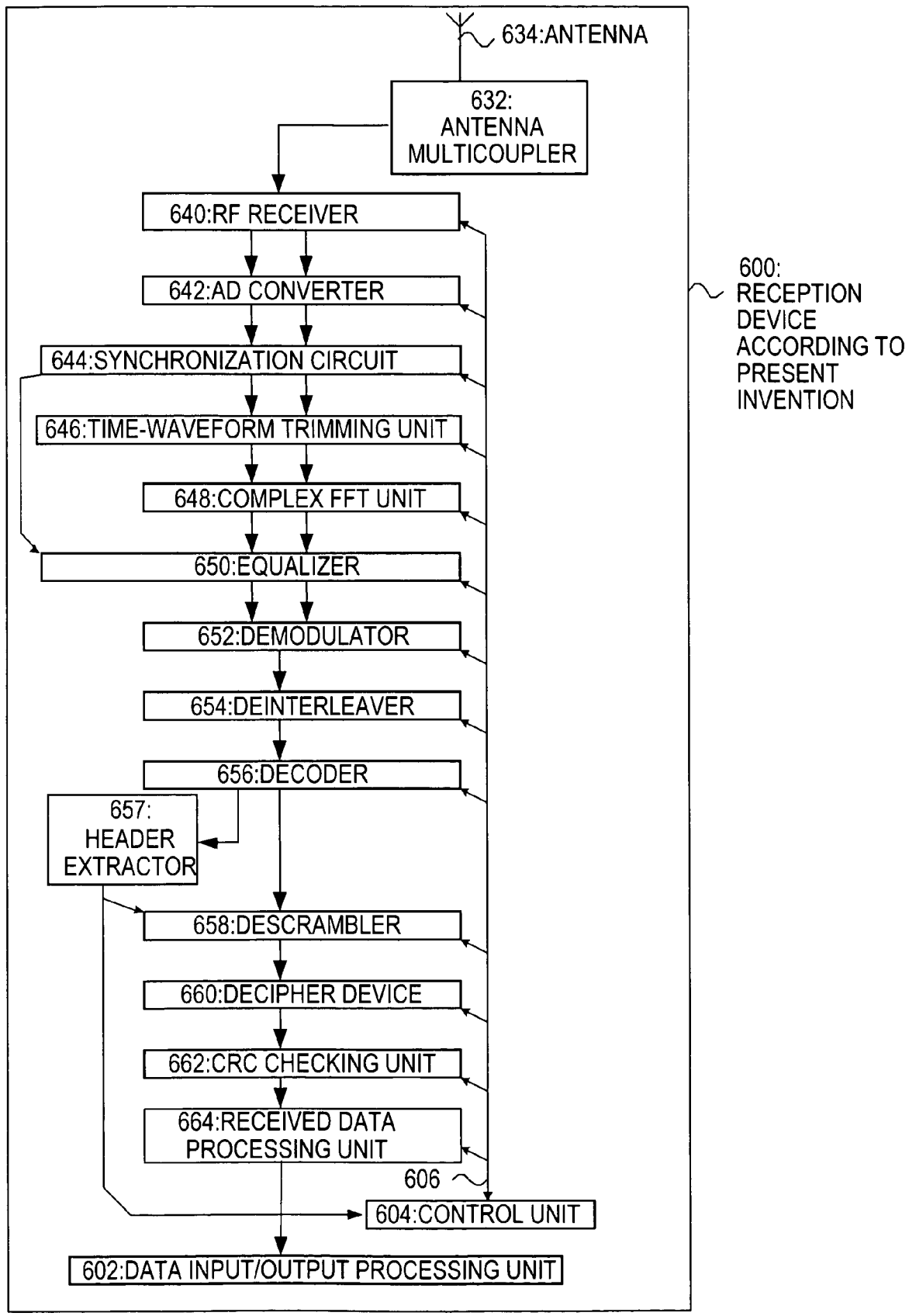
FIG. 3 is a diagram schematically illustrating the functional configuration of a receiver according to an embodiment of the present invention.
Figure 4:
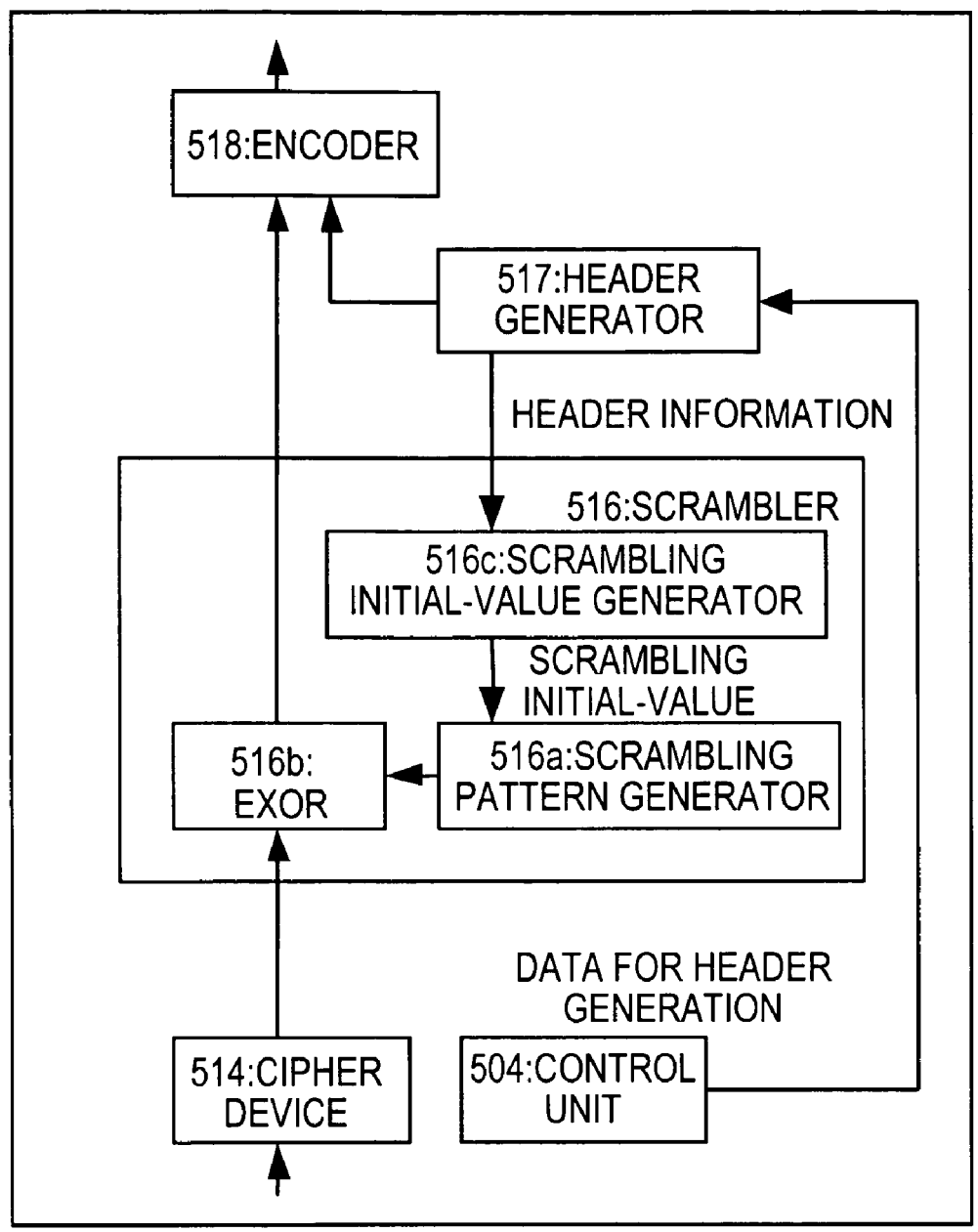
FIG. 4 is a diagram illustrating the configuration of a scrambler 516 disposed in a wireless communication apparatus 500.
Figure 5:
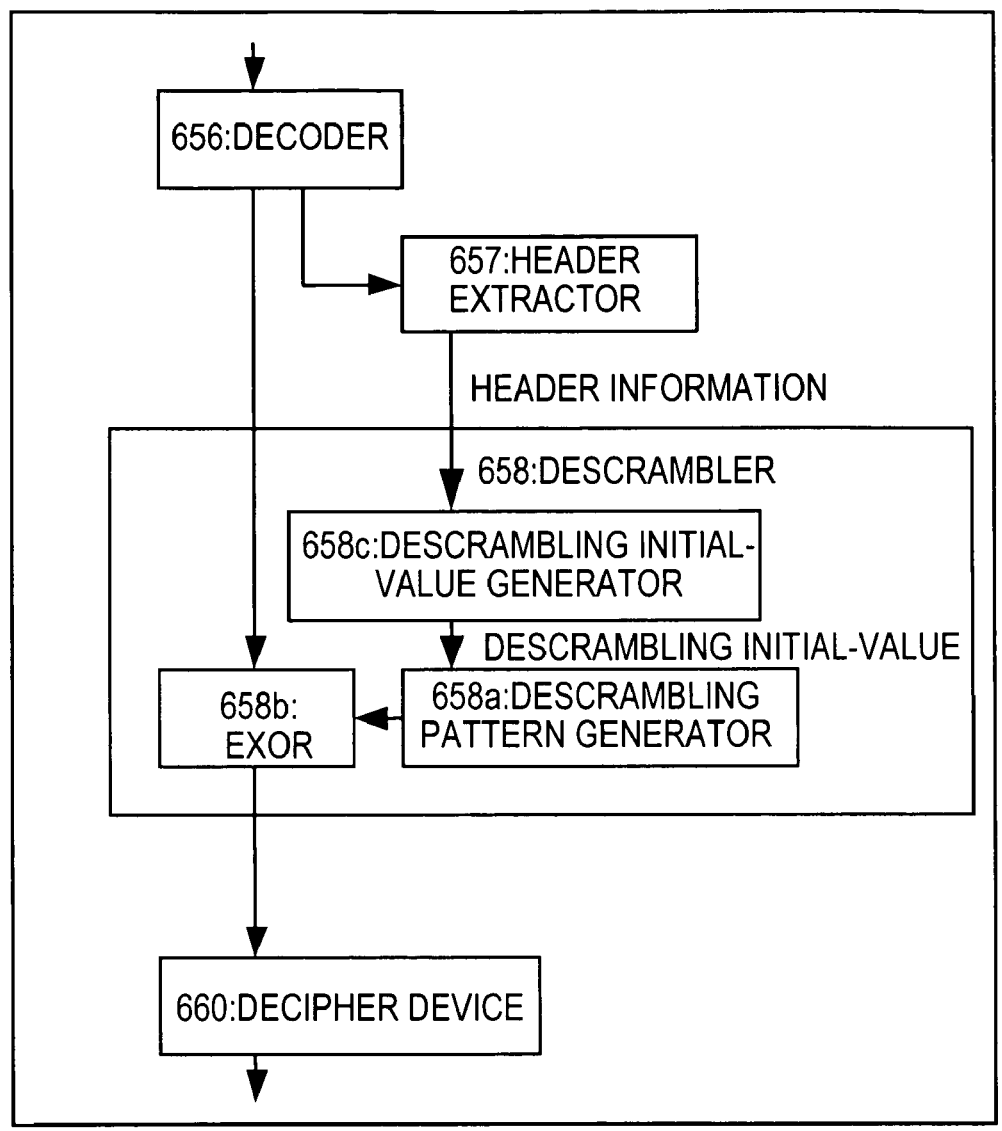
FIG. 5 is a diagram illustrating the configuration of around a descrambler 658 disposed in a wireless communication apparatus 600.
Figure 6:
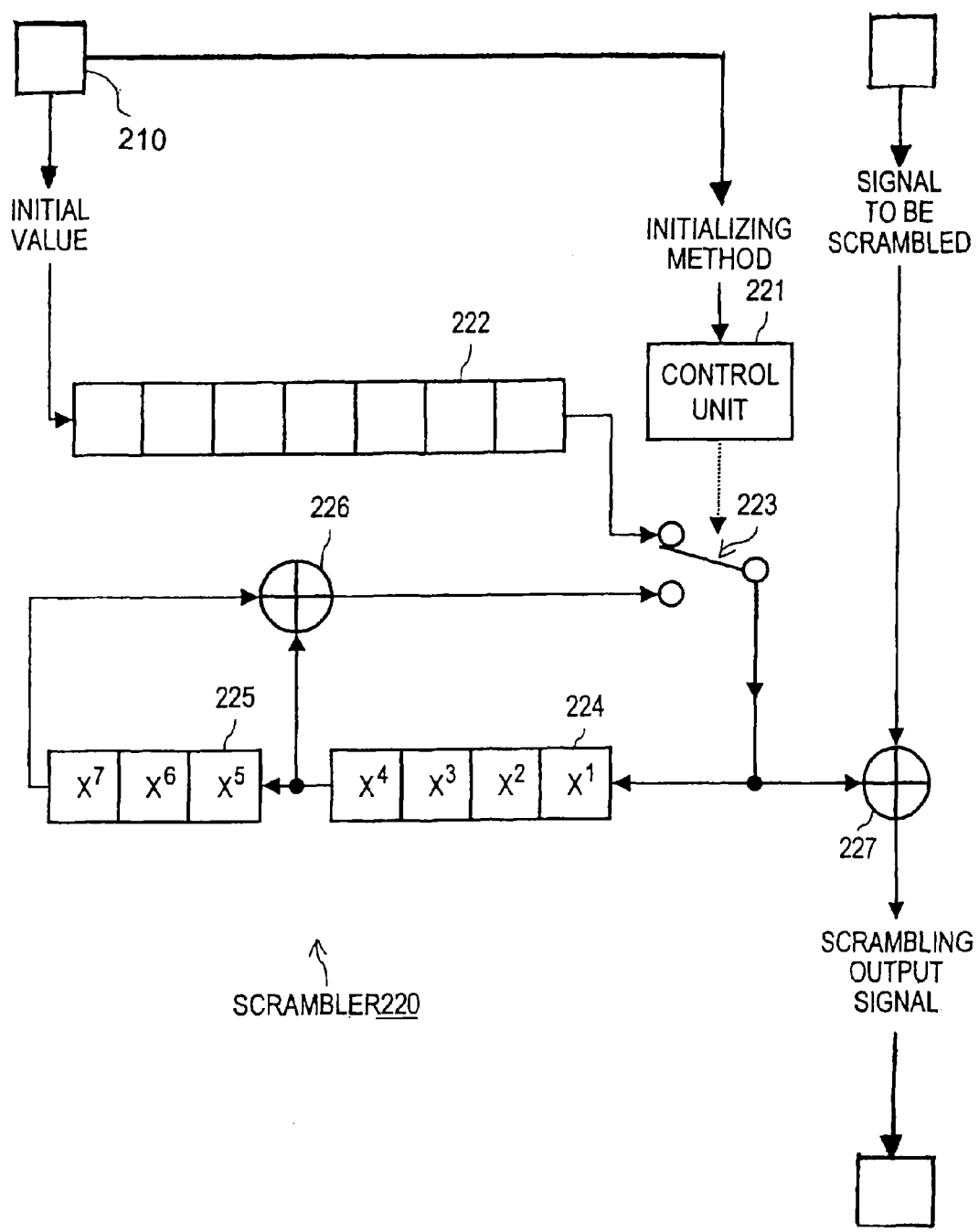
FIG. 6 is a diagram illustrating the internal configuration of a scrambler according to an embodiment of the present invention.
Figure 7:
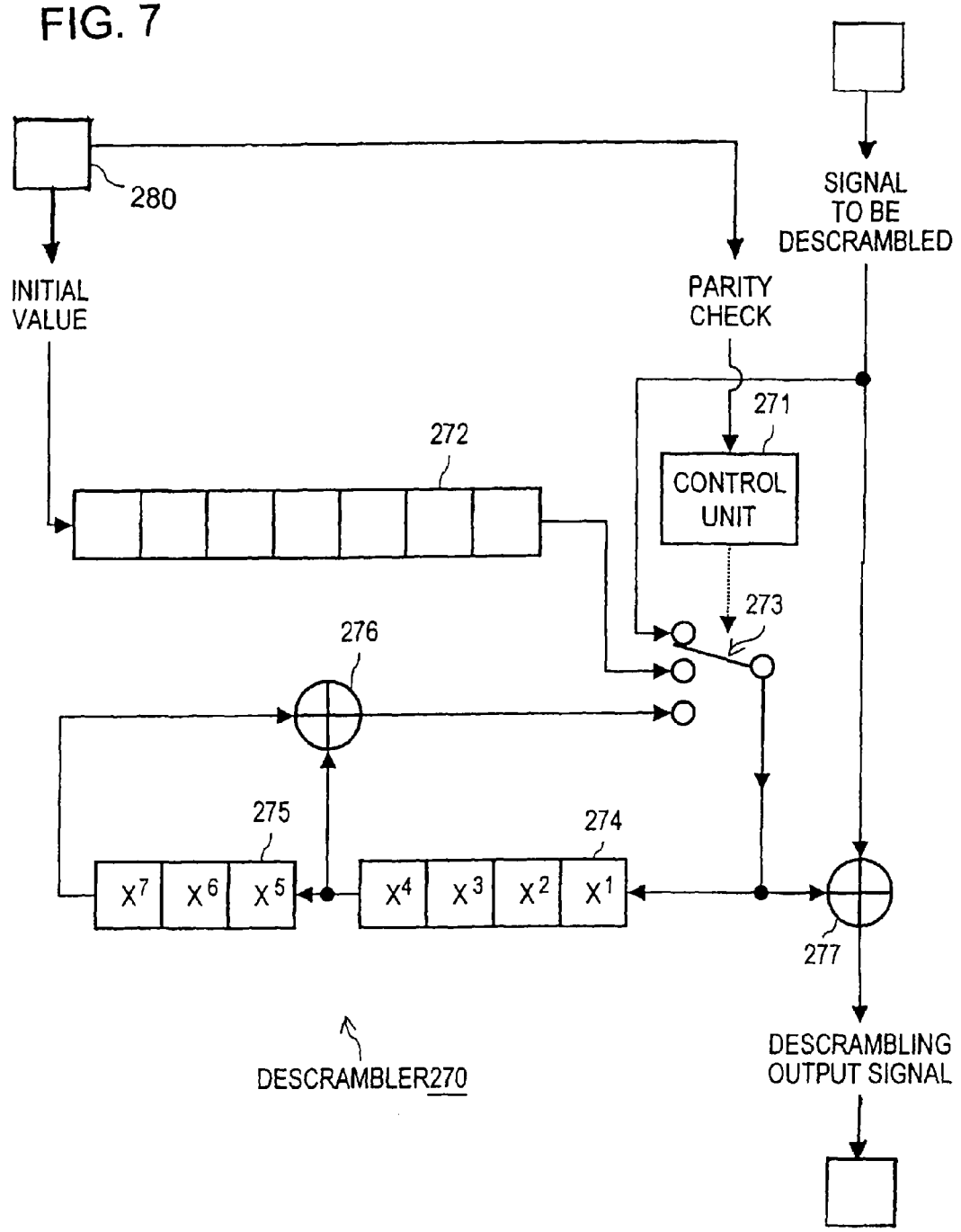
FIG. 7 is a diagram illustrating the internal configuration of a descrambler according to an embodiment of the present invention.
Figure 8:
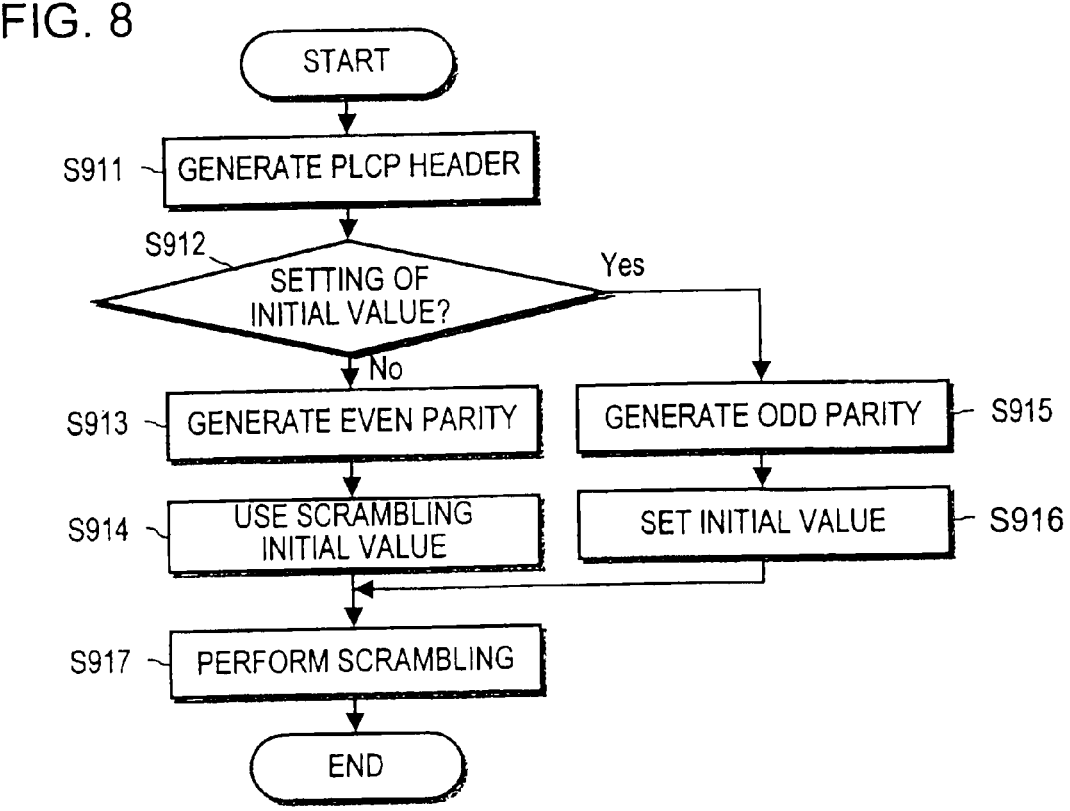
FIG. 8 is a flowchart illustrating the scrambling procedures in a transmission device according to an embodiment of the present invention.
Figure 9:
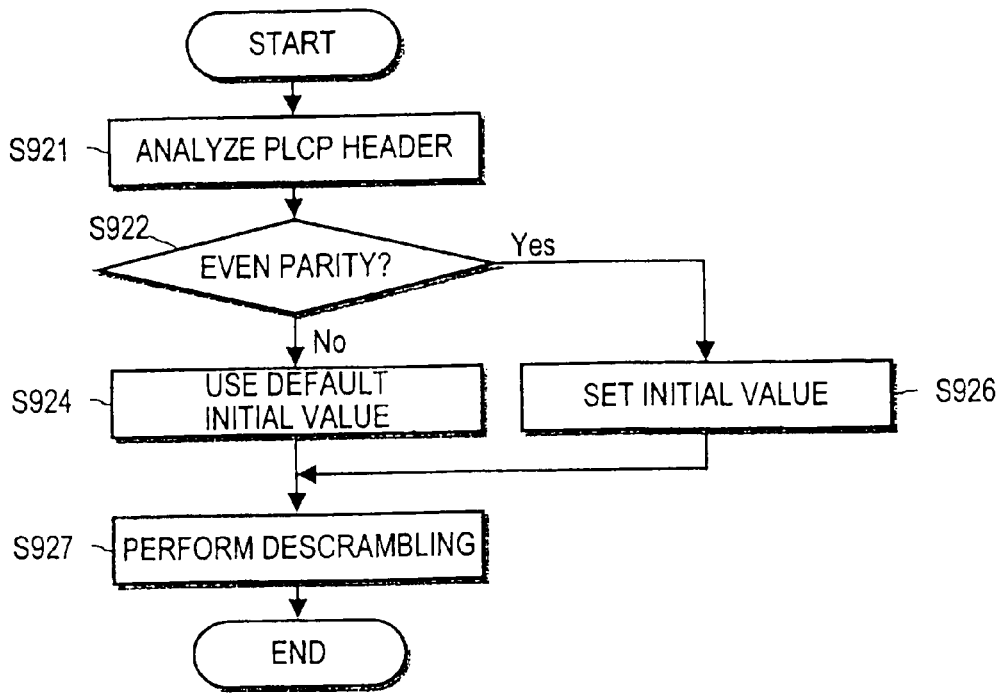
FIG. 9 is a flowchart illustrating the descrambling procedures in a reception device according to an embodiment of the present invention.
Figure 10:
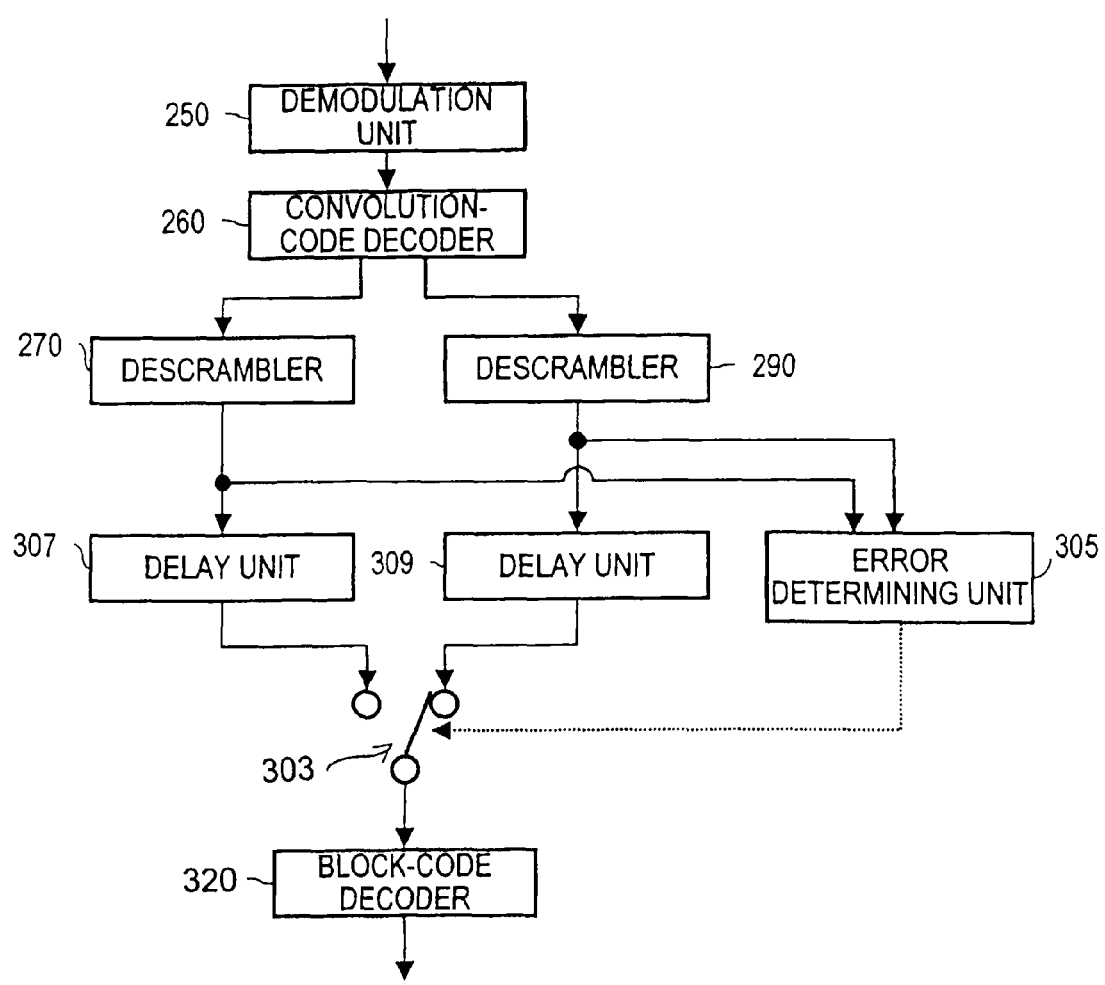
FIG. 10 is a diagram for describing a first modification example of an embodiment of the present invention.
Figure 11:
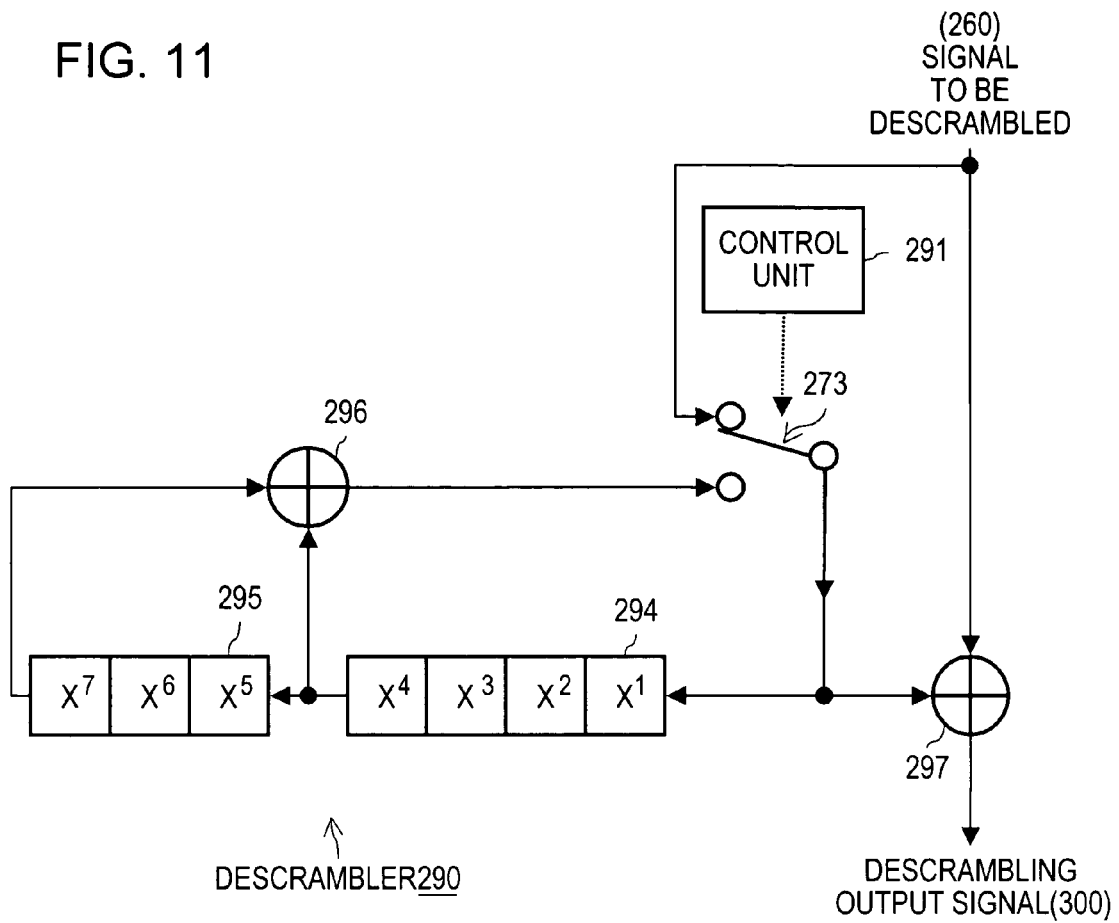
FIG. 11 is a diagram illustrating the configuration of a conventional descrambler 290.
Figure 12:
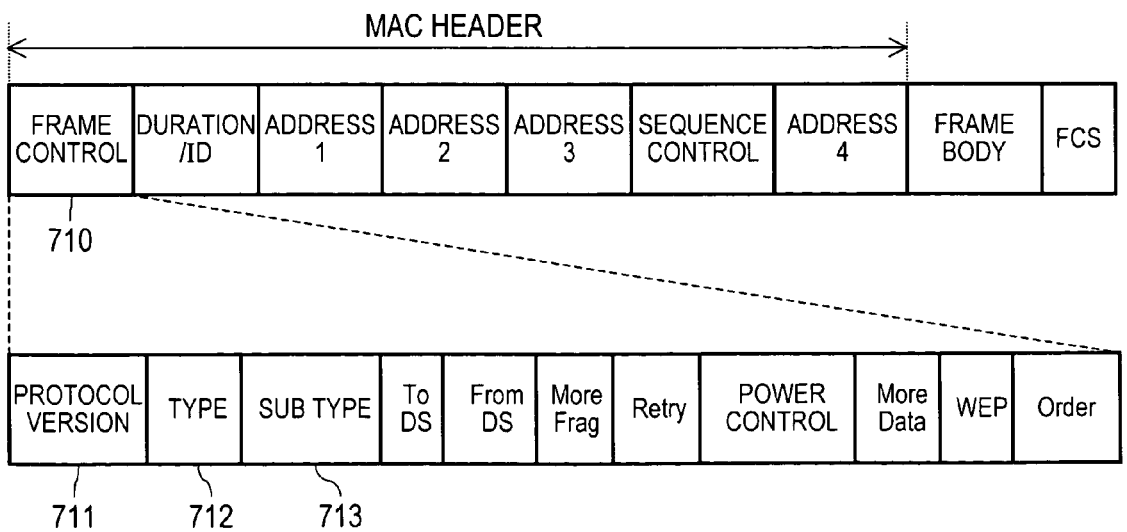
FIG. 12 is a diagram illustrating the configuration of an MAC frame in the IEEE802.11 standard.
Figure 13:
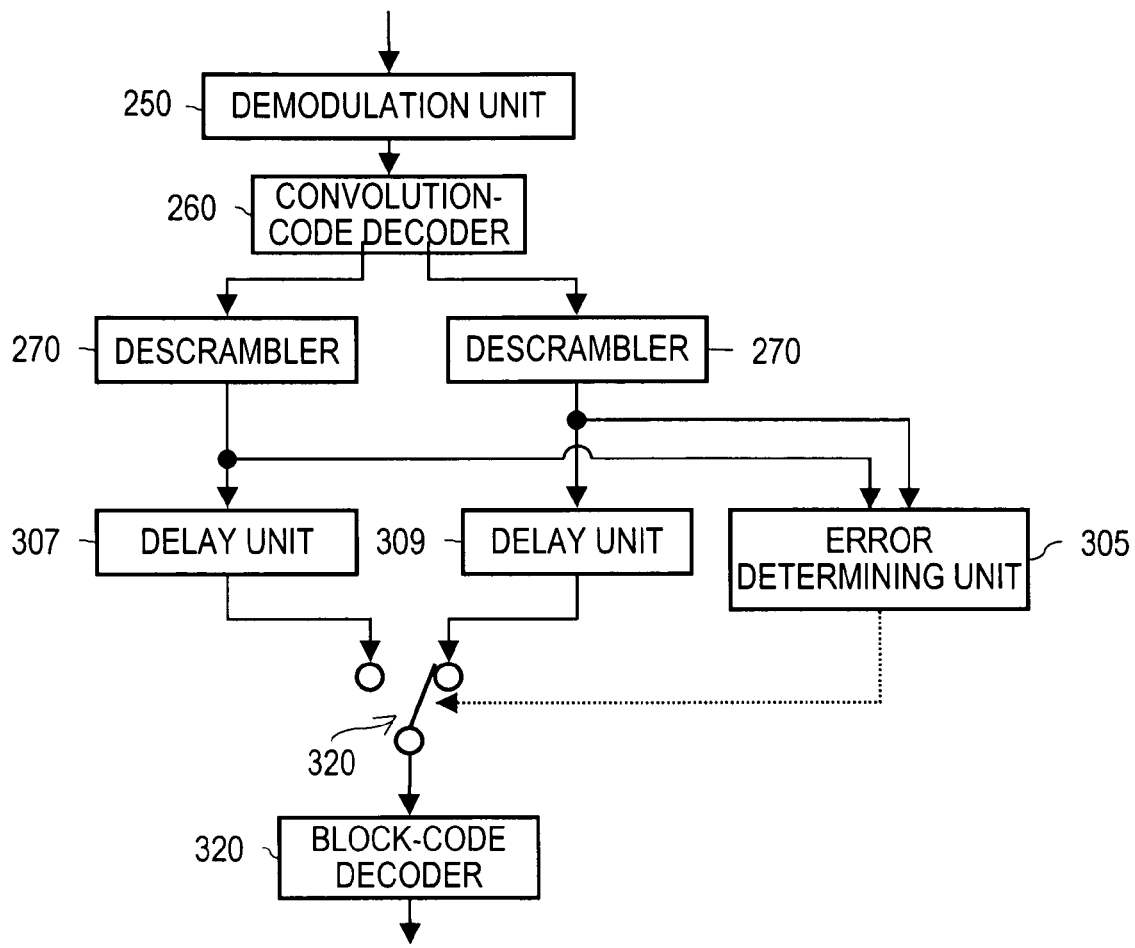
FIG. 13 is a diagram for describing a second modification example of an embodiment of the present invention.
Figure 14:
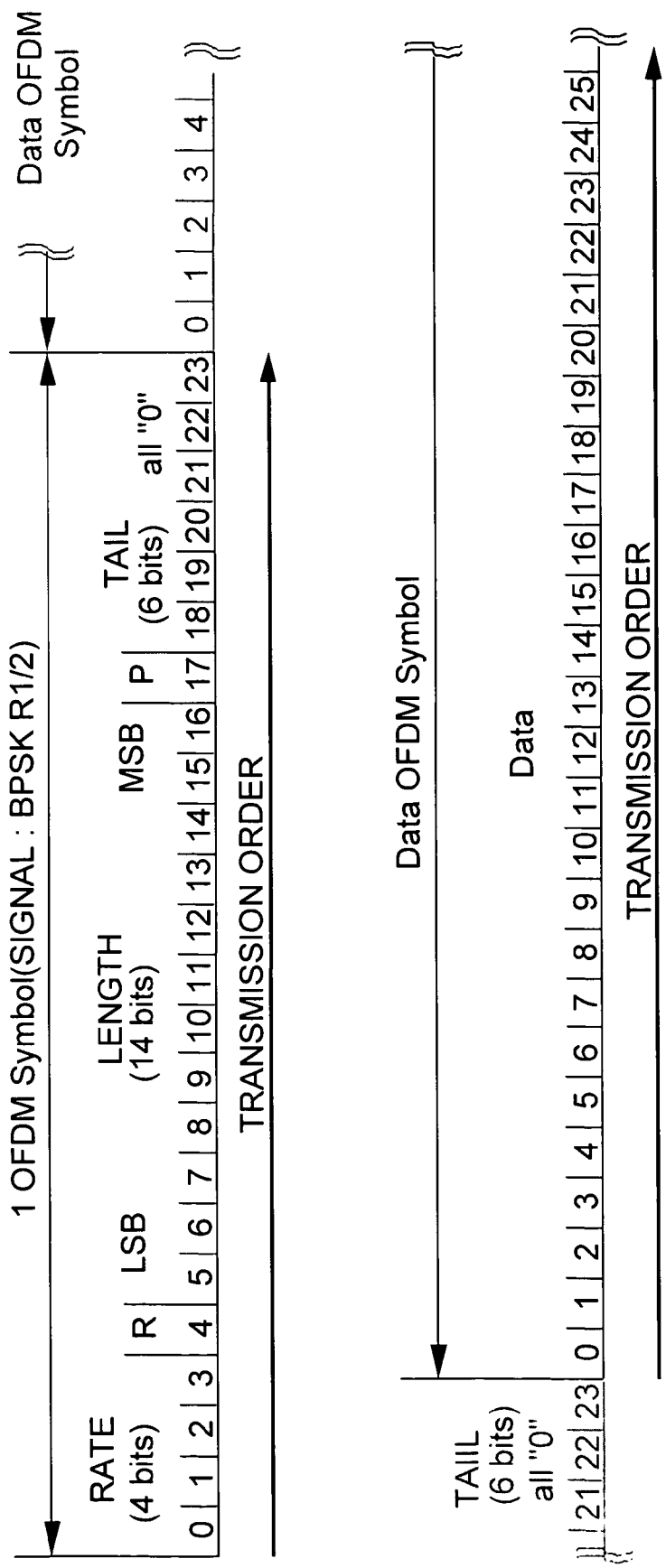
FIG. 14 is a diagram illustrating the configurations of physical header information and a data field to be used for a wireless network according to the present invention.
Figure 15:
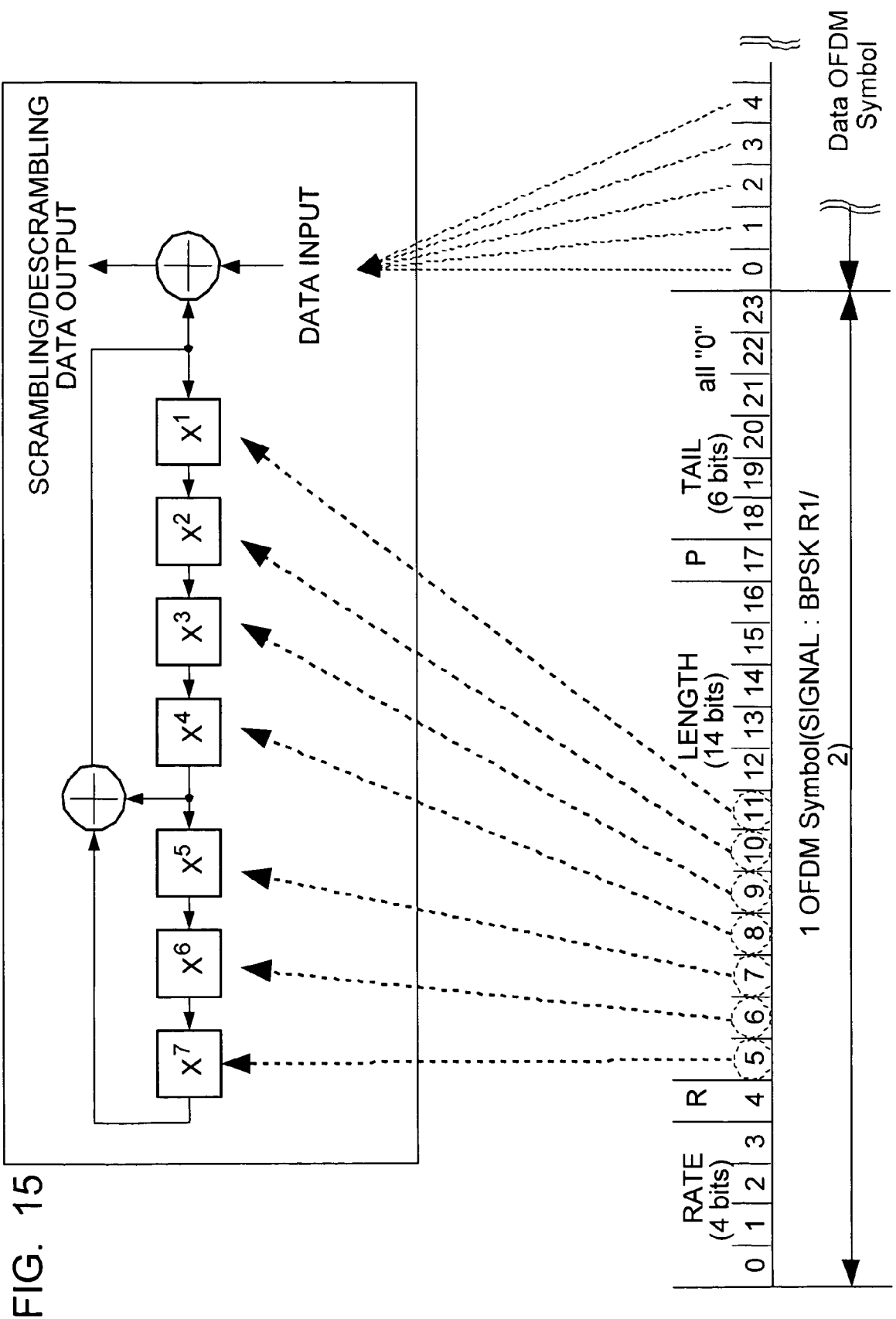
FIG. 15 is a diagram for describing a first method for generating a scrambling initial value and a descrambling initial value based on physical layer header information.
Figure 16:
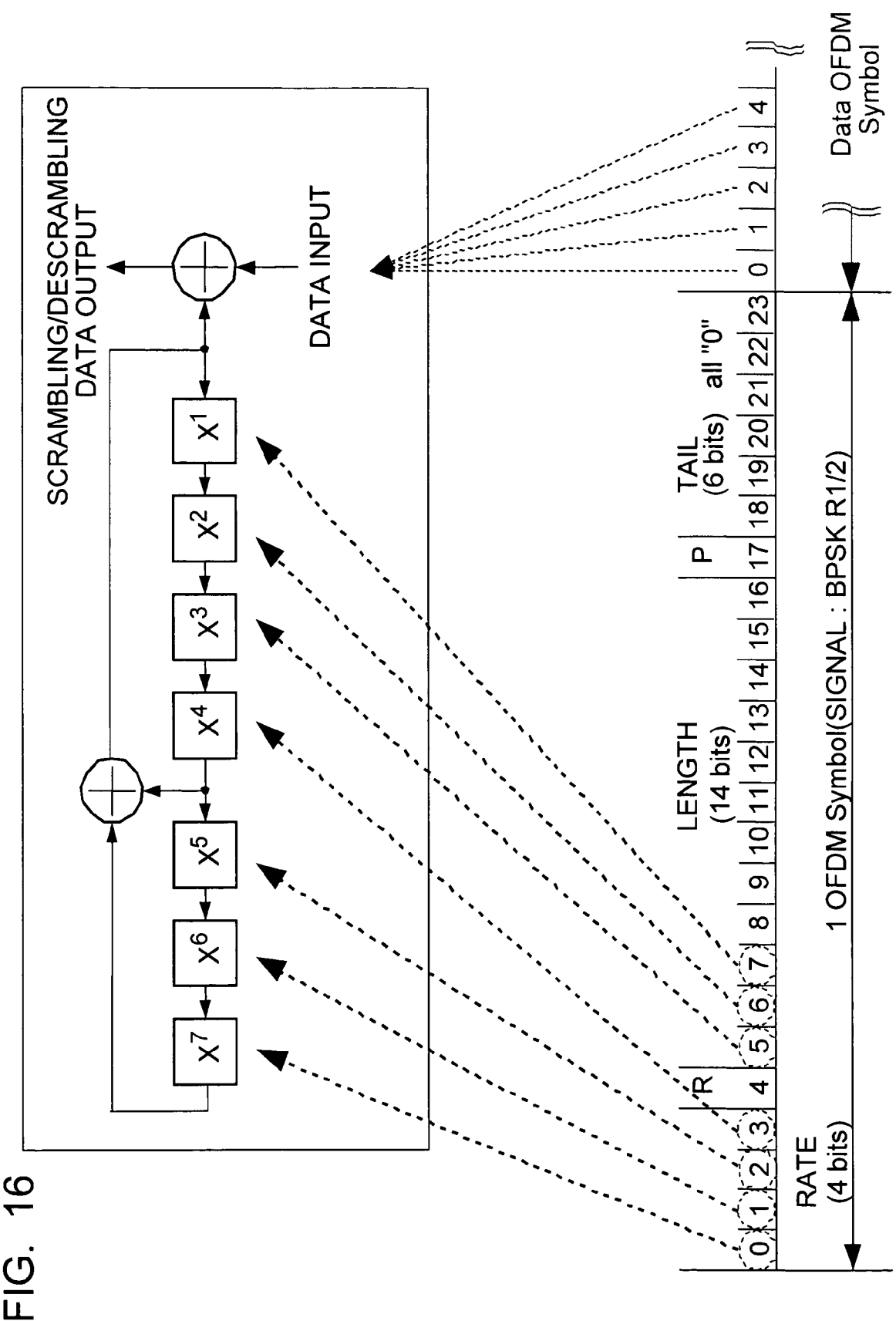
FIG. 16 is a diagram for describing a second method for generating a scrambling initial value and a descrambling initial value based on physical layer header information.
Figure 18:
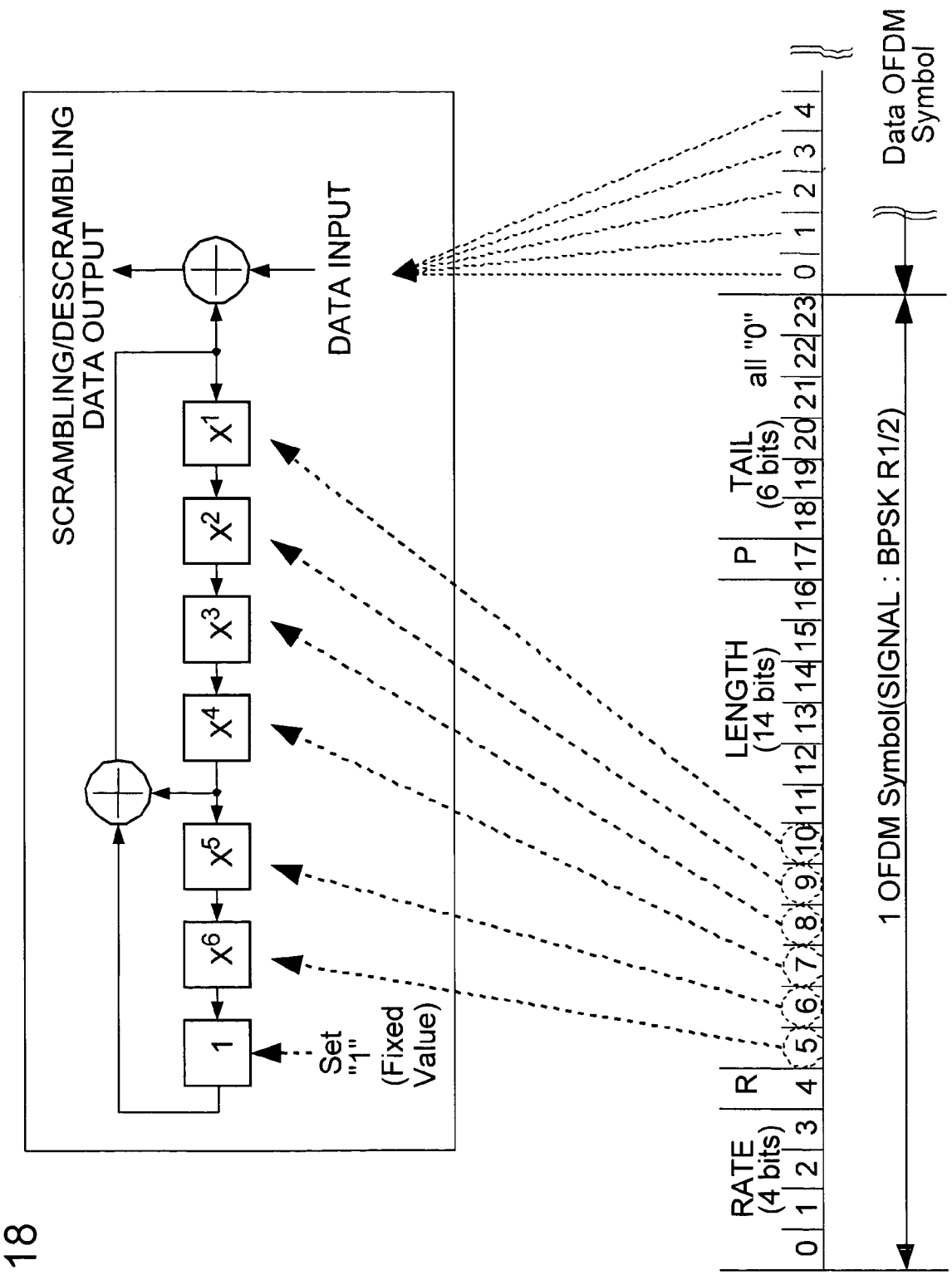
FIG. 18 is a diagram for describing a fourth method for generating a scrambling initial value and a descrambling initial value based on physical layer header information.
Figure 19:
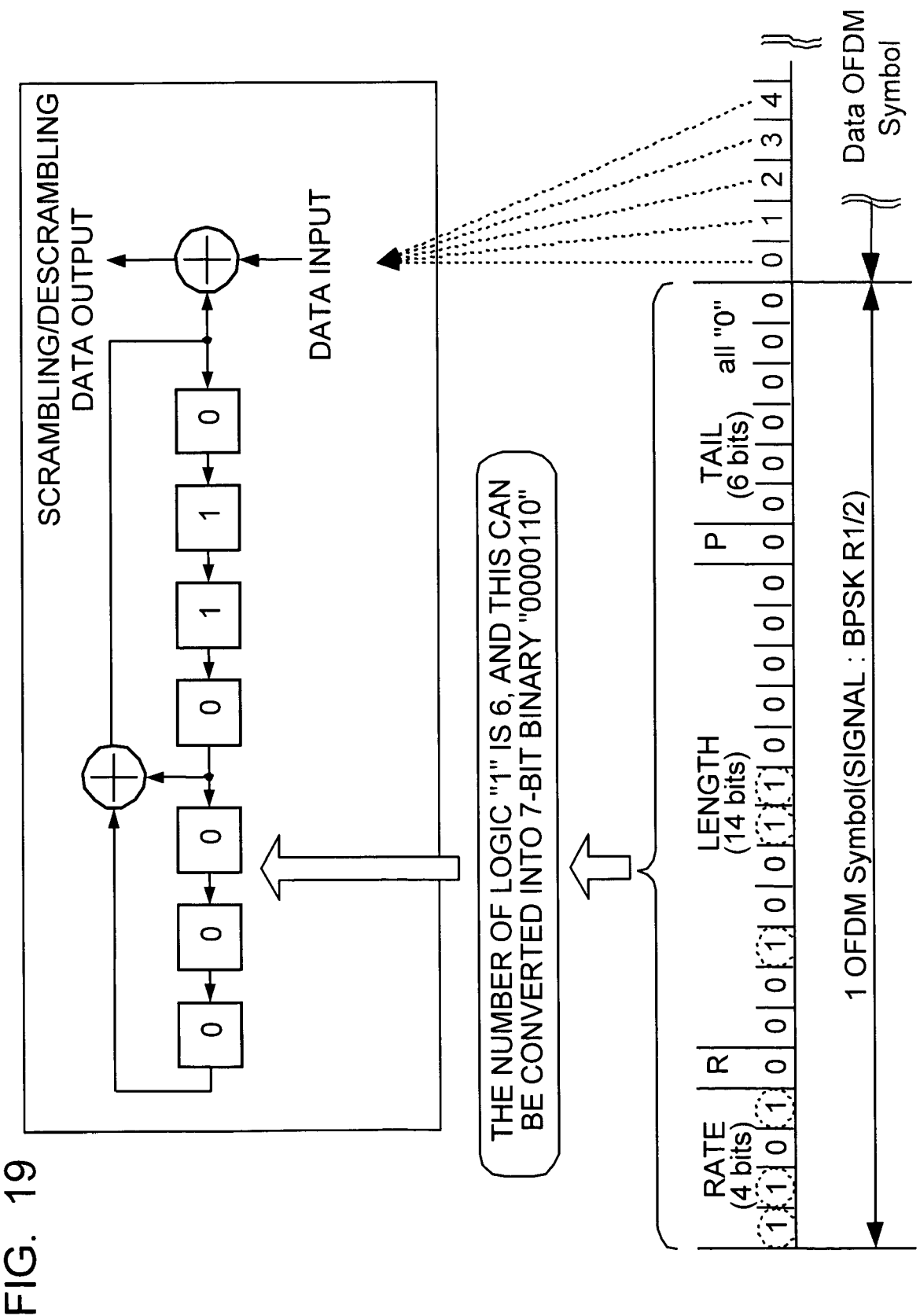
FIG. 19 is a diagram for describing a fifth method for generating a scrambling initial value and a descrambling initial value based on physical layer header information.
Figure 21:
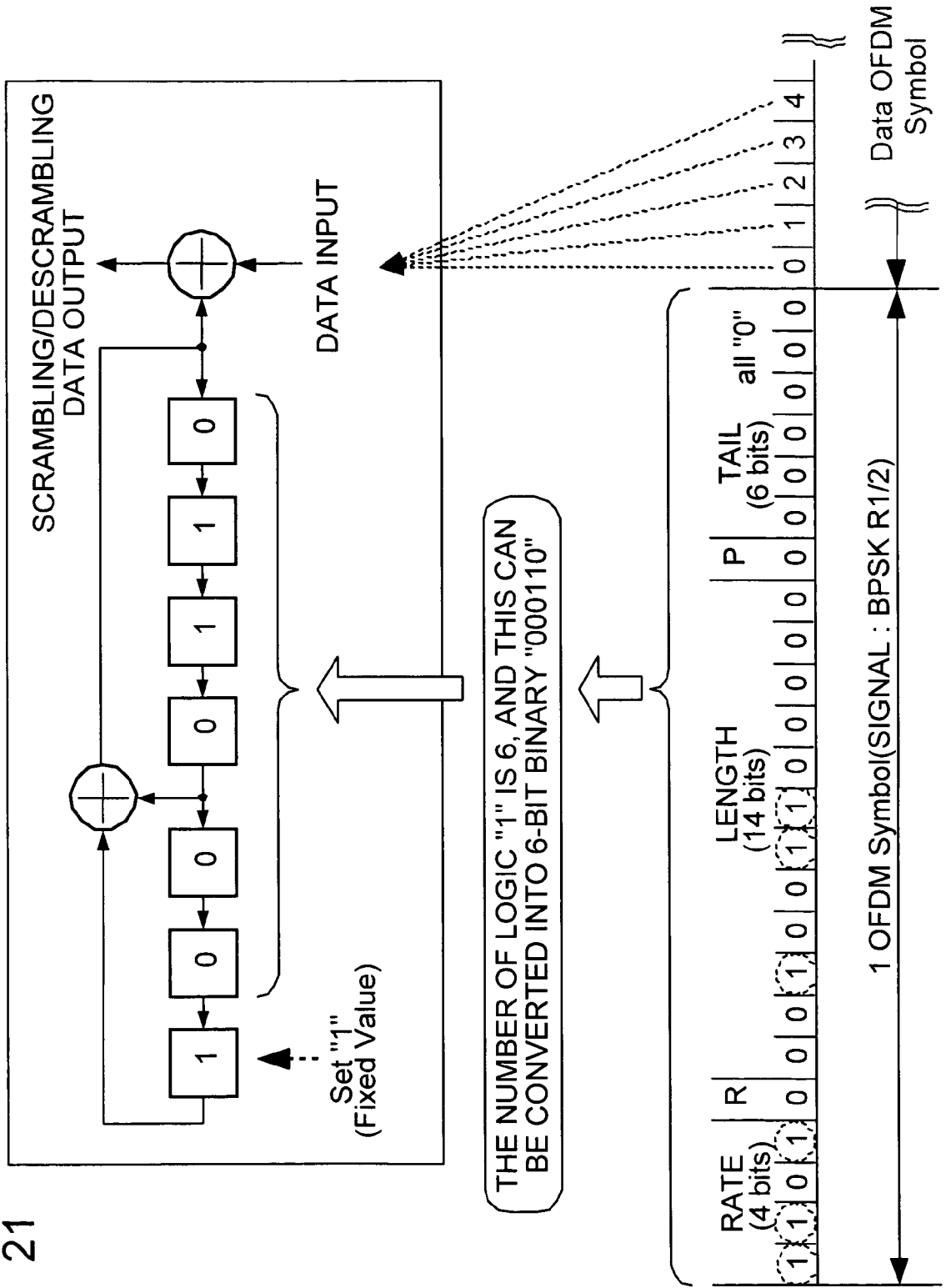
FIG. 21 is a diagram for describing a seventh method for generating a scrambling initial value and a descrambling initial value based on physical layer header information.
Figure 22:
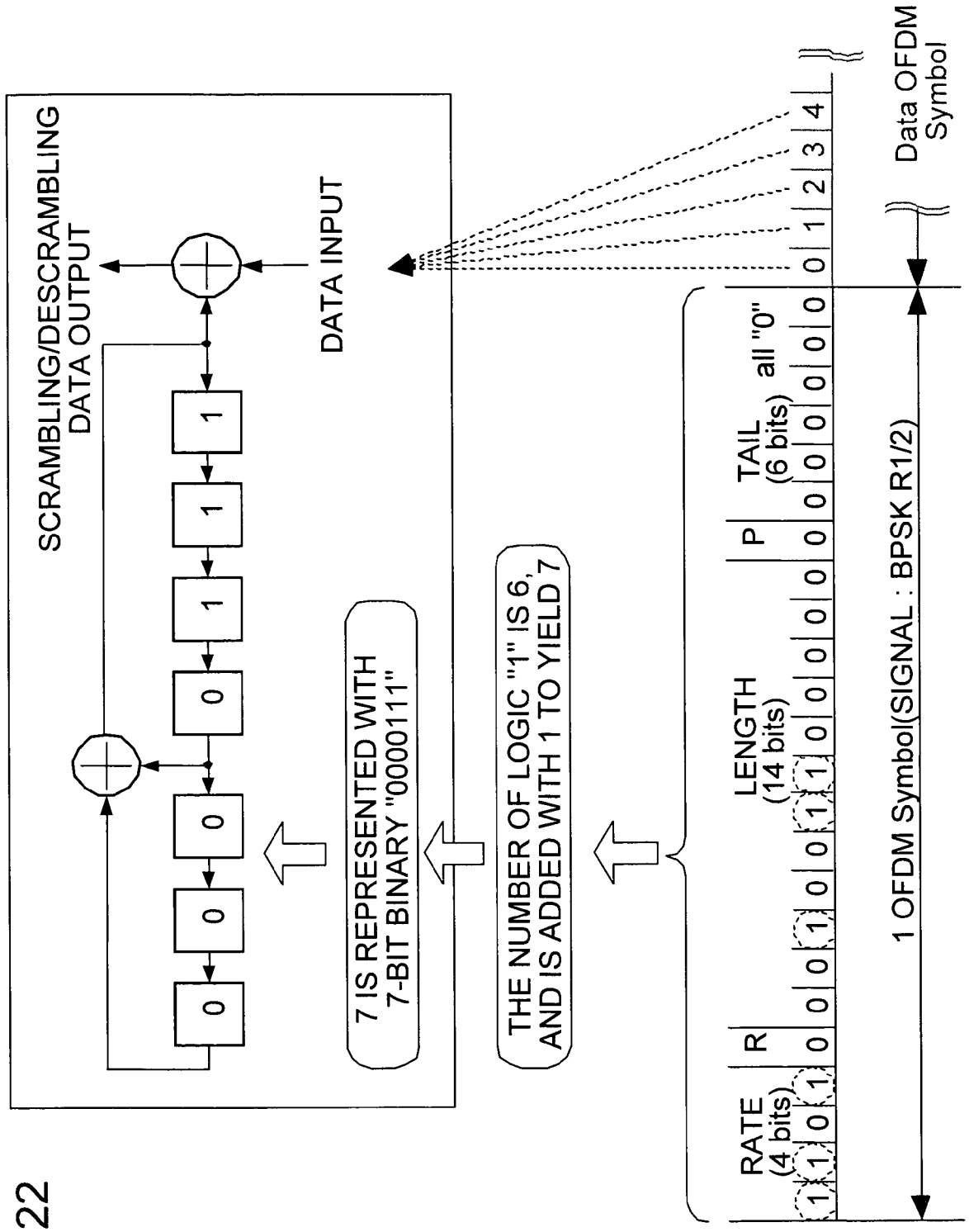
FIG. 22 is a diagram for describing an eighth method for generating a scrambling initial value and a descrambling initial value based on physical layer header information.
Figure 23:
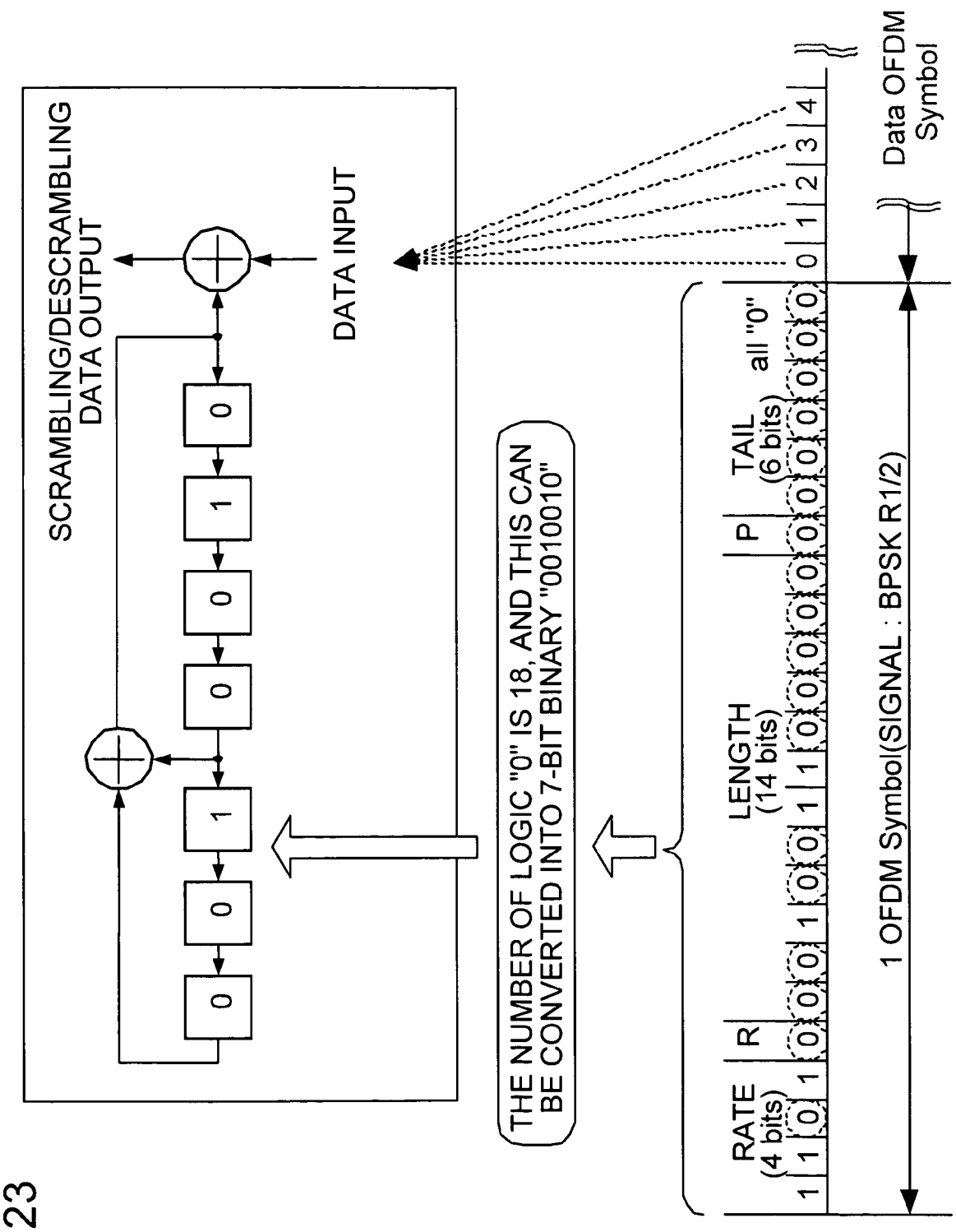
FIG. 23 is a diagram for describing a ninth method for generating a scrambling initial value and a descrambling initial value based on physical layer header information.
Figure 25:
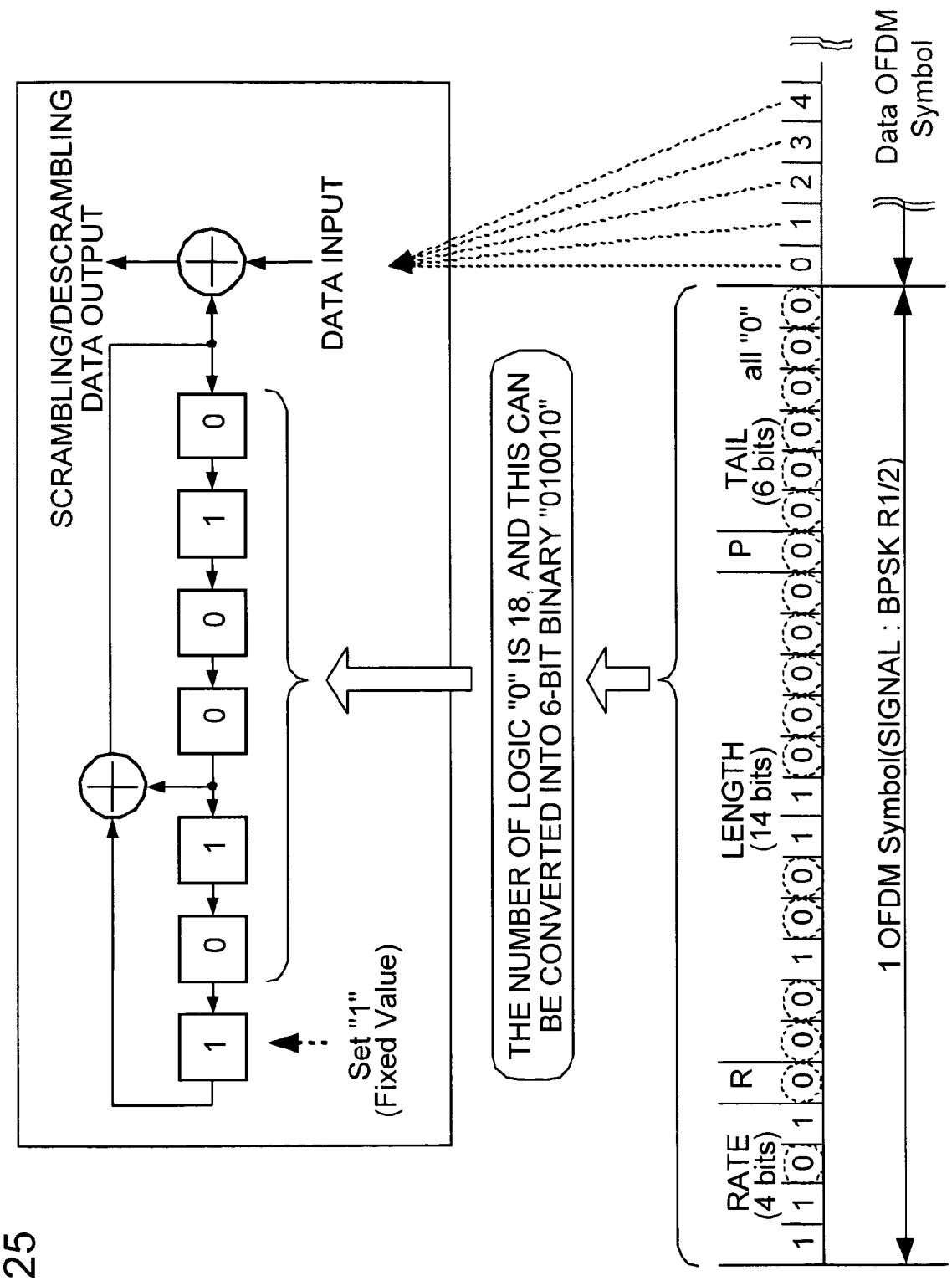
FIG. 25 is a diagram for describing an eleventh method for generating a scrambling initial value and a descrambling initial value based on physical layer header information.
Figure 26:
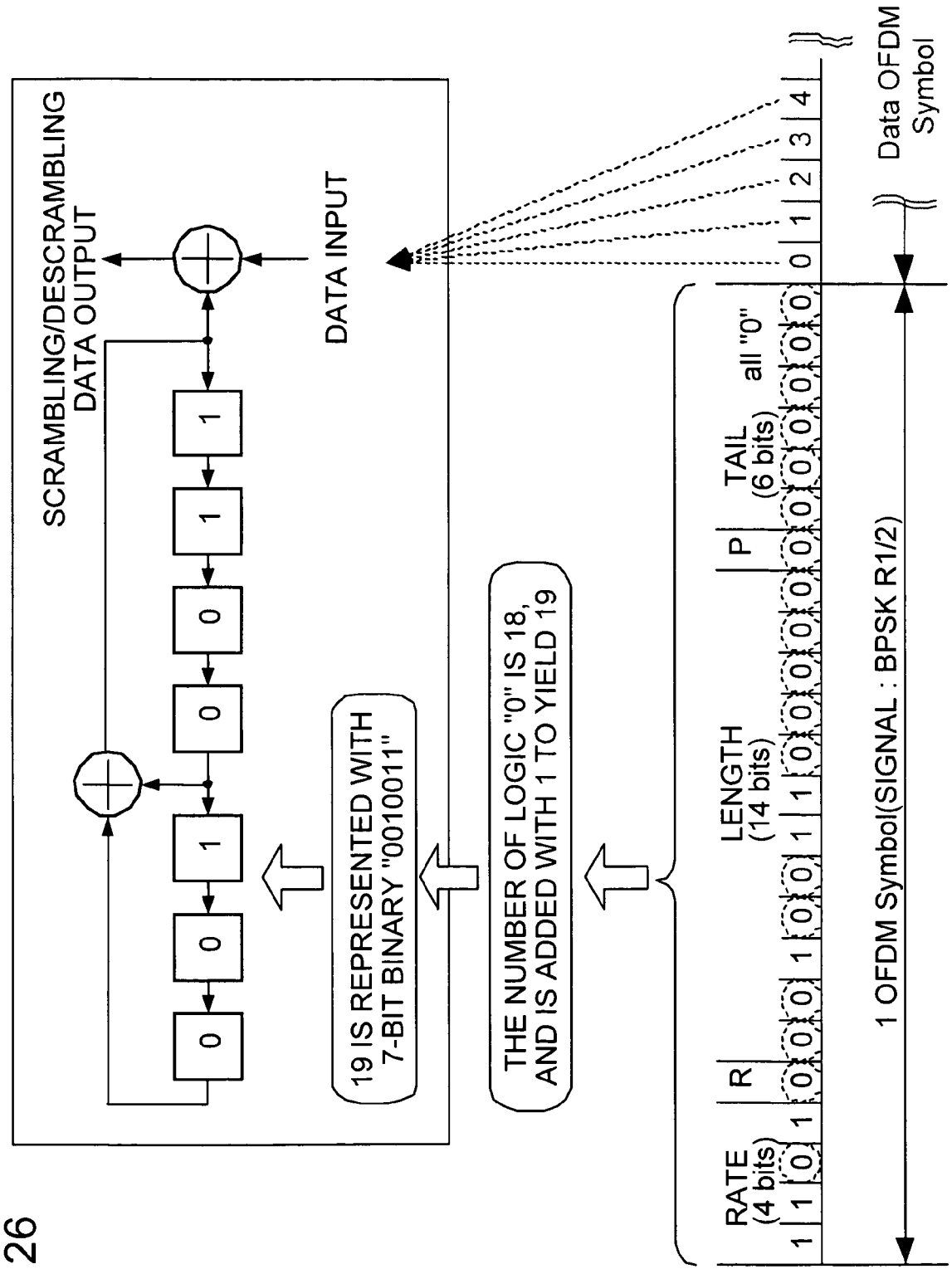
FIG. 26 is a diagram for describing a twelfth method for generating a scrambling initial value and a descrambling initial value based on physical layer header information.
Figure 27:
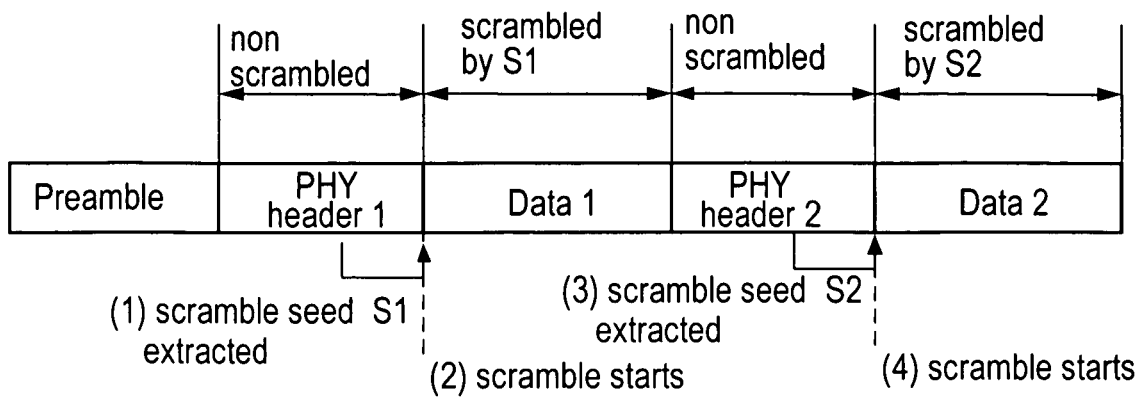
FIG. 27 is a diagram illustrating a configuration example of one transmission frame including multiple fields not scrambled.
Figure 28:
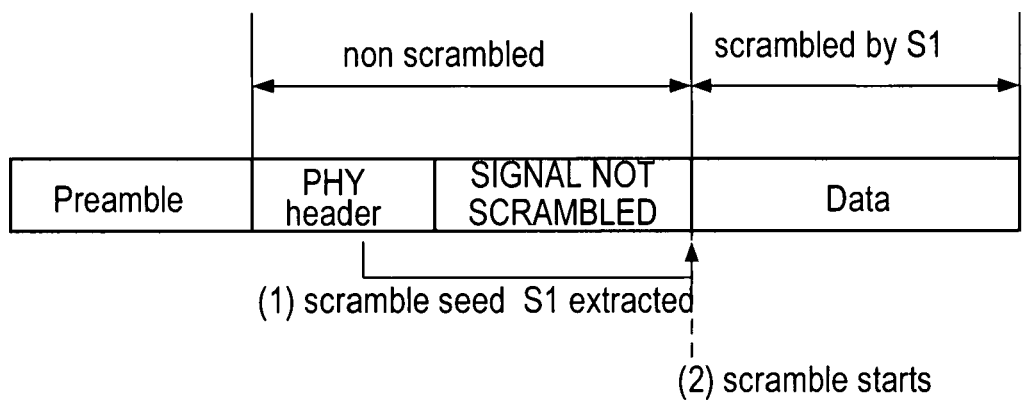
FIG. 28 is a diagram illustrating a configuration example of one transmission frame including multiple fields not scrambled.
Figure 29:
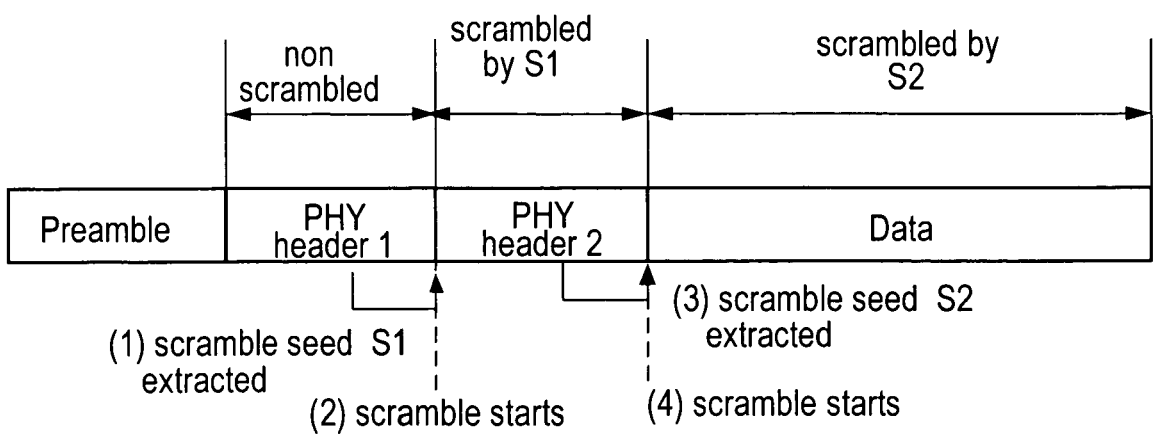
FIG. 29 is a diagram illustrating a configuration example of one transmission frame including two or more physical layer header sections, following which a data section continuing.
Figure 30:
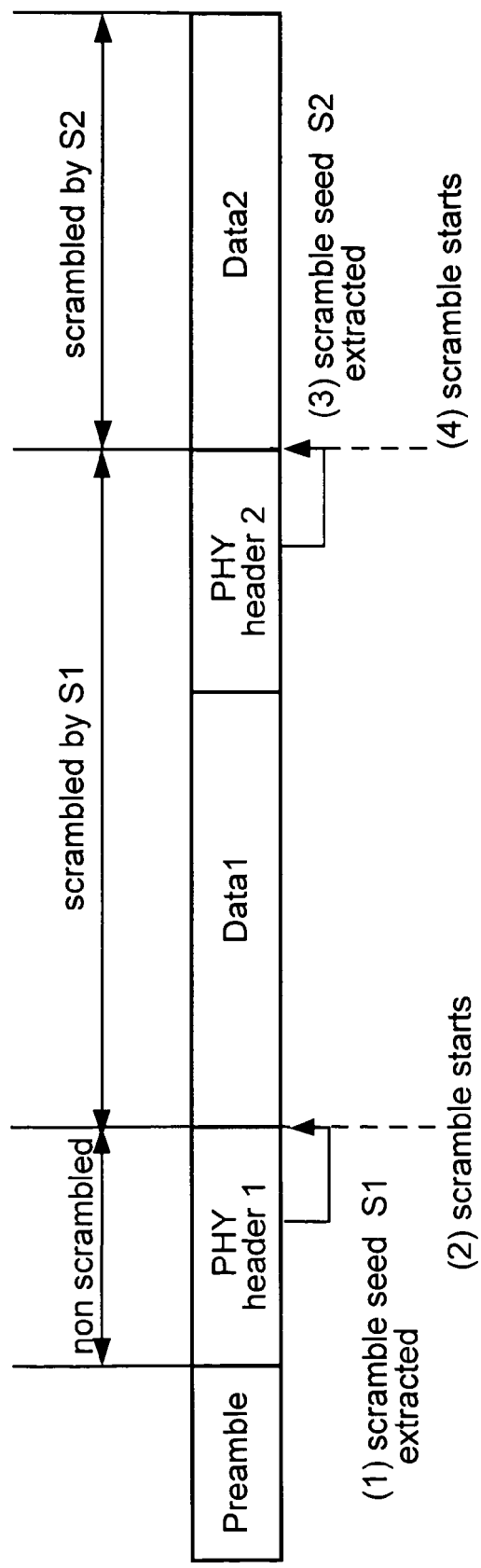
FIG. 30 is a diagram illustrating a configuration example of one transmission frame in which multiple pairs made up of a physical layer header section and a data section continue.
Figure 31:
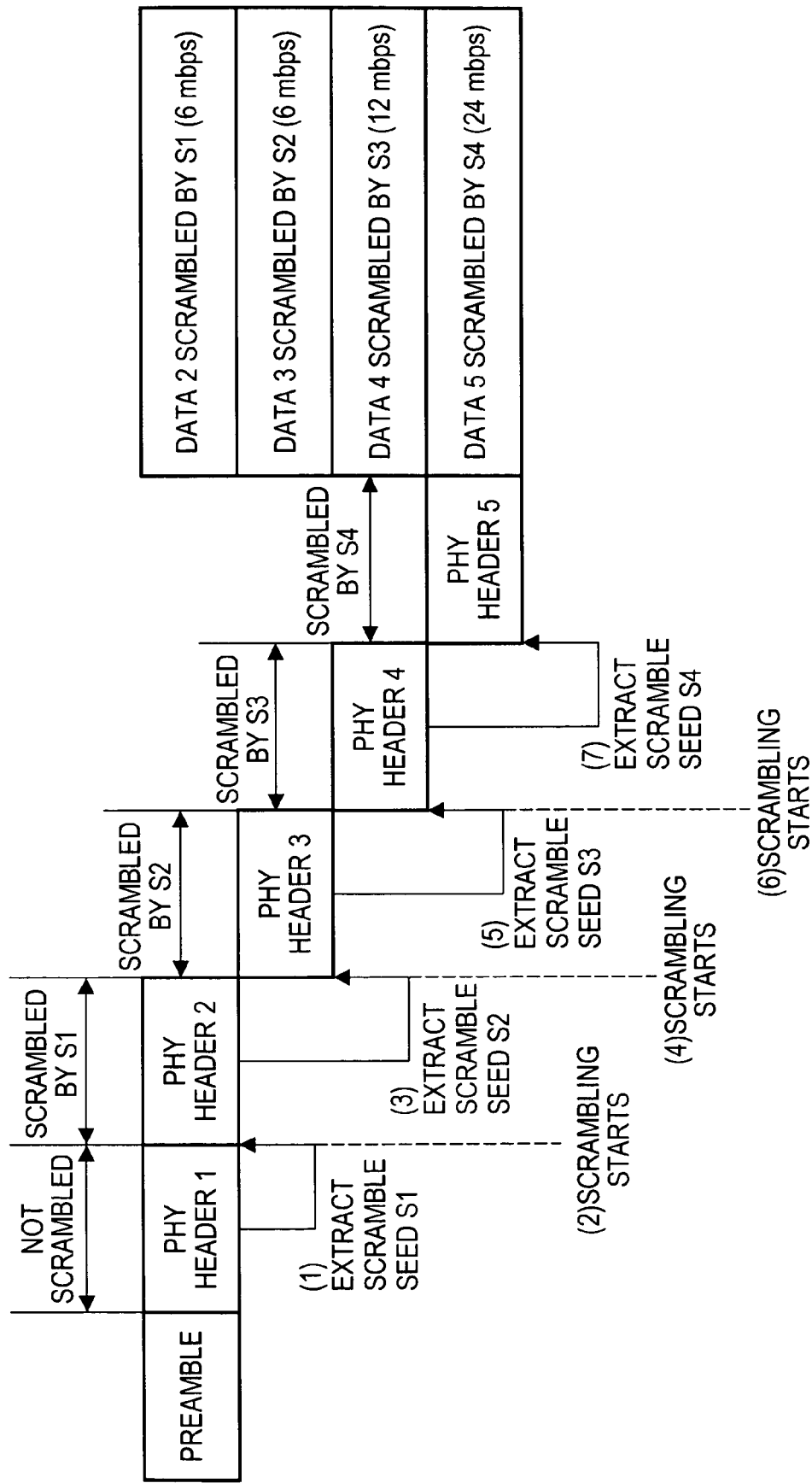
FIG. 31 is a diagram illustrating a configuration example of a transmission frame format available for an MIMO communication method.
Figure 32:
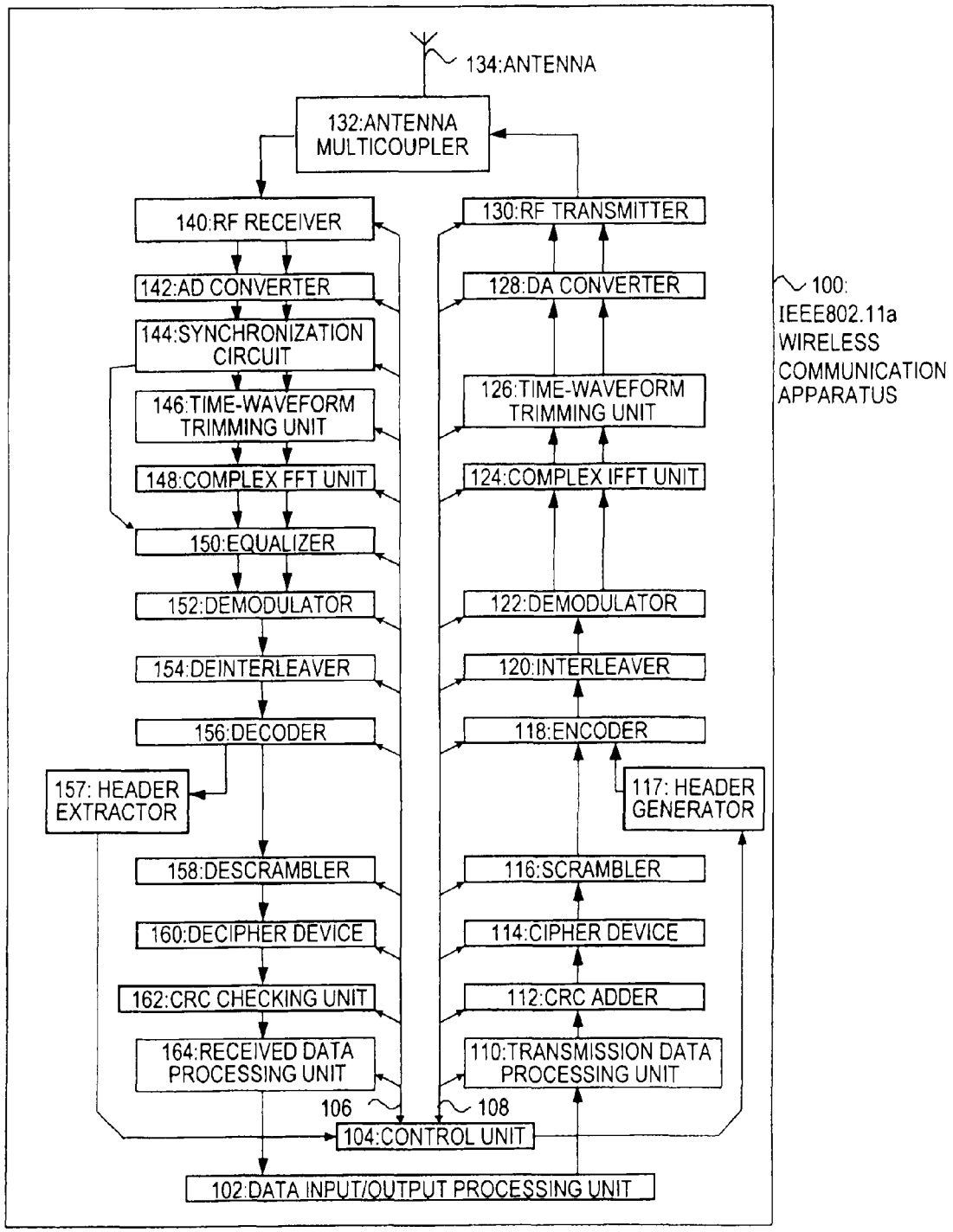
Figure 33:
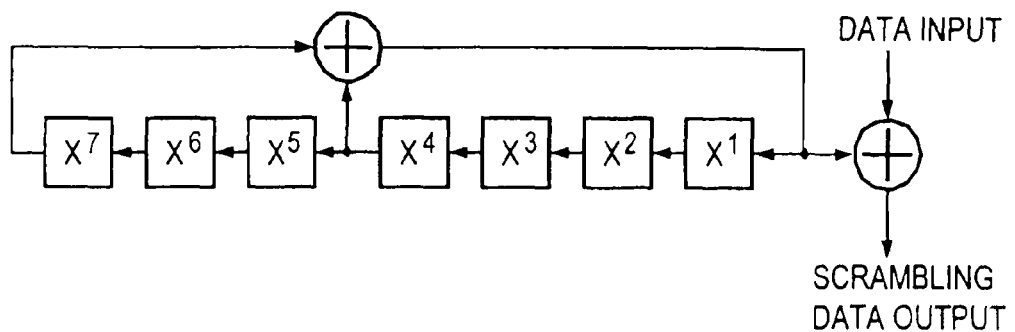
FIG. 33 is a diagram illustrating the configuration of a scrambler 116 disposed in the transmission system of a wireless communication apparatus 100.
Figure 34:
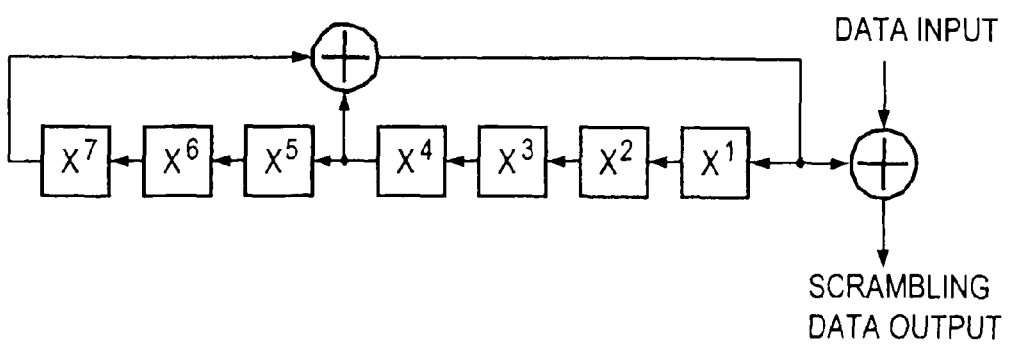
FIG. 34 is a diagram illustrating the configuration of a descrambler 158 disposed in the reception system of the wireless communication apparatus 100.
Figure 35:
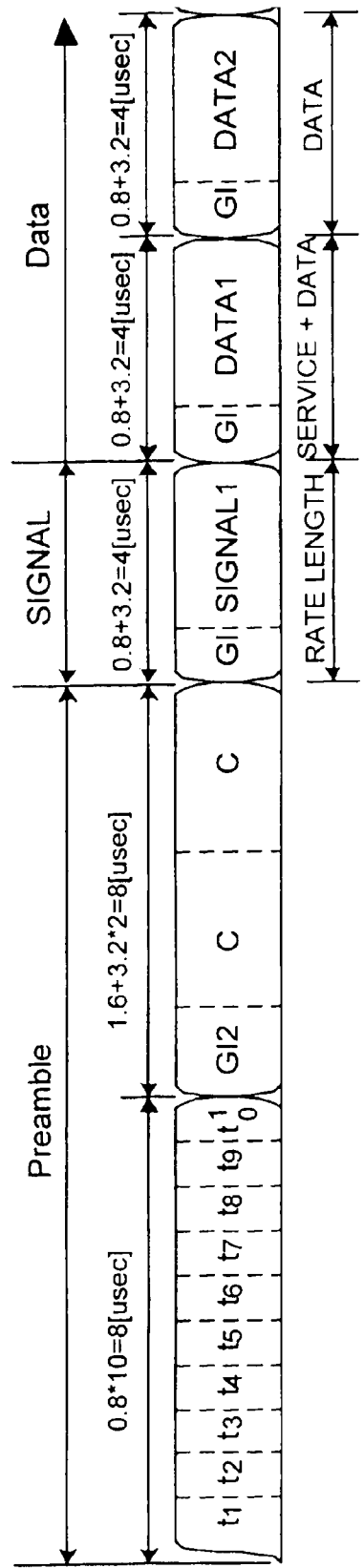
Figure 36:
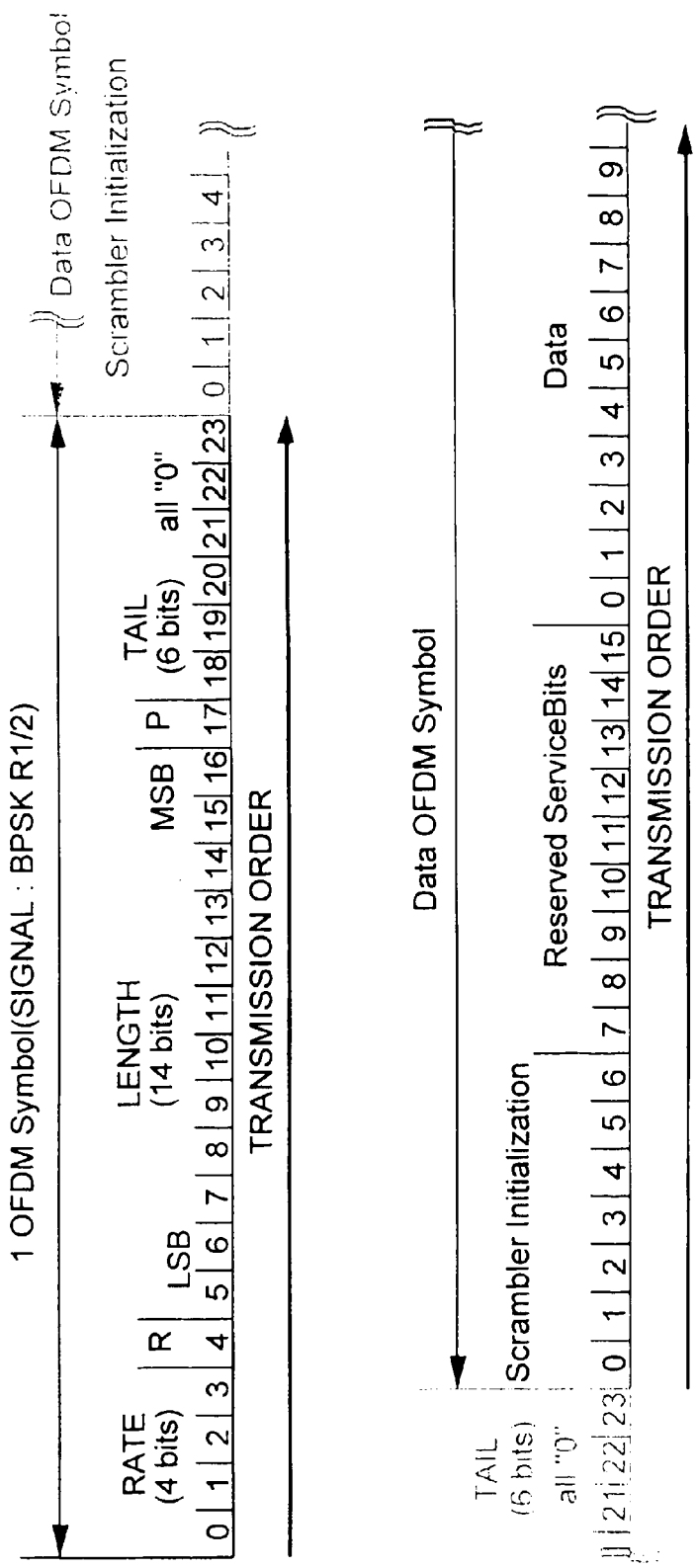
FIG. 36 is a diagram illustrating the configuration of a PHY header in detail.
Figure 37:
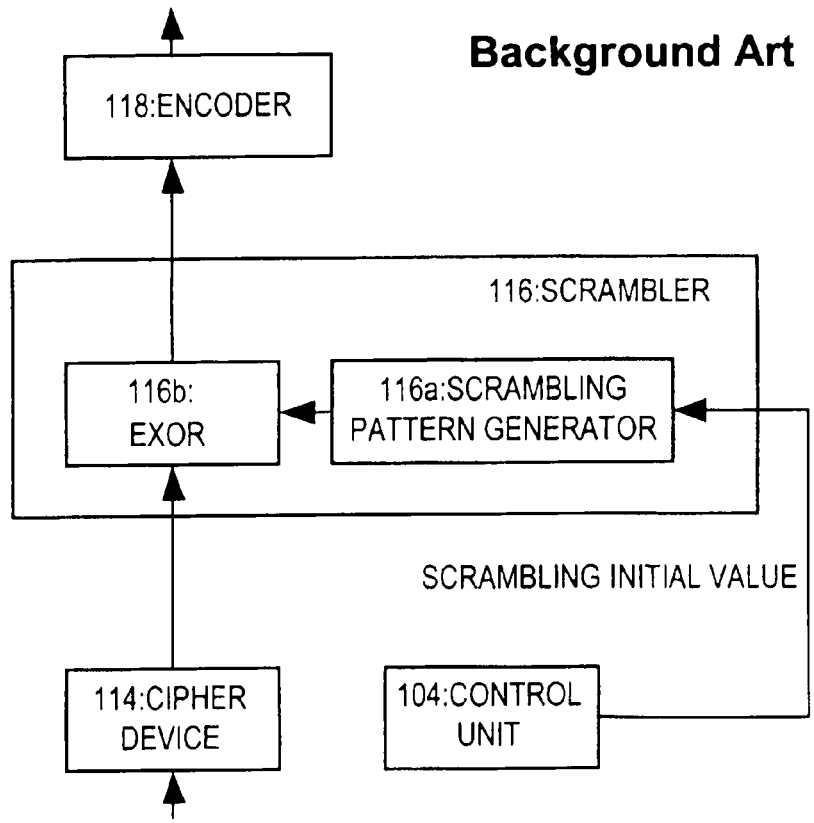
FIG. 37 is a diagram illustrating the configuration of around the scrambler 116 on the transmission side.
Figure 38:
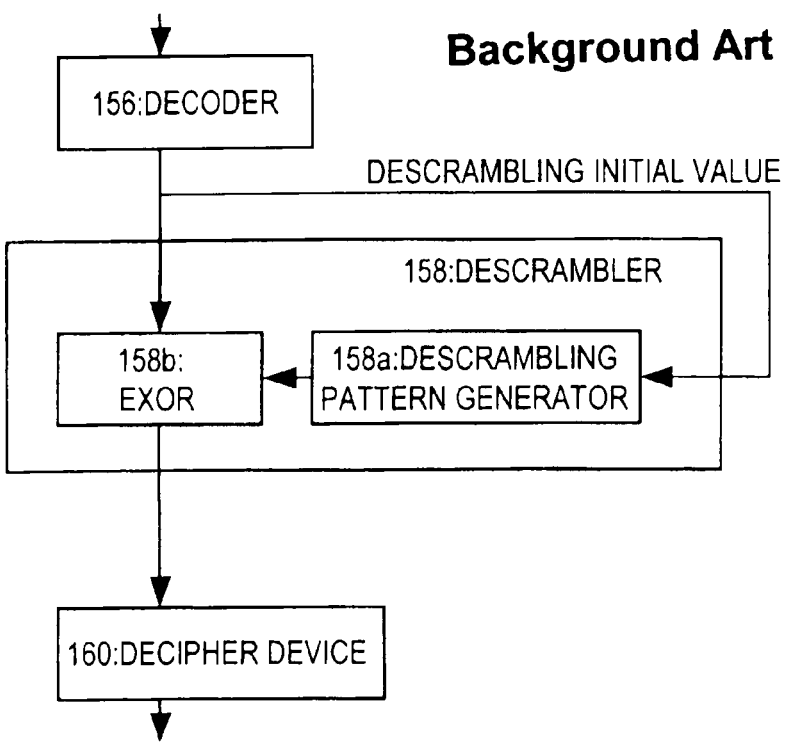
FIG. 38 is a diagram illustrating the configuration of around the descrambler 158 on the reception side.

The invention claimed is:

1. A wireless communication system for communicating transmission data comprising:
   a transmitter configured to generate and to transmit a signal including
      a physical layer header section; and
      a data section,
   the transmitter configured to generate a scrambling initial value using at least a part of the physical layer header section, the transmitter configured to count a number of logics "1" and a number of logics "0" in said part of the physical layer header section, the transmitter configured to generate the scrambling initial value based on the number of logics "1" and the number of logics "0" in said part of the physical layer header section, the transmitter configured to scramble the data section using the scrambling initial value, the transmitter configured to transmit the physical layer header section using a first modulation method and a first encoding rate with a first signal to noise ratio, the transmitter configured to transmit the data section using a second modulation method and a second encoding rate with a second signal to noise ratio, the first signal to noise ratio being less than the second signal to noise ratio; and
   a receiver configured to receive a signal from the transmitter, the receiver generating a descrambling initial value using at least a part of the physical layer header section, the receiver descrambling the data section using the descrambling initial value.

2. The wireless communication system according to claim 1, wherein in the event that said initial value when scrambling/descrambling is n bits in length (wherein n is a natural number), said transmitter counts the number of logics "1" in said physical layer header section or the part thereof, represents the number thereof with n bits in binary, and uses the number as said initial value when scrambling/descrambling.

3. A wireless communication apparatus for communicating transmission data made up of a physical layer header section and a data section, said apparatus comprising:
   communication means for transmitting/receiving transmission data over a communication channel, the communication means generating and transmitting a signal including
      a physical layer header section; and
      a data section including the transmission data,
   the communication means transmitting the physical layer header section using a first modulation method and a first encoding rate with a first signal to noise ratio, the communication means transmitting the data section using a second modulation method and a second encoding rate with a second signal to noise ratio, the first signal to noise ratio being less than the second signal to noise ratio;
   scrambling/descrambling initial-value generating means for generating an initial value when scrambling or descrambling using at least a part of the physical layer header section, the scrambling/descrambling initial-value generating means counting a number of logics "1" and a number of logics "0" in said part of the physical layer header section and generating the initial value based on the number of logics "1" and the number of logics "0" in said part of the physical layer header section; and
   scrambling/descrambling means for performing scrambling or descrambling of the data section using said initial value.

4. The wireless communication apparatus according to claim 3, wherein said scrambling/descrambling means generate a transmission signal sequence scrambled by calculating an exclusive-OR operation between a scrambled sequence generated from a scrambling initial value and a transmission data sequence, or descramble a reception data sequence by calculating an exclusive-OR operation between a descrambled sequence generated from a descrambling initial value and a reception signal sequence scrambled.

5. The wireless communication apparatus according to claim 3, wherein in the event that said initial value when scrambling/descrambling is n bits in length (wherein n is a natural number), said scrambling/descrambling initial-value generating means take an n-bit sequence obtained by extracting n bits from a physical layer header section or a part thereof based on a rule common with an other party of communication, as said initial value when scrambling/descrambling.

6. The wireless communication apparatus according to claim 5, wherein said scrambling/descrambling initial-value generating means generate said initial value when scrambling/descrambling by extracting n bits including fields of which all bits are not zero, of a physical layer header section.

7. The wireless communication apparatus according to claim 5, wherein said scrambling/descrambling initial-value generating means take a fixed n-bit sequence, which are not all zero bits, shared with an other party of communication as said initial value when scrambling/descrambling, in the event that n bits extracted from a physical layer header section are all zeroes.

8. The wireless communication apparatus according to claim 3, wherein in the event that said initial value when scrambling/descrambling is n bits in length (wherein n is a natural number), said scrambling/descrambling initial-value generating means extract (n−k) bits from a physical layer header section or a part thereof based on a rule common with an other party of communication (wherein k is a natural number smaller than n), and insert a k-bit sequence such that at least 1 bit thereof includes logic "1", shared with the other party of communication in the extracted bit sequence of said (n−k) bits in a pattern shared with the other party of communication, and generate said initial value when scrambling/descrambling.

9. The wireless communication apparatus according to claim 3, wherein in the event that said initial value when scrambling/descrambling is n bits in length (wherein n is a natural number), said scrambling/descrambling initial-value generating means count the number of logics "1" in said physical layer header section or a part thereof, represent the number thereof with n bits in binary, and take this as said initial value when scrambling/descrambling.

10. The wireless communication apparatus according to claim 9, wherein in the event that the number of logics "1" counted in said physical layer header section or a part thereof is zero, said scrambling/descrambling initial-value generating means take a fixed n-bit sequence, which are not all zero bits, shared with an other party of communication as said initial value when scrambling/descrambling.

11. The wireless communication apparatus according to claim 3, wherein in the event that said initial value when scrambling/descrambling is n bits in length (wherein n is a natural number), said scrambling/descrambling initial-value generating means count the number of logics "1" in said physical layer header section or a part thereof, represent the number thereof with (n−m) bits in binary (wherein m is a natural number smaller than n), and insert an m-bit sequence such that at least 1 bit thereof includes logic "1", shared with an other party of communication in the extracted bit sequence of said (n−m) bits in a pattern shared with the other party of communication, and generate said initial value when scrambling/descrambling.

12. The wireless communication apparatus according to claim 3, wherein in the event that said initial value when scrambling/descrambling is n bits in length (wherein n is a natural number), said scrambling/descrambling initial-value generating means count the number of logics "1" in said physical layer header section or a part thereof, add x shared with an other party of communication (wherein x is a natural number smaller than 2n) to the number thereof, represent the result with n bits in binary, and take this bit sequence as said initial value when scrambling/descrambling.

13. The wireless communication apparatus according to claim 3, wherein in the event that said initial value when scrambling/descrambling is n bits in length (wherein n is a natural number), said scrambling/descrambling initial-value generating means count the number of logics "0" in said physical layer header section or a part thereof, represent the number thereof with n bits in binary, and take this as said initial value when scrambling/descrambling.

14. The wireless communication apparatus according to claim 3, wherein in the event that the number of logics "0" counted in said physical layer header section or a part thereof is zero, said scrambling/descrambling initial-value generating means take a fixed n-bit sequence, which are not all zero bits, shared with an other party of communication as said initial value when scrambling/descrambling.

15. The wireless communication apparatus according to claim 3, wherein in the event that said initial value when scrambling/descrambling is n bits in length (wherein n is a natural number), said scrambling/descrambling initial-value generating means count the number of logics "0" in said physical layer header section or a part thereof, represent the number thereof with (n−m) bits in binary (wherein h is a natural number smaller than n), insert an h-bit sequence such that at least one bit thereof is logic "1", shared with an other party of communication in the extracted bit sequence of said (n−h) bits in a pattern shared with the other party of communication, and generate said initial value when scrambling/descrambling.

16. The wireless communication apparatus according to claim 3, wherein in the event that said initial value when scrambling/descrambling is n bits in length (wherein n is a natural number), said scrambling/descrambling initial-value generating means count the number of logics "0" in said physical layer header section or a part thereof, add y shared with an other party of communication (wherein y is a natural number smaller than 2n) to the number thereof, represent the result with n bits in binary, and take this bit sequence as said initial value when scrambling/descrambling.

17. A wireless communication apparatus for communicating transmission data made up of a physical layer header section and a data section, said apparatus comprising:
communication means for transmitting/receiving transmission data over a communication channel;
scrambling/descrambling initial-value generating means for generating an initial value when scrambling or descrambling using at least a part of a physical layer header section; and
scrambling/descrambling means for performing scrambling or descrambling of a data section using said initial value,
wherein in the event that said initial value when scrambling/descrambling is n bits in length (wherein n is a natural number), said scrambling/descrambling initial-value generating means count the number of logics "1"

and the number of logics "0" in said physical layer header section or a part thereof respectively, and represent the absolute value of the difference thereof with n bits in binary, and take this as said initial value when scrambling/descrambling.

18. The wireless communication apparatus according to claim 17, wherein in the event that the difference between the number of logics "1" and the number of logics "0" in said physical layer header section or a part thereof is zero, said scrambling/descrambling initial-value generating means take a fixed n-bit sequence, which are not all zero bits, shared with an other party of communication as said initial value when scrambling/descrambling.

19. A wireless communication apparatus for communicating transmission data made up of a physical layer header section and a data section, said apparatus comprising:
communication means for transmitting/receiving transmission data over a communication channel;
scrambling/descrambling initial-value generating means for generating an initial value when scrambling or descrambling using at least a part of a physical layer header section; and
scrambling/descrambling means for performing scrambling or descrambling of a data section using said initial value,
wherein in the event that said initial value when scrambling/descrambling is n bits in length (wherein n is a natural number), said scrambling/descrambling initial-value generating means count the number of logics "1" and the number of logics "0" in said physical layer header section or a part thereof respectively, represent the absolute value of the difference thereof with (n−i) bits in binary, insert an i-bit sequence such that at least one bit thereof is logic "1", shared with an other party of communication in the extracted bit sequence of said (n−i) bits in a pattern shared with the other party of communication, and generate said initial value when scrambling/descrambling.

20. A wireless communication apparatus for communicating transmission data made up of a physical layer header section and a data section, said apparatus comprising:
communication means for transmitting/receiving transmission data over a communication channel;
scrambling/descrambling initial-value generating means for generating an initial value when scrambling or descrambling using at least a part of a physical layer header section; and
scrambling/descrambling means for performing scrambling or descrambling of a data section using said initial value,
wherein in the event that said initial value when scrambling/descrambling is n bits in length (wherein n is a natural number), said scrambling/descrambling initial-value generating means count the number of logics "1" and the number of logics "0" in said physical layer header section or a part thereof respectively, obtain the absolute value of the difference thereof, add z shared with an other party of communication (wherein z is a natural number smaller than 2n) to the absolute value, represent the result with z bits in binary, and take this bit sequence as said initial value when scrambling/descrambling.

21. A processing method for processing transmission packets, said method comprising:
generating a physical layer header of a transmission packet;
inverting a parity signal in said physical layer header, and setting predetermined data included in said physical layer header as an initial value in an internal state of a scrambler, in the event of indicating that an initial value should be set in said internal state, the inverting including counting a number of logics "1" and a number of logics "0" in said part of the physical layer header section and generating the initial value based on the number of logics "1" and the number of logics "0" in said part of the physical layer header section; and
subjecting a signal to be processed in said transmission packet to a predetermined arithmetic operation according to the internal state of said scrambler, and outputting a processed transmission packet; and
transmitting the processed transmission packet over a communication channel using a transmitter, the transmitting including
transmitting the physical layer header section using a first modulation method and a first encoding rate with a first signal to noise ratio, and
transmitting the data section using a second modulation method and a second encoding rate with a second signal to noise ratio, the first signal to noise ratio being less than the second signal to noise ratio.

22. A processing method for processing reception packets by subjecting a signal to be processed in each reception packet to a predetermined arithmetic operation according to an internal state possessed by a descrambler, said method comprising:
receiving the reception packet over a communication channel using a receiver, the receiving including
receiving a physical layer header section of the reception packet which was transmitted using a first modulation method and a first encoding rate with a first signal to noise ratio, and
receiving a data section of the reception packet which was transmitted using a second modulation method and a second encoding rate with a second signal to noise ratio, the first signal to noise ratio being less than the second signal to noise ratio analyzing the physical layer header of the reception packet;
setting the headmost data of said signal to be processed as an initial value in the internal state of said descrambler in the event that a normal value is set in a parity signal of said physical layer header as initial value setting information, the setting including counting a number of logics "1" and a number of logics "0" in said part of the physical layer header section and generating the initial value based on the number of logics "1" and the number of logics "0" in said part of the physical layer header section, and setting predetermined data included in said physical layer header other than said signal to be processed as the initial value in the internal state of said descrambler in the event that an abnormal value is set in the parity signal of said physical layer header as said initial value setting information; and
subjecting said signal to be processed to said predetermined arithmetic operation according to the internal state of said descrambler, and outputting a processed reception packet.

23. A wireless communication method for controlling communication operation of transmission data made up of a physical layer header section and a data section, said method comprising:
transmitting/receiving transmission data over a communication channel using a transmitter and a receiver, the transmitting including generating and transmitting a signal including
a physical layer header section; and
a data section including the transmission data,
transmitting the physical layer header section using a first modulation method and a first encoding rate with a first signal to noise ratio, and
transmitting the data section using a second modulation method and a second encoding rate with a second signal to noise ratio, the first signal to noise ratio being less than the second signal to noise ratio;
generating an initial value when scrambling or descrambling using at least a part of the physical layer header section based on a rule common with an other party of communication, the generating including counting a number of logics "1" and a number of logics "0" in said part of the physical layer header section and generating the initial value based on the number of logics "1" and the number of logics "0" in said part of the physical layer header section; and
performing scrambling or descrambling of the data section using said initial value.

24. A non-transitory computer readable medium encoded with a computer program which is described in a computer-readable format so as to execute a method on a computer system based on initial value setting instructions indicating regarding whether or not an initial value should be set in an internal state possessed by a scrambler, said method comprising:

generating a physical layer header of a transmission packet;
inverting a parity signal in said physical layer header, and setting predetermined data included in said physical layer header as the initial value in the internal state of said scrambler, in the event of indicating that the initial value should be set in said internal state,. the inverting including counting a number of logics "1" and a number of logics "0" in said part of the physical layer header section and generating the initial value based on the number of logics "1" and the number of logics "0" in said part of the physical layer header section; and
subjecting a signal to be processed in said transmission packet to a predetermined arithmetic operation according to the internal state of said scrambler, and outputting a processed transmission packet; and
transmitting the processed transmission packet over a communication channel, the transmitting including
transmitting the physical layer header section using a first modulation method and a first encoding rate with a first signal to noise ratio, and
transmitting the data section using a second modulation method and a second encoding rate with a second signal to noise ratio, the first signal to noise ratio being less than the second signal to noise ratio.

25. A non-transitory computer readable medium encoded with a computer program which is described in a computer-readable format so as to execute the processing of a method on a computer system, said method comprising:
receiving transmission data over a communication channel, the receiving including
receiving a signal including
a physical layer header section; and
a data section including the transmission data,
receiving the physical layer header section transmitted using a first modulation method and a first encoding rate with a first signal to noise ratio, and
receiving the data section using a second modulation method and a second encoding rate transmitted with a second signal to noise ratio, the first signal to noise ratio being less than the second signal to noise ratio;
analyzing the physical layer header of a reception packet;
setting the headmost data of said signal to be processed as an initial value in the internal state of said descrambler in the event that a normal value is set in a parity signal of said physical layer header as initial value setting information, the setting including counting a number of logics "1" and a number of logics "0" in said part of the physical layer header section and generating the initial value based on the number of logics "1" and the number of logics "0" in said part of the physical layer header section, and setting predetermined data included in said physical layer header other than said signal to be processed as the initial value in the internal state of said descrambler in the event that an abnormal value is set in the parity signal of said physical layer header as said initial value setting information; and
subjecting said signal to be processed to said predetermined arithmetic operation according to the internal state of said descrambler, and outputting this.

26. A non-transitory computer readable medium encoded with a computer program which is described in a computer-readable format so as to execute a method of communication operation of transmission data on a computer system, said method comprising:

transmitting/receiving transmission data over a communication channel, the transmitting including
generating and transmitting a signal including
a physical layer header section; and
a data section including the transmission data,
transmitting the physical layer header section using a first modulation method and a first encoding rate with a first signal to noise ratio, and
transmitting the data section using a second modulation method and a second encoding rate with a second signal to noise ratio, the first signal to noise ratio being less than the second signal to noise ratio;
generating an initial value when scrambling or descrambling using at least a part of the physical layer header section based on a rule common with an other party of communication, the generating including counting a number of logics "1" and a number of logics "0" in said part of the physical layer header section and generating the initial value based on the number of logics "1" and the number of logics "0" in said part of the physical layer header section; and
performing scrambling or descrambling of the data section using said initial value.

* * * * *